(12) United States Patent
Maru

(10) Patent No.: US 8,571,125 B2
(45) Date of Patent: Oct. 29, 2013

(54) MIMO COMMUNICATION SYSTEM HAVING DETERMINISTIC CHANNELS AND ANTENNA ARRANGEMENT METHOD THERFOR

(75) Inventor: Tsuguo Maru, Tokyo (JP)

(73) Assignee: NEC Corporation, Tokyo (JP)

( * ) Notice: Subject to any disclaimer, the term of this patent is extended or adjusted under 35 U.S.C. 154(b) by 716 days.

(21) Appl. No.: 12/452,942

(22) PCT Filed: Aug. 1, 2008

(86) PCT No.: PCT/JP2008/063893
§ 371 (c)(1),
(2), (4) Date: Jan. 29, 2010

(87) PCT Pub. No.: WO2009/017230
PCT Pub. Date: Feb. 5, 2009

(65) Prior Publication Data
US 2010/0135203 A1   Jun. 3, 2010

(30) Foreign Application Priority Data

Aug. 2, 2007   (JP) ................................ 2007-201773

(51) Int. Cl.
*H04B 7/02*   (2006.01)
(52) U.S. Cl.
USPC .......................................... 375/267; 455/423
(58) Field of Classification Search
USPC .......................... 375/267; 455/423–425, 343
See application file for complete search history.

(56) References Cited

U.S. PATENT DOCUMENTS

| | | | |
|---|---|---|---|
| 6,785,341 | B2 | 8/2004 | Walton et al. |
| 7,054,378 | B2 | 5/2006 | Walton et al. |
| 2003/0224750 | A1 | 12/2003 | Sampath |
| 2005/0117677 | A1 | 6/2005 | Sampath |
| 2005/0141631 | A1 | 6/2005 | Takano |

(Continued)

FOREIGN PATENT DOCUMENTS

| | | |
|---|---|---|
| CN | 1871805 A | 11/2006 |
| JP | 2004-533169 A | 10/2004 |

(Continued)

OTHER PUBLICATIONS

Almers, Peter et al., The Effect of Horizontal Array Orientation on MIMO Channel Capacity, 57th IEEE Semiannual Vehicular Technology Conference. vol. 1, pp. 34-38 (Apr. 22-25, 2003).*

(Continued)

*Primary Examiner* — Kibrom T Hailu
*Assistant Examiner* — Benjamin Lamont
(74) *Attorney, Agent, or Firm* — McGinn IP Law Group, PLLC

(57) ABSTRACT

A MIMO communication system having deterministic channels the orthogonality of which can be ensured even if a reflected wave other than the direct wave is present during line-of-sight communication is provided. The MIMO communication system is used in a line-of-sight environment and has deterministic channels between the transmission side where a plurality of transmission antennas are arranged and the reception side where a plurality of reception antennas are arranged. The transmission side, the reception side, or both transmission and reception sides of the MIMO communication system have a channel matrix calculation processing means for calculating a channel matrix for establishing an orthogonal channel as a communication channel. The transmission and reception antennas forming the channel matrix are horizontally arranged with respect to the ground.

5 Claims, 28 Drawing Sheets

(56) References Cited

U.S. PATENT DOCUMENTS

| | | |
|---|---|---|
| 2006/0018248 A1 | 1/2006 | Akahori |
| 2006/0209975 A1* | 9/2006 | Jeong et al. .................. 375/260 |
| 2006/0222101 A1 | 10/2006 | Cetiner et al. |
| 2007/0082623 A1 | 4/2007 | Mattheijssen et al. |
| 2008/0108310 A1* | 5/2008 | Tong et al. ...................... 455/69 |
| 2009/0041149 A1* | 2/2009 | Sarris et al. .................. 375/267 |
| 2009/0209212 A1 | 8/2009 | Cetiner et al. |

FOREIGN PATENT DOCUMENTS

| | | |
|---|---|---|
| JP | 2004-312381 | 11/2004 |
| JP | 2005-184730 | 7/2005 |
| JP | 2005-354365 | 12/2005 |
| JP | 2006-33084 | 2/2006 |
| JP | 2006-505155 | 2/2006 |
| JP | 2006-238215 | 9/2006 |
| JP | 2008-527950 | 7/2008 |
| WO | WO 02/093784 A1 | 11/2002 |
| WO | WO 2006/123106 A1 | 11/2006 |

OTHER PUBLICATIONS

P.F. Driessen and G.J.Foschini, "On the Capacity Formula for Multiple Input-Multiple Output Wireless Channels: A Geometric Interpretation", IEEE Transactions on Communications, vol. 47, No. 2, Feb. 1999, pp. 173-176.

Chinese Office Action dated Jun. 12, 2012, with English translation.

Japanese Office Action dated May 15, 2012, with English translation.

P.F. Driessen and G.J.Foschini, "On the Capacity Formula for Multiple Input-Multiple Output Wireless Channels: A Geometric Interpretation", IEEE Transactions on Communications, vol. 47, No. 2, Feb. 1999, pp. 173-176 (Previously filed on Jan. 29, 2010).

Chinese Office Action dated Jan. 14, 2013, with English translation.

Almers. Peter et al., The Effect of Horizontal Array Orientation on MIMO Channel Capacity, 57th IEEE Semiannual Vehicular Technology Conference. vol. 1, pp. 34-38 (Apr. 22-25, 2003).

* cited by examiner where; $\alpha = 2\pi\left(\dfrac{d_R^2}{2R}\right)/\lambda = \dfrac{\pi}{\lambda}\cdot\dfrac{d^2}{R}$ , $d = d_T, d_R$ , $R = 5000[m]$

MIMO COMMUNICATION SYSTEM HAVING DETERMINISTIC CHANNELS AND ANTENNA ARRANGEMENT METHOD THERFOR

This application is based upon and claims the benefit of priority from prior Japanese Patent Application No. 2007-201773 (filed on Aug. 2, 2007), the entire contents of which are Incorporated herein by reference.

TECHNICAL FIELD

The present invention relates to a space-division multiplexing method (hereinafter, referred to as "MIMO (Multiple-Input/Multiple-Output)" in a Line-Of-Sight (LOS) environment and, more particularly to a MIMO communication system having deterministic channels like a fixed point microwave communication system, and an antenna arrangement method therefore.

BACKGROUND ART

A technique using a MIMO has become popular in the field of wireless communication, and the MIMO itself is becoming no longer a new technology. However, conventional techniques using the MIMO mainly focus on a mobile communication, and application of the MIMO to a fixed point communication has not been fully examined. In a mobile communication radio channels, radio wave coming from a transmission antenna is reflected or scattered according to the surrounding terrain and reaches a receiver in the form of a group of waves, resulting in occurrence of fading phenomenon which has been an obstacle to achievement of high quality communication. The MIMO technique in a mobile communication does not demonize the fading phenomenon but considers it as environmental resources with great potential that are inherent in mobile communication radio propagation. In this point, the MIMO technique is regarded as a revolutionary technique.

Although smaller in the amount of examples than the mobile communication, NPL (non-patent literature) 1 discloses consequents of application of such a MIMO technique to a line-of-sight fixed point radio communication where radio channels are determined. The mobile communication as described above deals with channels as a random matrix. On the other hand, the line-of-sight fixed point radio communication needs to deal with channels as deterministic channels. The above NPL 1 describes, as follows, what effect is produced on a channel matrix H constituting channels between transmission and reception antennas as a result of extension of antenna interval on both the transmission side and reception side.

$$H \cdot H^H = n \cdot I_n \qquad \text{[Numeral 1]}$$

where n is the number of antennas, $H^H$ is the Hermitian transposed matrix of channel matrix H, and I is a unit matrix, and the phase rotation of a signal with respect to a transmission antenna i and reception antenna k linearly arranged so as to face each other between the transmission side and reception side is set by the following formula and thereby the transmission and reception antennas can be constituted by linear antennas.

$$\frac{\pi}{n} \cdot [i-k]^2 \qquad \text{[Numeral 2]}$$

Assuming that n=2, the channel matrix H is represented by the following formula.

$$H_{max} = \begin{bmatrix} 1 & j \\ j & 1 \end{bmatrix} \qquad \text{[Numeral 3]}$$

In this case, an antenna configuration satisfying the condition of Numeral 1 is possible. NPL 1 describes that when the condition of Numeral 1 is satisfied, channel capacity in the MIMO configuration becomes maximum by $H_{max}$. That is, an increase in channel capacity based on the MIMO can be achieved not only in a mobile communication environment that is subject to reflection or scattering but also in a deterministic line-of-sight communication environment.

Now, considering a case where such a deterministic line-of-sight MIMO is applied to a small fixed point microwave communication system. In general, the small fixed point microwave communication system uses a frequency band of several GHz to several tens of GHz, which corresponds to several mm to several cm in terms of wavelength. Therefore, a significant phase rotation may occur due to movement in the antenna direction highly sensitive to a subtle change of weather condition such as wind or surrounding temperature. Under such a condition, it is difficult to ensure the deterministic channel matrix. Note that theoretical analysis to be described later analytically reveals that the above increase in channel capacity can be achieved even when such a displacement in the highly sensitive antenna direction occurs.

In the MIMO technique, a plurality of independent signals are transmitted/received at the same frequency band. Therefore, signal separation/detection is necessary. As a means for realizing this, there is a known a method (hereinafter, referred to as SVD method) based on matrix calculation using a unitary matrix which is obtained by Singular Value Decomposition (SVD). Assume that feedback information for construction of the unitary matrix can ideally be send from a reception end to transmission end in the SVD method. In this case, even if the above displacement in the highly sensitive antenna direction occurs, the unitary matrix acts so as to compensate for the displacement. As a result, large capacity fixed point microwave communication can be realized based on the MIMO. However, the above feedback information may increase system overhead. In addition, it is necessary to prepare a reverse channel for exchanging the feedback information. Note that a modeling of a channel matrix H to be described later performs analysis including the displacement in the highly sensitive antenna direction.

When the singular value analysis is carried out for the line-of-sight fixed channels where channels are deterministic, there exists an inter-antenna position at which an eigenvalue is a multiplicity condition to generate a singular point. Although the singular-value is uniquely determined, singular vectors are not unique. This state, which is particularly analytically troublesome, may cause significant transition of the singular vectors. However, by utilizing this phenomenon, various configurations can be possible. Various examples of configurations that take advantage of the characteristics will be described in detail later.

As a major problem in the deterministic line-of-sight MIMO, there is a problem that carrier synchronization between antennas must be achieved on the transmission side or reception side in the above conventional method. That is, the phase between a plurality of antennas on the transmission side or reception side needs to be equal or needs to have a constant phase difference.

On the other hand, in the fixed point microwave communication system, antenna interval must be widened in view of a frequency to be used. Correspondingly, radio devices including local oscillators are installed near antennas. That is, the problem of the necessity of achievement of carrier synchronization between antennas imposes severe restriction on construction of the fixed point microwave communication system.

CITATION LIST

Non-Patent Literature

{NPL 1} P. F. Driessen and G. J. Foschini, "On the Capacity Formula for Multiple Input-Multiple Output Wireless Channels: A Geometric Interpretation", IEEE Transactions on Communications, Vol. 47, No. 2, February 1999, pp. 173-176

SUMMARY OF INVENTION

Technical Problem

Assume that virtual orthogonal channels based on the MIMO that satisfy the above severe restriction imposed on the construction of the fixed point microwave communication system has been achieved. However, in the case where a reflected wave other than the direct wave is present in the line-of-sight channels, the orthogonality of the virtual orthogonal channels for MIMO formation cannot be maintained due to the presence of the reflected wave.

The present invention has been made in view of the above problems, and an object of the present invention is to provide a MIMO communication system having deterministic channels capable of both increasing the channel capacity by applying the MIMO to deterministic line-of-sight channels like a fixed point microwave communication system and maintaining the orthogonality of the virtual orthogonal channels for MIMO even if a reflected wave other than the direct wave is present in the line-of-sight channels, and an antenna arrangement method for the MIMO communication system.

Another object of the present invention is to provide a MIMO communication system having deterministic channels capable of both offering performance equivalent to a conventional SVD method without feedback information that needs to be sent from a reception end to transmission end for construction of a unitary matrix in the SVD method and maintaining the orthogonality of the virtual orthogonal channels for MIMO even if a reflected wave other than the direct wave is present in the line-of-sight channels, and an antenna arrangement method for the MIMO communication system.

Still another object of the present invention is to provide a MIMO communication system having deterministic channels capable of both solving the problem of the necessity of achievement of carrier synchronization between antennas which imposes severe restriction on construction of the fixed point microwave communication system and maintaining the orthogonality of the virtual orthogonal channels for MIMO even if a reflected wave other than the direct wave is present in the line-of-sight channels, and an antenna arrangement method for the MIMO communication system.

Still another object of the present invention is to provide a MIMO communication system having deterministic channels capable of both offering performance equivalent to an SVD method even under the condition that it is difficult to ensure a deterministic channel matrix due to a significant phase rotation caused by movement in the antenna direction highly sensitive to a subtle change of weather condition such as wind or surrounding temperature and maintaining the orthogonality of the virtual orthogonal channels for MIMO even if a reflected wave other than the direct wave is present in the line-of-sight channels, and an antenna arrangement method for the MIMO communication system.

Solution to Problem

To solve the above problems, in a first MIMO communication system having deterministic channels between the transmission side where a plurality of transmission antennas are arranged and the reception side where a plurality of reception antennas are arranged and used in a line-of-sight environment and an antenna arrangement method for the MIMO communication system, the MIMO communication system includes a channel matrix calculation processing means for calculating a channel matrix for constructing orthogonal channels as the channel on a transmission or reception side or both of the transmission and reception sides, wherein the plurality of transmission antennas and plurality of reception antennas constituting the channel matrix are horizontally arranged with respect to the ground.

In a second MIMO communication system and an antenna arrangement method therefor having deterministic channels between the transmission side where a plurality of transmission antennas are arranged and the reception side where a plurality of reception antennas are arranged and used in a line-of-sight environment and an antenna arrangement method for the MIMO communication system, the MIMO communication system includes a channel matrix calculation processing means for calculating a channel matrix for constructing orthogonal channels as the channel on a transmission or reception side or both of the transmission and reception sides, wherein the plurality of transmission antennas and plurality of reception antennas constituting the channel matrix are vertically arranged with respect to the ground, and antenna height from the ground is made an integral multiple of the antenna interval.

In a third MIMO communication system having deterministic channels between the transmission side where a plurality of transmission antennas are arranged and the reception side where a plurality of reception antennas are arranged and an antenna arrangement method for the MIMO communication system, the MIMO communication system includes a channel matrix calculation processing means for constructing orthogonal channels as the channels by setting geometric parameters of the channels concerning antenna distance so that the eigenvalue of the channel matrix becomes a multiplicity condition and performing, on the transmission or reception side, matrix calculation using a unitary matrix constituted based on singular vectors obtained from the eigenvalue or singular vectors obtained from the linear combination of eigenvectors, wherein the plurality of transmission antennas and plurality of reception antennas constituting the channels are horizontally arranged with respect to the ground.

In a fourth MIMO communication system and an antenna arrangement method therefor having deterministic channels between the transmission side where a plurality of transmission antennas are arranged and the reception side where a plurality of reception antennas are arranged and an antenna arrangement method for the MIMO communication system, the MIMO communication system includes a channel matrix calculation processing means for constructing orthogonal channels as the channels by setting geometric parameters of the channels concerning antenna distance so that the eigenvalue of the channel matrix becomes a multiplicity condition and performing, on the transmission or reception side, matrix calculation using a unitary matrix constituted based on singular vectors obtained from the eigenvalue or singular vectors obtained from the linear combination of eigenvectors, wherein the plurality of transmission antennas and plurality of reception antennas constituting the channels are vertically arranged with respect to the ground, and antenna height from the ground is made an integral multiple of the antenna interval.

Advantageous Effects of Invention

As described above, according to the first MIMO communication system having deterministic channels and an antenna arrangement method therefor, even if a reflected wave other than the direct wave is present during line-of-sight communication, it is possible to ensure orthogonality.

According to the second MIMO communication system having deterministic channels and an antenna arrangement method therefor, even if a reflected wave other than the direct wave is present during line-of-sight communication, it is possible to ensure orthogonality in an antenna configuration where space saving is achieved due to vertical arrangement of the antennas.

According to the third MIMO communication system having deterministic channels and an antenna arrangement method therefor, even if a reflected wave other than the direct wave is present during line-of-sight communication, it is possible to ensure orthogonality with the maximum capacity.

According to the fourth MIMO communication system having deterministic channels and an antenna arrangement method therefor, even if a reflected wave other than the direct wave is present during line-of-sight communication, it is possible to ensure orthogonality with the maximum capacity in an antenna configuration where space saving is achieved due to vertical arrangement of the antennas.

REFERENCE SIGNS LIST

Figure 1:
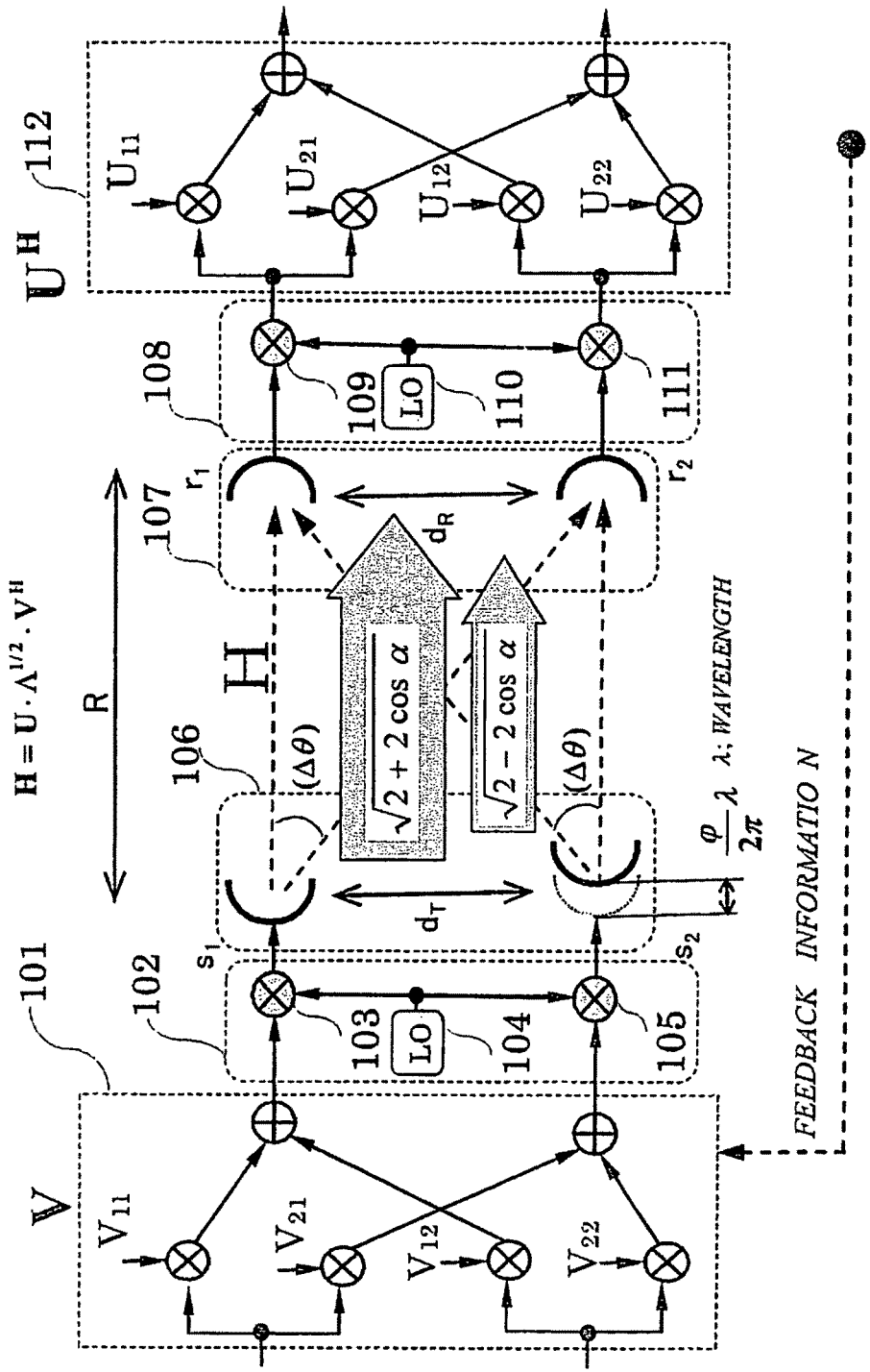
FIG. 1 A view showing a configuration example of a MIMO communication system according to an exemplary embodiment of the present invention, where an SVD method where antenna distance is arbitrarily set and fluctuation of antenna position in the highly sensitive antenna direction is taken into consideration.

Explanation of Reference Symbols
101: Matrix calculation processing section based on unitary matrix V
102: Frequency conversion section
103: Mixer
104: Local oscillator
105: Mixer
106: Fixed antenna section
107: Fixed antenna section
108: Frequency conversion section
109: Mixer
110: Local oscillator
111: Mixer
112: Matrix calculation processing section based on unitary matrix U
201: Matrix calculation processing section based on unitary matrix V
202: Fixed antenna section
203: Fixed antenna section
301: Matrix calculation processing section based on matrix V
302: Fixed antenna section
303: Fixed antenna section
401: Pilot signal generation section
402: Frequency conversion section
403: Mixer
404: Local oscillator
405: Local oscillator
406: Modeling of phase noise caused due to absent of synchronization between carriers
407: Mixer
408: Fixed antenna section
409: Fixed antenna section
410: Matrix calculation processing section based on unitary matrix U
501: Pilot signal generation section
502: Frequency conversion section
503: Mixer
504: Local oscillator
505: Local oscillator
506: Modeling of phase noise caused due to absent of synchronization between carriers
507: Mixer
508: Fixed antenna section
509: Fixed antenna section
510: Frequency conversion section
511: Mixer
512: Local oscillator
513: Local oscillator
514: Modeling of phase noise caused due to absent of synchronization between carriers
515: Mixer
516: Pilot detection section
517: Matrix calculation processing section based on unitary matrix U
601: Pilot signal generation section
602: Frequency conversion section
603: Mixer
604: Local oscillator
605: Local oscillator
606: Modeling of phase noise caused due to absent of synchronization between carriers
607: Mixer
608: Fixed antenna section
609: Fixed antenna section
610: Frequency conversion section
611: Mixer
612: Local oscillator
613: Local oscillator
614: Modeling of phase noise caused due to absent of synchronization between carriers
615: Mixer
616: Pilot detection section
617: Matrix calculation processing section based on matrix U
2001: Transmission station
2002: Reception station 1
2003: Reception station 2

DESCRIPTION OF EXEMPLARY EMBODIMENTS

An exemplary embodiment of the present invention will be described with reference to the accompanying formulas and accompanying drawings. Before that, a theoretical reasoning for the fact that channel capacity in the MIMO configuration becomes maximum even with deterministic line-of-sight channels will be explained.

The channel capacity of virtual orthogonal channels based on the MIMO configuration is represented by eigenvalues of respective paths. Then, eigenvalue analysis is performed for an antenna configuration as shown in FIG. 1. The following modeling, whose antenna configuration and reference symbols are shown in FIG. 1, takes the displacement in the highly sensitive antenna direction into consideration. Although a case where two antennas are used will be described for convenience, the same calculation may be applied regardless of the number of antennas.

In FIG. 1, a MIMO communication system used in a line-of-sight environment has deterministic channels between the transmission side (transmitter or transmission end) where a plurality of transmission antennas are arranged and reception side (receiver or reception end) where a plurality of reception antennas are arranged. H in FIG. 1 denotes a channel matrix, and V (V11, V12, V21, V22) and U (U11, U12, U21, U22) denote a transmission side unitary matrix and a reception side unitary matrix, respectively. $U^H$ and $V^H$ denote the Hermitian transposed matrixes of U and V, respectively, and $\Lambda^{1/2}$ denotes a singular value diagonal matrix.

The transmission side includes a matrix calculation processing section 101 based on unitary matrix V, a frequency conversion section 102 (including mixers 103, 105, and a local oscillator 104), and a fixed antenna section 106 (including two antennas (transmission antennas)). The reception side includes a fixed antenna section 107 (including two antennas (reception antennas)), a frequency conversion section 108 (including mixers 109, 111, and a local oscillator 110), and a matrix calculation processing section 112 based on unitary matrix U. $S_1$ and $S_2$ are transmission signals transmitted from the two antennas on the transmission side, and $r_1$ and $r_2$ are reception signals transmitted from the two antennas on the reception side.

Further, as geometric parameters concerning the communication channel antenna distance, R denotes a distance between transmission and reception antennas, $d_T$ denotes a transmission antenna element interval, $d_R$ denotes reception antenna element interval, and $\Delta\theta$ denotes angle of a diagonal channel with respect to an opposing channel between the transmission and reception antennas. Φ denotes phase shift of a transmission signal $S_2$ caused by a position variation of a transmission antenna (see FIG. 1), and γ denotes wavelength.

In the eigenvalue analysis for the antenna configuration of FIG. 1, the distance decay and common phase shift based on a transmitter-receiver distance R are determined by relative phase shift and therefore can be ignored. The channel difference between R and diagonal channel of angle Δθ is represented by the following formula using the geometric parameters (R, Δθ, $d_T$, and $d_R$).

$$R \cdot (1 - \cos(\Delta\theta)) \approx R \cdot \left(\frac{(\Delta\theta)^2}{2}\right) = R \cdot \left(\frac{1}{2}\left(\frac{d_R}{R}\right)^2\right) \quad \text{[Numeral 4]}$$

$$= \frac{d_R^2}{2R} \quad \because \frac{d_R}{R}$$

$$= \tan(\Delta\theta) \approx (\Delta\theta),$$

at $d_T = d_R$

Accordingly, phase rotation α resulting from the channel difference is represented by the following formula using γ.

$$\alpha = 2\pi\left(\frac{d_R^2}{2R}\right)\bigg/\gamma = \frac{\pi}{\gamma} \cdot \frac{d_R^2}{R} \quad \text{[Numeral 5]}$$

Incidentally, assuming that RF frequency=30 GHz (γ=(3× $10^8$) [m/s]/(30×$10^9$) [Hz]), R=5000 m, $d_T=d_R=5$ m, α is calculated by the following formula.

$$\alpha = \frac{\pi}{\gamma} \cdot \frac{d_R^2}{R} = \frac{\pi}{(3 \cdot 10^8)/(30 \cdot 10^9)} \cdot \frac{5^2}{5000} = \frac{\pi}{2} \quad \text{[Numeral 6]}$$

Therefore, channel matrix H considering phase shift Φ based on the position variation (see FIG. 1) of a transmission antenna for transmitting a signal $s_2$ is represented by the following formula.

$$H = \begin{bmatrix} 1 & e^{-j\alpha} \cdot e^{j\Phi} \\ e^{-j\alpha} & 1 \cdot e^{j\Phi} \end{bmatrix} \quad \text{[Numeral 7]}$$

Accordingly, assuming that $H \cdot H^H$ ($H^H$ is the Hermitian transposed matrix of H) is Ω, the following formula is obtained.

$$\Omega = H^H \cdot H \quad \text{[Numeral 8]}$$

$$= \begin{bmatrix} 1 & e^{j\alpha} \\ e^{j\alpha} \cdot e^{-j\Phi} & e^{j\Phi} \end{bmatrix} \cdot \begin{bmatrix} 1 & e^{-j\alpha} \cdot e^{j\Phi} \\ e^{-j\alpha} & e^{j\Phi} \end{bmatrix}$$

$$= \begin{bmatrix} 2 & e^{j\Phi}(e^{j\alpha} + e^{-j\alpha}) \\ e^{-j\Phi}(e^{j\alpha} + e^{-j\alpha}) & 2 \end{bmatrix}$$

$$= \begin{bmatrix} 2 & 2\cos\alpha \cdot e^{j\Phi} \\ 2\cos\alpha \cdot e^{-j\Phi} & 2 \end{bmatrix}$$

Accordingly, eigenvalues $\lambda_1$ and $\lambda_2$ representing channel capacity of the virtual orthogonal channels can be calculated as follows.

$$\begin{vmatrix} 2-\lambda & 2\cos\alpha \cdot e^{j\Phi} \\ 2\cos\alpha \cdot e^{j\Phi} & 2-\lambda \end{vmatrix} = \lambda^2 + 4 - 4\lambda - 4\cos^2\alpha \quad \text{[Numeral 9]}$$

$$= \lambda^2 - 4\lambda - 4\sin^2\alpha$$

$$= 0 \therefore \lambda$$

$$= 2 \pm \sqrt{4 - 4\sin^2\alpha}$$

$$= 2 \pm 2\cos\alpha$$

Figure 28:
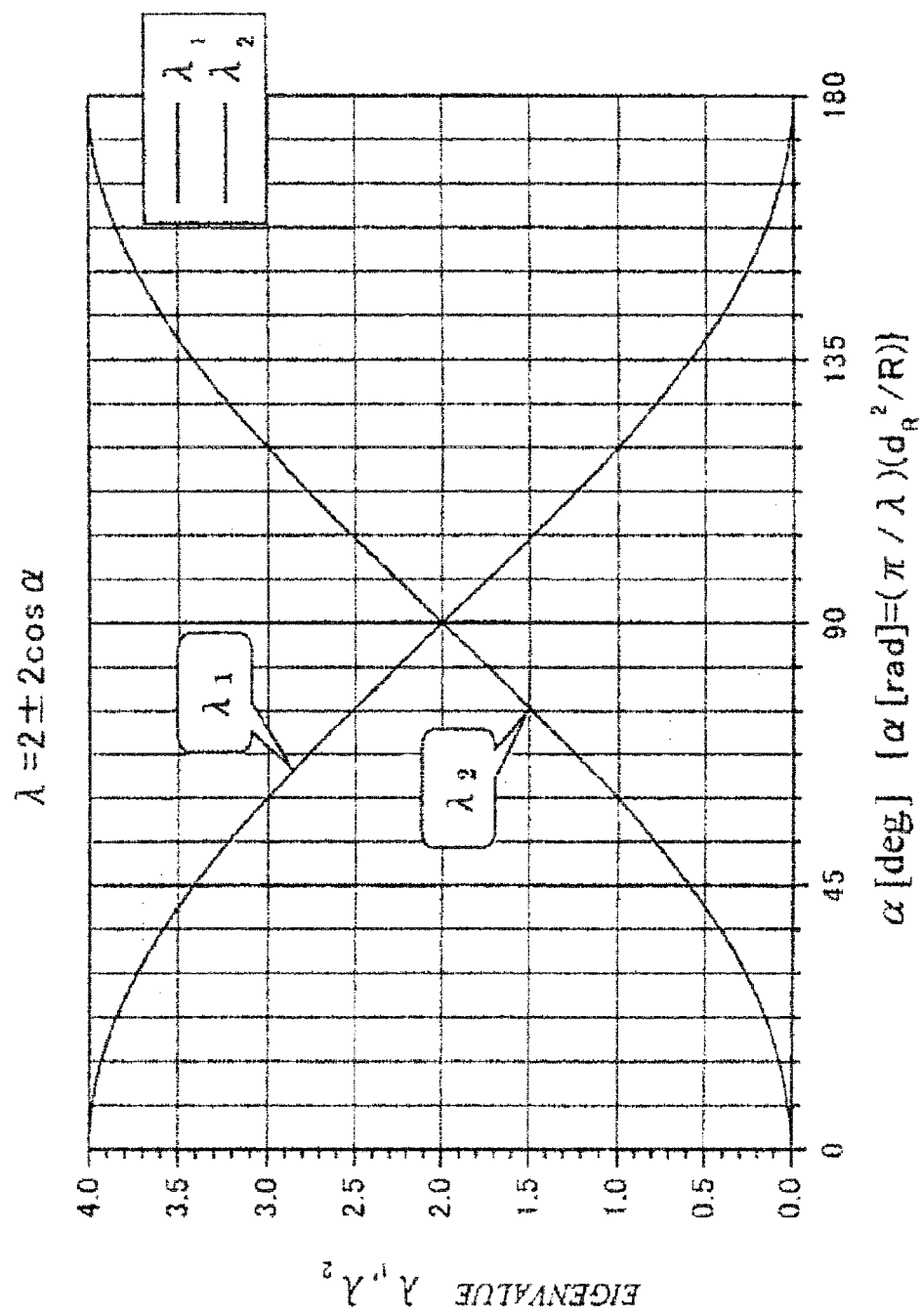
FIG. 28 A graph showing eigenvalues on the virtual orthogonal channels.

A calculation result of Numeral 9 is shown in FIG. 28. The analysis result of FIG. 28 shows a case where unit power is transmitted per one antenna and, therefore, channel capacity is double the number of antennas. It should be noted here that the modeling used in the above calculation includes a displacement in the highly sensitive antenna direction. Despite this, the displacement component does not appear in a result of the eigenvalue representing a final channel capacity. That is, an increase in the channel capacity is possible by MIMO even in the line-of-sight fixed point radio communication where radio channels are determined. The channel capacity is determined by the antenna distance not relevant to the highly sensitive antenna displacement.

A case where two antennas are used has been described above. In the following, a case where three or more antennas are used will be described.

The phase rotation resulting from the channel difference between diagonal channels of antenna elements linearly arranged on the transmission and reception sides is obtained from [Numeral 5] and, assuming that antenna element interval is a common value of d, the phase rotation is represented by the following formula.

$$\frac{\pi}{\gamma} \cdot \frac{d^2}{R} \quad \text{[Numeral 10]}$$

$$\frac{\pi}{\gamma} \cdot \frac{d^2}{R} = \frac{\pi}{3} \therefore \frac{d^2}{R} = \frac{\gamma}{3} \quad \text{[Numeral 11]}$$

Thus, when the antenna element interval d and transmitter-receiver distance R are defined so that the above Numeral 11 is satisfied and a configuration in which three antennas are used is considered, a channel matrix $H_3$ represented by the following formula can be obtained.

$$H_3 = \begin{bmatrix} 1 & e^{-j\frac{\pi}{3}} & e^{-j\frac{4\pi}{3}} \\ e^{-j\frac{\pi}{3}} & 1 & e^{-j\frac{\pi}{3}} \\ e^{-j\frac{4\pi}{3}} & e^{-j\frac{\pi}{3}} & 1 \end{bmatrix} \quad \text{[Numeral 12]}$$

Accordingly, assuming that $H_3 \cdot H_3^H$ ($H_3^H$ is the Hermitian transposed matrix of H) is Ω, the following formula is obtained.

$$\Omega = H_3^H \cdot H_3 \quad \text{[Numeral 13]}$$

$$= \begin{bmatrix} 1 & e^{j\frac{\pi}{3}} & e^{j4\frac{\pi}{3}} \\ e^{j\frac{\pi}{3}} & 1 & e^{j\frac{\pi}{3}} \\ e^{j4\frac{\pi}{3}} & e^{j\frac{\pi}{3}} & 1 \end{bmatrix} \cdot \begin{bmatrix} 1 & e^{-j\frac{\pi}{3}} & e^{-j4\frac{\pi}{3}} \\ e^{-j\frac{\pi}{3}} & 1 & e^{-j\frac{\pi}{3}} \\ e^{-j4\frac{\pi}{3}} & e^{-j\frac{\pi}{3}} & 1 \end{bmatrix}$$

$$= \begin{bmatrix} 3 & 0 & 0 \\ 0 & 3 & 0 \\ 0 & 0 & 3 \end{bmatrix}$$

Thus, it can be understood that three eigenvalues corresponding to the channel capacity of the virtual orthogonal channels are all "3" and that the entire channel capacity is three times the number of antennas.

Similarly, antenna element interval d and transmitter-receiver distance R are defined so that the following formula is satisfied and a configuration in which four antennas are used is considered.

$$\frac{\pi}{\gamma} \cdot \frac{d^2}{R} = \frac{\pi}{4} \therefore \frac{d^2}{R} = \frac{\gamma}{4} \quad \text{[Numeral 14]}$$

Thus, a channel matrix $H_4$ represented by the following formula can be obtained.

$$H_4 = \begin{bmatrix} 1 & e^{-j\frac{\pi}{4}} & e^{-j4\frac{\pi}{4}} & e^{-j9\frac{\pi}{4}} \\ e^{-j\frac{\pi}{4}} & 1 & e^{-j\frac{\pi}{4}} & e^{-j4\frac{\pi}{4}} \\ e^{-j4\frac{\pi}{4}} & e^{-j\frac{\pi}{4}} & 1 & e^{-j\frac{\pi}{4}} \\ e^{-j9\frac{\pi}{4}} & e^{-j4\frac{\pi}{4}} & e^{-j\frac{\pi}{4}} & 1 \end{bmatrix} \quad \text{[Numeral 15]}$$

Accordingly, assuming that $H_4 \cdot H_4^H$ ($H_4^H$ is the Hermitian transposed matrix of H) is $\Omega$, the following formula is obtained.

$$\Omega = H_4^H \cdot H_4 \quad \text{[Numeral 16]}$$

$$= \begin{bmatrix} 1 & e^{j\frac{\pi}{4}} & e^{j4\frac{\pi}{4}} & e^{j9\frac{\pi}{4}} \\ e^{j\frac{\pi}{4}} & 1 & e^{j\frac{\pi}{4}} & e^{j4\frac{\pi}{4}} \\ e^{j4\frac{\pi}{4}} & e^{j\frac{\pi}{4}} & 1 & e^{j\frac{\pi}{4}} \\ e^{j9\frac{\pi}{4}} & e^{j4\frac{\pi}{4}} & e^{j\frac{\pi}{4}} & 1 \end{bmatrix} \cdot \begin{bmatrix} 1 & e^{-j\frac{\pi}{4}} & e^{-j4\frac{\pi}{4}} & e^{-j9\frac{\pi}{4}} \\ e^{-j\frac{\pi}{4}} & 1 & e^{-j\frac{\pi}{4}} & e^{-j4\frac{\pi}{4}} \\ e^{-j4\frac{\pi}{4}} & e^{-j\frac{\pi}{4}} & 1 & e^{-j\frac{\pi}{4}} \\ e^{-j9\frac{\pi}{4}} & e^{-j4\frac{\pi}{4}} & e^{-j\frac{\pi}{4}} & 1 \end{bmatrix}$$

$$= \begin{bmatrix} 4 & 0 & 0 & 0 \\ 0 & 4 & 0 & 0 \\ 0 & 0 & 4 & 0 \\ 0 & 0 & 0 & 4 \end{bmatrix}$$

Thus, it can be understood from the above formula that four eigenvalues corresponding to the channel capacity of the virtual orthogonal channels are all "4" and that the entire channel capacity is four times the number of antennas.

That is, it can be understood that even when the number of antennas exceeds 2, the channel capacity of deterministic line-of-sight channels is increased to an extent corresponding to the number of antennas which is equivalent to the maximum capacity of MIMO. Note that although a case where two antennas are used will be described for convenience in the following examples, it goes without saying that the same is applied to a case where the number of antennas exceeds 2.

Next, as a signal separation/detection method in MIMO, a method (hereinafter, referred to as SVD method) based on matrix calculation using a unitary matrix which is obtained by Singular Value Decomposition will be described. In the SVD method, matrix calculation using a unitary matrix V on the transmission side and matrix calculation using a unitary matrix U on the reception side are required. In order to perform the matrix calculation using the unitary matrix V, feedback information for construction of the unitary matrix needs to be sent from the reception end to transmission end.

An exemplary embodiment of the present invention will be described in detail below with reference to the accompanying formulas and drawings.

In FIG. 1, transmission signals processed by a transmission side matrix calculation processing section 101 based on the unitary matrix V are frequency converted into signals of a radio frequency by the transmission side frequency conversion section 102 including the local oscillator 104, and mixers 103 and 105 and then transmitted from the fixed antenna section 106 including a plurality of antennas as $s_1$ and $s_2$. The notation of the $s_1$ and $s_2$ is based on equivalent baseband representation.

It should be noted here that carrier synchronization between antennas is achieved by a local oscillation signal supplied from one local oscillator 104 to the mixers 103 and 105. This results from a restriction on a space-division multiplexing fixed point microwave communication system that deterministic channels are determined based on the phase difference between paths. However, as described later, the local oscillator 104 may be provided independently for each antenna.

The signals thus transmitted are received by a reception side fixed antenna section 107 including a plurality of antennas as $r_1$ and $r_2$. The notation of then and $r_2$ is based on equivalent baseband representation. The reception signals $r_1$ and $r_2$ are frequency converted into signals of a baseband frequency by the reception side frequency conversion section 108 including the local oscillator 110 and mixers 109 and 111 and then processed by the reception side matrix calculation processing section 112 based on the unitary matrix U, whereby signal separation/detection in MIMO is completed.

It should be noted here that carrier synchronization between antennas is achieved by a local oscillation signal supplied from one local oscillator 110 to the mixers 109 and 111. This results from a restriction on a space-division multiplexing fixed point microwave communication system that deterministic channels are determined based on the phase difference between paths. Also in this case, as described later, the local oscillator 110 may be provided independently for each antenna as in the case of the transmission end. The antennas to be used are not particularly limited and may be a parabola antenna or a horn antenna.

Next, a method of calculating the unitary matrixes V and U using the following channel matrix H considering a given antenna distance and highly sensitive antenna displacement will concretely be described with reference to formulas.

Channel matrix H of line-of-sight channels used here is represented by the following formula.

$$H = \begin{bmatrix} 1 & e^{-j\alpha} \cdot e^{j\Phi} \\ e^{-j\alpha} & 1 \cdot e^{j\Phi} \end{bmatrix} \quad \text{[Numeral 17]}$$

-continued where;

$$\alpha = \frac{\pi}{\gamma} \cdot \frac{d_R^2}{R} \text{ (at } d_T = d_R\text{)},$$

$\Phi$; phase change caused by displacement

In the following description, singular value diagonal matrix $\Lambda^{1/2}$ based on the eigenvalue is represented by the following formula.

$$\Lambda^{1/2} = \begin{bmatrix} \sqrt{2+2\cos\alpha} & 0 \\ 0 & \sqrt{2-2\cos\alpha} \end{bmatrix} \quad \text{[Numeral 18]}$$

$$= \begin{bmatrix} 2\cdot\cos\left(\frac{\alpha}{2}\right) & 0 \\ 0 & 2\cdot\sin\left(\frac{\alpha}{2}\right) \end{bmatrix}$$

$$= \begin{bmatrix} \left(e^{j\frac{\alpha}{2}} + e^{-j\frac{\alpha}{2}}\right) & 0 \\ 0 & -j\left(e^{j\frac{\alpha}{2}} - e^{-j\frac{\alpha}{2}}\right) \end{bmatrix} \because \begin{cases} 1+\cos\alpha = 2\cos^2\left(\frac{\alpha}{2}\right) \\ 1-\cos\alpha = 2\sin^2\left(\frac{\alpha}{2}\right) \end{cases}$$

Hereinafter, the unitary matrix V and unitary matrix U are calculated using the above channel matrix H in the order mentioned.

[Unitary Matrix V]

From [Numeral 17], the channel matrix H is represented by the following formula.

$$H = \begin{bmatrix} 1 & e^{-j\alpha}\cdot e^{j\Phi} \\ e^{-j\alpha} & 1\cdot e^{j\Phi} \end{bmatrix} \quad \text{[Numeral 19]}$$

It is assumed that an eigenvector corresponding to the channel matrix H is represented by the following formula.

$$\begin{bmatrix} a \\ b \end{bmatrix} \quad \text{[Numeral 20]}$$

In this case, the following formula is satisfied.

$$\Omega = H^H \cdot H = \begin{bmatrix} 2 & 2\cdot\cos\alpha\cdot e^{j\Phi} \\ 2\cdot\cos\alpha\cdot e^{-j\Phi} & 2 \end{bmatrix} \quad \text{[Numeral 21]}$$

Accordingly, the following formula can be obtained $$\begin{bmatrix} 2-\lambda & 2\cdot\cos\alpha\cdot e^{j\Phi} \\ 2\cdot\cos\alpha\cdot e^{-j\Phi} & 2-\lambda \end{bmatrix} \cdot \begin{bmatrix} a \\ b \end{bmatrix} = 0 \quad \text{[Numeral 22]}$$

From the [Numeral 22], the following formula can be obtained.

$$a = \frac{-2\cdot\cos\alpha\cdot e^{j\Phi}}{2-\lambda}b \quad \text{[Numeral 23]}$$
$$= \frac{\cos\alpha\cdot e^{j\Phi}}{\pm\cos\alpha}b$$
$$= \pm e^{j\Phi}\cdot b \because \lambda$$
$$= 2\pm 2\cos\alpha$$

$$\Omega \cdot v = \lambda \cdot v \quad \text{[Numeral 24]}$$

When both sides of the above formula are multiplied by $V^H$ from the left, the following formula is obtained.

$$v^H \cdot \Omega \cdot v = \lambda \quad \text{[Numeral 25]}$$

Then, orthogonal Vs are collected and the following formula is obtained.

$$V^H \cdot \Omega \cdot V = \Lambda \therefore \Omega = V \cdot \Lambda \cdot V^H \quad \text{[Numeral 26]}$$

$$H = U \cdot \Lambda^{1/2} \cdot V^H \quad \text{[Numeral 27]}$$

From the above formula, the following [Numeral 28] is satisfied.

$$\Omega = H^H \cdot H = V \cdot \Lambda^{1/2} \cdot U^H \cdot U \cdot \Lambda^{1/2} \cdot V^H = V \cdot \Lambda \cdot V^H \quad \text{[Numeral 28]}$$

Accordingly, the eigenvectors each represented the following [Numeral 29] are collected and thereby [Numeral 30] is obtained.

$$v = \begin{bmatrix} a \\ \pm a\cdot e^{-j\Phi} \end{bmatrix} \quad \text{[Numeral 29]}$$

$$V = \begin{bmatrix} x & y \\ x\cdot e^{-j\Phi} & -y\cdot e^{-j\Phi} \end{bmatrix} \quad \text{[Numeral 30]}$$

Here, the following [Numeral 31] is set as a special solution considering normalization and orthogonality.

$$x = \frac{-1}{\sqrt{2}}, \quad \text{[Numeral 31]}$$
$$y = \frac{1}{\sqrt{2}}$$

From [Numeral 31], the following formula is obtained.

$$V = \begin{bmatrix} \frac{-1}{\sqrt{2}} & \frac{1}{\sqrt{2}} \\ \frac{-e^{-j\Phi}}{\sqrt{2}} & \frac{-e^{-j\Phi}}{\sqrt{2}} \end{bmatrix} \therefore V^H = \begin{bmatrix} \frac{-1}{\sqrt{2}} & \frac{-e^{j\Phi}}{\sqrt{2}} \\ \frac{-1}{\sqrt{2}} & \frac{-e^{j\Phi}}{\sqrt{2}} \end{bmatrix} \quad \text{[Numeral 32]}$$

[Unitary Matrix U]

$$\Omega' H \cdot H^H = \begin{bmatrix} 1 & e^{-j\alpha}\cdot e^{j\Phi} \\ e^{-j\alpha} & 1\cdot e^{j\Phi} \end{bmatrix} \cdot \quad \text{[Numeral 33]}$$
$$\begin{bmatrix} 1 & e^{j\alpha} \\ e^{j\alpha}\cdot e^{-j\Phi} & 1\cdot e^{-j\Phi} \end{bmatrix}$$
$$= \begin{bmatrix} 2 & 2\cdot\cos\alpha \\ 2\cdot\cos\alpha & 2 \end{bmatrix}$$

It is assumed that an eigenvalue u is represented by the following [Numeral 34] based on the above [Numeral 33].

$$\begin{bmatrix} a \\ b \end{bmatrix}$$ [Numeral 34]

In this case, the following formula is satisfied.

$$\begin{bmatrix} 2-\lambda & 2 \cdot \cos\alpha \\ 2 \cdot \cos\alpha & 2-\lambda \end{bmatrix} \cdot \begin{bmatrix} a \\ b \end{bmatrix} = 0$$ [Numeral 35]

From the above, the following formula is obtained.

$$a = \frac{-2 \cdot \cos\alpha}{2-\lambda} b = \frac{\cos\alpha}{\pm \cos\alpha} b = \pm b \because \lambda = 2 \pm 2\cos\alpha$$ [Numeral 36]

$$\Omega' \cdot u = \lambda \cdot u$$ [Numeral 37]

When both sides of the above formula are multiplied by $u^H$ from the left, the following formula is obtained.

$$u^H \cdot \Omega' \cdot u = \lambda$$ [Numeral 38]

Then, orthogonal Us are collected and the following formula is obtained.

$$U^H \cdot \Omega' \cdot U = \Lambda \therefore \Omega' = U \cdot \Lambda \cdot U^H$$ [Numeral 39]

Accordingly, the eigenvectors each represented by the following [Numeral 40] are collected to obtain [Numeral 41].

$$u = \begin{bmatrix} a \\ \pm a \end{bmatrix}$$ [Numeral 40]

$$U = \begin{bmatrix} x & y \\ x & -y \end{bmatrix}$$ [Numeral 41]

Here, the following [Numeral 42] is set as a special solution considering normalization and orthogonality.

$$x = \frac{-e^{-j\frac{\alpha}{2}}}{\sqrt{2}}, y = \frac{j \cdot e^{-j\frac{\alpha}{2}}}{\sqrt{2}}$$ [Numeral 42]

From [Numeral 42], the following formula is obtained.

$$U = \begin{bmatrix} \frac{-e^{-j\frac{\alpha}{2}}}{\sqrt{2}} & \frac{j \cdot e^{-j\frac{\alpha}{2}}}{\sqrt{2}} \\ \frac{-e^{-j\frac{\alpha}{2}}}{\sqrt{2}} & \frac{-j \cdot e^{-j\frac{\alpha}{2}}}{\sqrt{2}} \end{bmatrix} \therefore U^H = \begin{bmatrix} \frac{-e^{j\frac{\alpha}{2}}}{\sqrt{2}} & \frac{j \cdot e^{j\frac{\alpha}{2}}}{\sqrt{2}} \\ \frac{-je^{j\frac{\alpha}{2}}}{\sqrt{2}} & \frac{j \cdot e^{j\frac{\alpha}{2}}}{\sqrt{2}} \end{bmatrix}$$ [Numeral 43]

For confirmation of the unitary matrixes V and U obtained by the above calculation, singular value decomposition of the channel matrix H is performed with V and U.

[Singular Value Decomposition of $H = U \cdot \Lambda \cdot V^H$]

$$H = U \cdot \Lambda^{1/2} \cdot V^H$$ [Numeral 44]

$$= \begin{bmatrix} \frac{-e^{-j\frac{\alpha}{2}}}{\sqrt{2}} & \frac{j \cdot e^{-j\frac{\alpha}{2}}}{\sqrt{2}} \\ \frac{-e^{-j\frac{\alpha}{2}}}{\sqrt{2}} & \frac{-j \cdot e^{-j\frac{\alpha}{2}}}{\sqrt{2}} \end{bmatrix} \cdot$$

$$\begin{bmatrix} (e^{j\frac{\alpha}{2}} + e^{-j\frac{\alpha}{2}}) & 0 \\ 0 & -j(e^{j\frac{\alpha}{2}} - e^{-j\frac{\alpha}{2}}) \end{bmatrix} \cdot$$

$$\begin{bmatrix} \frac{-1}{\sqrt{2}} & \frac{-e^{j\Phi}}{\sqrt{2}} \\ \frac{1}{\sqrt{2}} & \frac{-e^{j\Phi}}{\sqrt{2}} \end{bmatrix}$$

$$= \begin{bmatrix} \frac{-(1+e^{-j\alpha})}{\sqrt{2}} & \frac{(1-e^{-j\alpha})}{\sqrt{2}} \\ \frac{-(1+e^{-j\alpha})}{\sqrt{2}} & \frac{-(1-e^{-j\alpha})}{\sqrt{2}} \end{bmatrix} \cdot \begin{bmatrix} \frac{-1}{\sqrt{2}} & \frac{-e^{j\Phi}}{\sqrt{2}} \\ \frac{1}{\sqrt{2}} & \frac{-e^{j\Phi}}{\sqrt{2}} \end{bmatrix}$$

$$= \begin{bmatrix} 1 & e^{-j\alpha} \cdot e^{j\Phi} \\ e^{-j\alpha} & 1 \cdot e^{j\Phi} \end{bmatrix}$$

Thus, it can be understood that, as in the above example, it is possible to form orthogonal channels regardless of whether the optimum position (R=5000 m and $d_T=d_R=5$ m) is achieved or not.

However, in this case, the transmission qualities of the obtained virtual orthogonal channels are proportional from $2^{1/2}$ and $2^{1/2}$ to $(2+2\cos\alpha)^{1/2}$ and $(2-2\cos\alpha)^{1/2}$ and therefore differ from each other. In the block diagram of FIG. 1, virtual orthogonal channels where $(2+2\cos\alpha)^{1/2}$ and $(2-2\cos\alpha)^{1/2}$ denoted by thick arrows have been constructed is shown.

It should be noted that the above unitary matrix includes a variation in the channels caused due to external factors such as a positional variation (modeled in FIG. 1) of the antennas highly sensitive to a subtle change of weather condition such as wind or surrounding temperature. Thus, even when the above displacement in the highly sensitive antenna direction occurs, the unitary matrix acts so as to compensate for the displacement.

As described later, even in a configuration in which local oscillators are provided independently for respective antennas, the phase difference is modeled into the position variation of the antenna. Therefore, in the configuration of this example, the local oscillators may be provided independently. The feedback information for construction of the V matrix needs to be sent from the reception end to transmission end in this configuration. However, when a configuration is adopted in which the displacement is compensated only on the reception side, it is possible to eliminate the need to use the feedback information.

General virtual orthogonal channels including a case where the constructed paths have different widths has been described above. In the following, a singular point where the line-of-sight fixed channels have multiplicity conditions will be considered.

When the singular value analysis is carried out for the line-of-sight fixed channels where channels are deterministic, there exists an inter-antenna position at which an eigenvalue is a multiplicity condition to generate a singular point. Although the singular-value is uniquely determined, singular vectors are not unique. This state (Deficient matrix), which is particularly analytically troublesome, may cause significant transition of the singular vectors. However, by utilizing this phenomenon, various configurations can be possible. Various examples of configurations that take advantage of the characteristics will be described later. Before that, the principle will be described.

Here, an inter-antenna position where [Numeral 46] is satisfied with α in [Numeral 45] will be considered.

$$\alpha = 2\pi\left(\frac{d^2}{2R}\right)\Big/\gamma = \frac{\pi}{\gamma} \cdot \frac{d^2}{2R}$$ [Numeral 45]

$$e^{j\alpha} = \pm j$$ [Numeral 46]

Hereinafter, ±j is represented as j for simplicity.
The channel matrix H in this state is represented by the following formula.

$$H = \begin{bmatrix} 1 & e^{-j\alpha} \cdot e^{j\Phi} \\ e^{-j\alpha} & 1 \cdot e^{j\Phi} \end{bmatrix} \Rightarrow \begin{bmatrix} 1 & -j \cdot e^{j\Phi} \\ -j & 1 \cdot e^{j\Phi} \end{bmatrix}$$ [Numeral 47]

Here, the following formula is satisfied.

$$\Omega' = H \cdot H^H$$ [Numeral 48]
$$= \begin{bmatrix} 1 & -j \cdot e^{j\Phi} \\ -j & 1 \cdot e^{j\Phi} \end{bmatrix} \cdot \begin{bmatrix} 1 & j \\ j \cdot e^{-j\Phi} & 1 \cdot e^{-j\Phi} \end{bmatrix}$$
$$= \begin{bmatrix} 2 & 0 \\ 0 & 2 \end{bmatrix}$$

Accordingly, from the following [Numeral 49], eigen equation has a multiplicity condition.

$$\begin{vmatrix} 2-\lambda & 0 \\ 0 & 2-\lambda \end{vmatrix} = (2-\lambda)^2$$ [Numeral 49]

In this case, the following conversion can be possible.
The following formula is satisfied for a given eigenvector $u_1$ with respect to eigenvalue λ.

$$\Omega' \cdot u_1 = \lambda \cdot u_1$$ [Numeral 50]

Similarly, the following formula is satisfied for a given eigenvector $u_2$ with respect to eigenvalue λ.

$$\Omega' \cdot u_2 = \lambda \cdot u_2$$ [Numeral 51]

Accordingly, the following formula is satisfied for the linear sum of both the eigenvalues.

$$\Omega' \cdot (c_1 \cdot u_1 + c_2 \cdot u_2) = \lambda \cdot (c_1 \cdot u_1 + c_2 \cdot u_2)$$ [Numeral 52]

Thus, linear sum ($c_1 \cdot u_1 + c_2 \cdot u_2$) becomes an eigenvector.
It is assumed that an asymptotic eigenvector based on another condition is set for the multiplicity condition as the following [Numeral 53].

$$\begin{bmatrix} a \\ b \end{bmatrix}$$ [Numeral 53]

In this case, the following formula is satisfied.

$$\begin{bmatrix} 2-\lambda & 2\cdot\cos\alpha \\ 2\cdot\cos\alpha & 2-\lambda \end{bmatrix} \cdot \begin{bmatrix} a \\ b \end{bmatrix} = 0$$ [Numeral 54]

From the above, the following formula is obtained.

$$a = \frac{-2\cdot\cos\alpha}{2-\lambda}b = \frac{\cos\alpha}{\pm\cos\alpha}b = \pm b \quad \because \lambda = 2 \pm 2\cos\alpha$$ [Numeral 55]

$$\Omega' \cdot u = \lambda \cdot u$$ [Numeral 56]

When both sides of the above formula are multiplied by $u^H$ from the left, the following formula is obtained.

$$u^H \cdot \Omega' \cdot u = \lambda$$ [Numeral 57]

Then, orthogonal Us are collected and the following formula is obtained.

$$U^H \cdot \Omega' \cdot U = \Lambda \therefore \Omega' = U \cdot \Lambda \cdot U^H$$ [Numeral 58]

Here, the following formula is satisfied.

$$\Omega' = H \cdot H^H = U \cdot \Lambda^{1/2} \cdot V^H \cdot V \cdot \Lambda^{1/2} \cdot U^H = U \cdot \Lambda \cdot U^H$$ [Numeral 59]

Accordingly, the above eigenvectors represented by the following [Numeral 60] are collected to obtain [Numeral 61] with normalization and orthogonality taken into consideration.

$$u = \begin{bmatrix} a \\ \pm a \end{bmatrix}$$ [Numeral 60]

$$u_1 = \begin{bmatrix} x \\ x \end{bmatrix}, u_2 = \begin{bmatrix} x \\ -x \end{bmatrix}$$ [Numeral 61]

Here, when considering sum and difference as linear combination, the following formula is satisfied.

$$u_1 + u_2 = \begin{bmatrix} 2x \\ 0 \end{bmatrix}, u_1 - u_2 = \begin{bmatrix} 0 \\ 2x \end{bmatrix}$$ [Numeral 62]

From the above, the following formula is obtained.

$$U = \begin{bmatrix} 1 & 0 \\ 0 & 1 \end{bmatrix}$$ [Numeral 63]

Further, the following formula is satisfied.

$$H = U \cdot \Lambda^{1/2} \cdot V^H$$ [Numeral 64]
$$= \begin{bmatrix} 1 & -j \cdot e^{j\Phi} \\ -j & 1 \cdot e^{j\Phi} \end{bmatrix}$$
$$= \begin{bmatrix} 1 & 0 \\ 0 & 1 \end{bmatrix} \cdot \begin{bmatrix} \sqrt{2} & 0 \\ 0 & \sqrt{2} \end{bmatrix} \cdot V^H$$

Accordingly, the following formula is satisfied.

$$V^H = \begin{bmatrix} \frac{1}{\sqrt{2}} & 0 \\ 0 & \frac{1}{\sqrt{2}} \end{bmatrix} \cdot \begin{bmatrix} 1 & -j \cdot e^{j\Phi} \\ -j & 1 \cdot e^{j\Phi} \end{bmatrix}$$

$$= \begin{bmatrix} \frac{1}{\sqrt{2}} & \frac{-j \cdot e^{j\Phi}}{\sqrt{2}} \\ \frac{-j}{\sqrt{2}} & \frac{e^{j\Phi}}{\sqrt{2}} \end{bmatrix}$$

[Numeral 65]

As a trial, when the channel matrix H is calculated using the obtained U, $\Lambda^{1/2}$, and $V^H$, the following formula is satisfied.

$$H = U \cdot \Lambda^{1/2} \cdot V^H \quad \text{[Numeral 66]}$$

$$= \begin{bmatrix} 1 & 0 \\ 0 & 1 \end{bmatrix} \cdot \begin{bmatrix} \sqrt{2} & 0 \\ 0 & \sqrt{2} \end{bmatrix} \cdot \begin{bmatrix} \frac{1}{\sqrt{2}} & \frac{-j \cdot e^{j\Phi}}{\sqrt{2}} \\ \frac{-j}{\sqrt{2}} & \frac{e^{j\Phi}}{\sqrt{2}} \end{bmatrix}$$

$$= \begin{bmatrix} 1 & -j \cdot e^{j\Phi} \\ -j & e^{j\Phi} \end{bmatrix}$$

As can be seen from [Numeral 66], the channel matrix H is effected. However, this is merely an example, and various decomposition methods can be considered based on the same approach, depending on the singular point corresponding to the multiplicity condition.

Hereinafter, various examples of the present invention will be described.

First Example

As a first example of the present invention, a configuration example in which the matrix calculation is performed only on the transmission side will be described.

[Singular Value Diagonal Matrix $\Lambda^{1/2}$]

In this example, the virtual orthogonal channels have the same value, so that singular value diagonal matrix $\Lambda^{1/2}$ is represented by the following formula.

$$\Lambda^{1/2} = \begin{bmatrix} \sqrt{\lambda_1} & 0 \\ 0 & \sqrt{\lambda_2} \end{bmatrix} \quad \text{[Numeral 67]}$$

$$= \begin{bmatrix} \sqrt{2 + 2\cos\alpha} & 0 \\ 0 & \sqrt{2 - 2\cos\alpha} \end{bmatrix}$$

$$= \begin{bmatrix} \sqrt{2} & 0 \\ 0 & \sqrt{2} \end{bmatrix}$$

[Channel Matrix H]

In this example, the channel matrix H is represented by the following formula.

$$H = U \cdot \Lambda^{1/2} \cdot V^H \quad \text{[Numeral 68]}$$

$$= \begin{bmatrix} 1 & 0 \\ 0 & 1 \end{bmatrix} \cdot \begin{bmatrix} \sqrt{2} & 0 \\ 0 & \sqrt{2} \end{bmatrix} \cdot \begin{bmatrix} \frac{1}{\sqrt{2}} & \frac{-j \cdot e^{j\Phi}}{\sqrt{2}} \\ \frac{-j}{\sqrt{2}} & \frac{e^{j\Phi}}{\sqrt{2}} \end{bmatrix}$$

$$\therefore V = \begin{bmatrix} V_{11} & V_{12} \\ V_{21} & V_{22} \end{bmatrix} = \begin{bmatrix} \frac{1}{\sqrt{2}} & \frac{j}{\sqrt{2}} \\ \frac{j \cdot e^{-j\Phi}}{\sqrt{2}} & \frac{e^{-j\Phi}}{\sqrt{2}} \end{bmatrix}$$

$$U^H = \begin{bmatrix} U_{11} & U_{12} \\ U_{21} & U_{22} \end{bmatrix} = \begin{bmatrix} 1 & 0 \\ 0 & 1 \end{bmatrix}$$

where;

$$\alpha = 2\pi \left( \frac{d_R^2}{2R} \right) / \gamma = \frac{\pi}{\gamma} \cdot \frac{d_R^2}{R} = \frac{\pi}{2}$$

Figure 2:
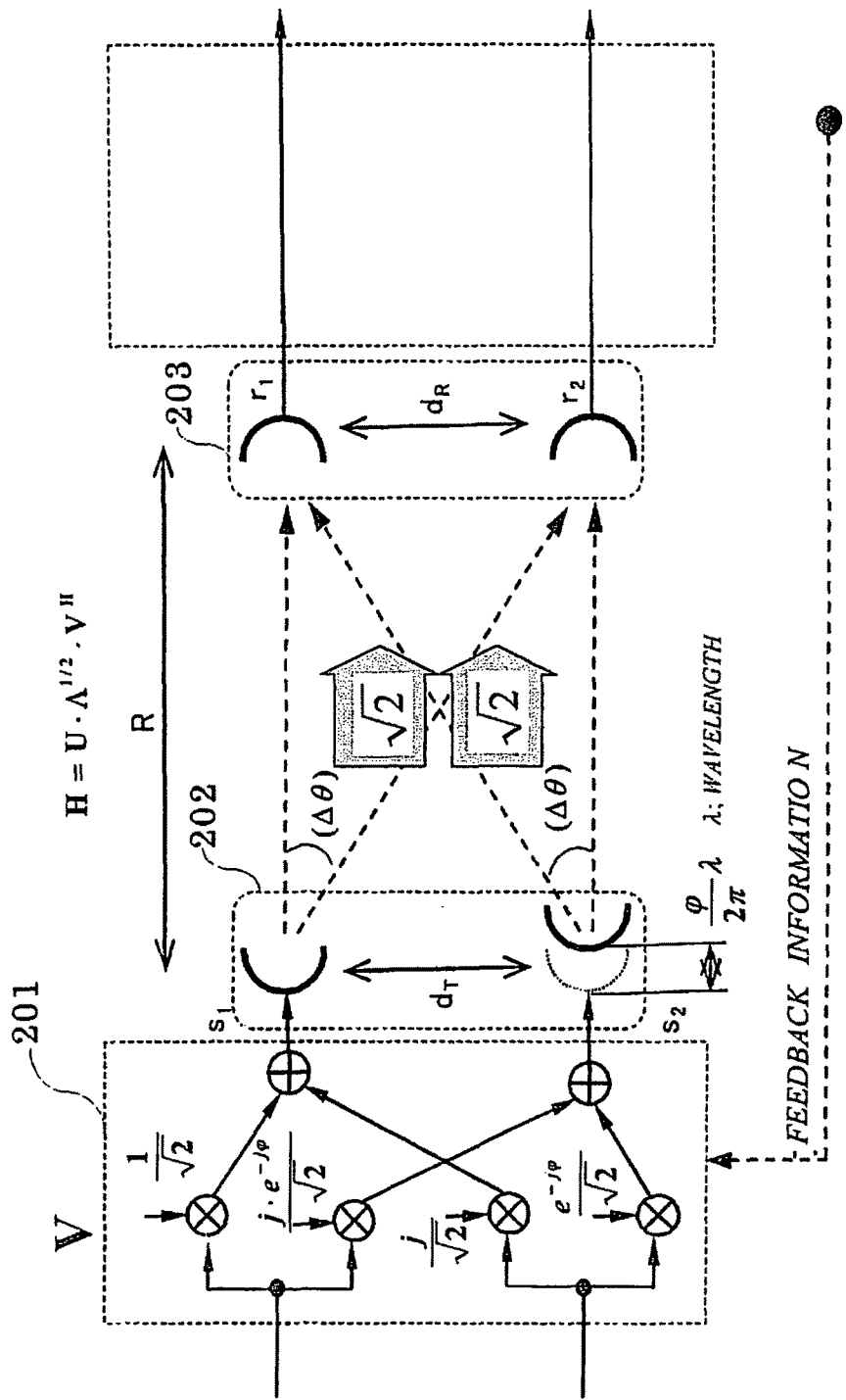
FIG. 2 A view showing an example of the MIMO communication system according to a first example of the present invention, where calculation based on a unitary matrix V is performed only on the transmission side.

A configuration obtained based on the above result is shown in FIG. 2.

In FIG. 2, transmission signals processed by a transmission side matrix calculation processing section 201 based on the unitary matrix V are transmitted from a fixed antenna section 202 including a plurality of antennas as $s_1$ and $s_2$. The notation of the $s_1$ and $s_2$ is based on equivalent baseband representation, and the frequency conversion processing is omitted here for avoiding complexity.

The signals thus transmitted are received by a reception side fixed antenna section 203 including a plurality of antennas as $r_1$ and $r_2$. The notation of the $r_1$ and $r_2$ is based on equivalent baseband representation, and the frequency conversion processing into a signal of a baseband frequency is omitted here. The point is that receiving side matrix calculation processing based on the unitary matrix U is not performed at all, but all matrix calculations are done on the transmission side.

As can be seen from [Numeral 68], in the case where the matrix calculation is performed only on the transmission side, the matrix includes a variation in the channels caused due to external factors such as a positional variation (modeled by $\Phi$ in FIG. 2) of the antennas highly sensitive to a subtle change of weather condition such as wind or surrounding temperature. Thus, even when the displacement in the highly sensitive antenna direction occurs, the unitary matrix acts so as to compensate for the displacement. In this configuration, the feedback information for construction of the V matrix needs to be sent from the reception end to transmission end. The thick arrows of FIG. 2 denote virtual orthogonal channels in which channel qualities thereof are proportional to $2^{1/2}$ and $2^{1/2}$. The antennas to be used are not particularly limited and may be a parabola antenna or a horn antenna.

Second Example

As a second example of the present invention, a configuration example in which the matrix calculation is performed only on the transmission side in the virtual orthogonal channels having paths with different widths will be described.

[Singular Value Diagonal Matrix $\Lambda^{1/2}$]

In this example, the virtual orthogonal channels have different values, so that singular value diagonal matrix $\Lambda^{1/2}$ is represented by the following formula.

$$\Lambda^{1/2} = \begin{bmatrix} \sqrt{\lambda_1} & 0 \\ 0 & \sqrt{\lambda_2} \end{bmatrix}$$

$$= \begin{bmatrix} \sqrt{2+2\cos\alpha} & 0 \\ 0 & \sqrt{2-2\cos\alpha} \end{bmatrix}$$

$$= \begin{bmatrix} 2\cos(\frac{\alpha}{2}) & 0 \\ 0 & 2\sin(\frac{\alpha}{2}) \end{bmatrix}$$

$$= \begin{bmatrix} (e^{j\frac{\alpha}{2}} + e^{-j\frac{\alpha}{2}}) & 0 \\ 0 & -j(e^{j\frac{\alpha}{2}} - e^{-j\frac{\alpha}{2}}) \end{bmatrix}$$

[Numeral 69]

[Channel Matrix H]

In the present example, the channel matrix H is represented by the following formula.

$$H = U \cdot \Lambda^{1/2} \cdot V^H \qquad \text{[Numeral 70]}$$

$$= \begin{bmatrix} 1 & e^{-j\alpha} \cdot e^{j\Phi} \\ e^{-j\alpha} & 1 \cdot e^{j\Phi} \end{bmatrix}$$

$$= \begin{bmatrix} 1 & 0 \\ 0 & 1 \end{bmatrix} \cdot \begin{bmatrix} (e^{j\frac{\alpha}{2}} + e^{-j\frac{\alpha}{2}}) & 0 \\ 0 & -j(e^{j\frac{\alpha}{2}} - e^{-j\frac{\alpha}{2}}) \end{bmatrix} \cdot V^H$$

Accordingly, the following formula is satisfied.

$$V^H = \qquad \text{[Numeral 71]}$$

$$\begin{bmatrix} (e^{j\frac{\alpha}{2}} + e^{-j\frac{\alpha}{2}}) & 0 \\ 0 & -j(e^{j\frac{\alpha}{2}} - e^{-j\frac{\alpha}{2}}) \end{bmatrix}^{-1} \cdot \begin{bmatrix} 1 & e^{-j\alpha} \cdot e^{j\Phi} \\ e^{-j\alpha} & 1 \cdot e^{j\Phi} \end{bmatrix}$$

Here, the following formula is satisfied.

$$\frac{1}{(e^{j\frac{\alpha}{2}} + e^{-j\frac{\alpha}{2}})} = \frac{1}{2\cos(\frac{\alpha}{2})}, \qquad \text{[Numeral 72]}$$

$$\frac{1}{-j(e^{j\frac{\alpha}{2}} - e^{-j\frac{\alpha}{2}})} = \frac{1}{2\sin(\frac{\alpha}{2})}$$

Accordingly, the following formula is obtained.

$$V^H = \begin{bmatrix} \frac{1}{2\cos(\frac{\alpha}{2})} & 0 \\ 0 & \frac{1}{2\sin(\frac{\alpha}{2})} \end{bmatrix} \cdot \begin{bmatrix} 1 & e^{-j\alpha} \cdot e^{j\Phi} \\ e^{-j\alpha} & 1 \cdot e^{j\Phi} \end{bmatrix} \qquad \text{[Numeral 73]}$$

$$= \begin{bmatrix} \frac{1}{2\cos(\frac{\alpha}{2})} & \frac{e^{-j\alpha} \cdot e^{j\Phi}}{2\cos(\frac{\alpha}{2})} \\ \frac{e^{-j\alpha}}{2\sin(\frac{\alpha}{2})} & \frac{e^{j\Phi}}{2\sin(\frac{\alpha}{2})} \end{bmatrix}$$

Here, the square norm of the vector is represented by the following formula.

$$\frac{1}{4\cos^2(\frac{\alpha}{2})} + \frac{1}{4\sin^2(\frac{\alpha}{2})} = \frac{4}{16\sin^2(\frac{\alpha}{2})\cdot\cos^2(\frac{\alpha}{2})} \qquad \text{[Numeral 74]}$$

$$= \frac{1}{2\cdot\sin^2(\alpha)}$$

Thus, the $V^H$ is no longer a unitary matrix.

Therefore, in order to calculate the matrix V, inverse matrix calculation is required. As a trial, when the channel matrix H is calculated using the obtained matrixes U, $\Lambda^{1/2}$, and $V^H$, the following formula is satisfied.

$$H = U \cdot \Lambda^{1/2} \cdot V^H \qquad \text{[Numeral 75]}$$

$$= \begin{bmatrix} 1 & 0 \\ 0 & 1 \end{bmatrix} \cdot \begin{bmatrix} 2\cos(\frac{\alpha}{2}) & 0 \\ 0 & 2\sin(\frac{\alpha}{2}) \end{bmatrix} \cdot$$

$$\begin{bmatrix} \frac{1}{2\cos(\frac{\alpha}{2})} & \frac{e^{-j\alpha} \cdot e^{j\Phi}}{2\cos(\frac{\alpha}{2})} \\ \frac{e^{-j\alpha}}{2\sin(\frac{\alpha}{2})} & \frac{e^{j\kappa}}{2\sin(\frac{\alpha}{2})} \end{bmatrix}$$

$$= \begin{bmatrix} 1 & e^{-j\alpha} \cdot e^{j\Phi} \\ e^{-j\alpha} & 1 \cdot e^{j\Phi} \end{bmatrix}$$

As can be seen from the above, the channel matrix H is effected.

Next, inverse matrix V of $V_H$ is considered. A given matrix A represented by the following formula is assumed.

$$A = \begin{bmatrix} a_{11} & a_{12} \\ a_{21} & a_{22} \end{bmatrix} \qquad \text{[Numeral 76]}$$

The inverse matrix $A^{-1}$ of the above matrix A is represented by the following formula.

$$A^{-1} = \frac{1}{a_{11}a_{22} - a_{12}a_{21}} \begin{bmatrix} a_{22} & -a_{12} \\ -a_{21} & a_{11} \end{bmatrix} \qquad \text{[Numeral 77]}$$

Accordingly, the following formula is obtained.

$$V = \begin{bmatrix} \dfrac{1}{2\cdot\cos(\frac{\alpha}{2})} & \dfrac{e^{-j\alpha}\cdot e^{j\Phi}}{2\cdot\cos(\frac{\alpha}{2})} \\ \dfrac{e^{-j\alpha}}{2\cdot\sin(\frac{\alpha}{2})} & \dfrac{e^{j\Phi}}{2\cdot\sin(\frac{\alpha}{2})} \end{bmatrix}$$ [Numeral 78]

$$= \dfrac{1}{\dfrac{1}{2\cdot\cos(\frac{\alpha}{2})}\cdot\dfrac{e^{j\Phi}}{2\cdot\sin(\frac{\alpha}{2})} - \dfrac{e^{-j\alpha}\cdot e^{j\Phi}}{2\cdot\cos(\frac{\alpha}{2})}\cdot\dfrac{e^{-j\alpha}}{2\cdot\sin(\frac{\alpha}{2})}} \begin{bmatrix} \dfrac{e^{j\Phi}}{2\cdot\sin(\frac{\alpha}{2})} & -\dfrac{e^{-j\alpha}\cdot e^{j\Phi}}{2\cdot\cos(\frac{\alpha}{2})} \\ -\dfrac{e^{-j\alpha}}{2\cdot\sin(\frac{\alpha}{2})} & \dfrac{1}{2\cdot\cos(\frac{\alpha}{2})} \end{bmatrix}$$

$$= \dfrac{2\cdot(2\cdot\sin(\frac{\alpha}{2})\cdot\cos(\frac{\alpha}{2}))}{1 - e^{-j2\alpha}} \begin{bmatrix} \dfrac{1}{2\cdot\sin(\frac{\alpha}{2})} & -\dfrac{e^{-j\alpha}}{2\cdot\cos(\frac{\alpha}{2})} \\ -\dfrac{e^{-j\alpha}\cdot e^{-j\Phi}}{2\cdot\sin(\frac{\alpha}{2})} & \dfrac{e^{-j\Phi}}{2\cdot\cos(\frac{\alpha}{2})} \end{bmatrix}$$

$$= \dfrac{2}{1 - e^{-j2\alpha}} \begin{bmatrix} \cos(\frac{\alpha}{2}) & -e^{-j\alpha}\sin(\frac{\alpha}{2}) \\ -e^{-j\Phi}e^{-j\alpha}\cos(\frac{\alpha}{2}) & e^{-j\Phi}\sin(\frac{\alpha}{2}) \end{bmatrix}$$

$$= \dfrac{2}{e^{j\alpha} - e^{-j\alpha}} \begin{bmatrix} e^{j\alpha}\cos(\frac{\alpha}{2}) & -\sin(\frac{\alpha}{2}) \\ -e^{-j\Phi}\cos(\frac{\alpha}{2}) & e^{-j\Phi}e^{j\alpha}\sin(\frac{\alpha}{2}) \end{bmatrix}$$

$$= \dfrac{1}{j\sin\alpha} \begin{bmatrix} e^{j\alpha}\cos(\frac{\alpha}{2}) & -\sin(\frac{\alpha}{2}) \\ -e^{-j\Phi}\cos(\frac{\alpha}{2}) & e^{-j\Phi}e^{j\alpha}\sin(\frac{\alpha}{2}) \end{bmatrix}$$

$$= \begin{bmatrix} -je^{j\alpha}\dfrac{\cos(\alpha/2)}{\sin\alpha} & \dfrac{j\sin(\alpha/2)}{\sin\alpha} \\ je^{-j\Phi}\dfrac{\cos(\alpha/2)}{\sin\alpha} & -je^{-j\Phi}e^{j\alpha}\dfrac{\sin(\alpha/2)}{\sin\alpha} \end{bmatrix}$$

where; $\alpha = 2\pi\left(\dfrac{d_R^2}{2R}\right)\Big/\gamma = \dfrac{\pi}{\gamma}\cdot\dfrac{d_R^2}{R}$ A configuration obtained based on the above result is shown in FIG. 3.

Figure 3:
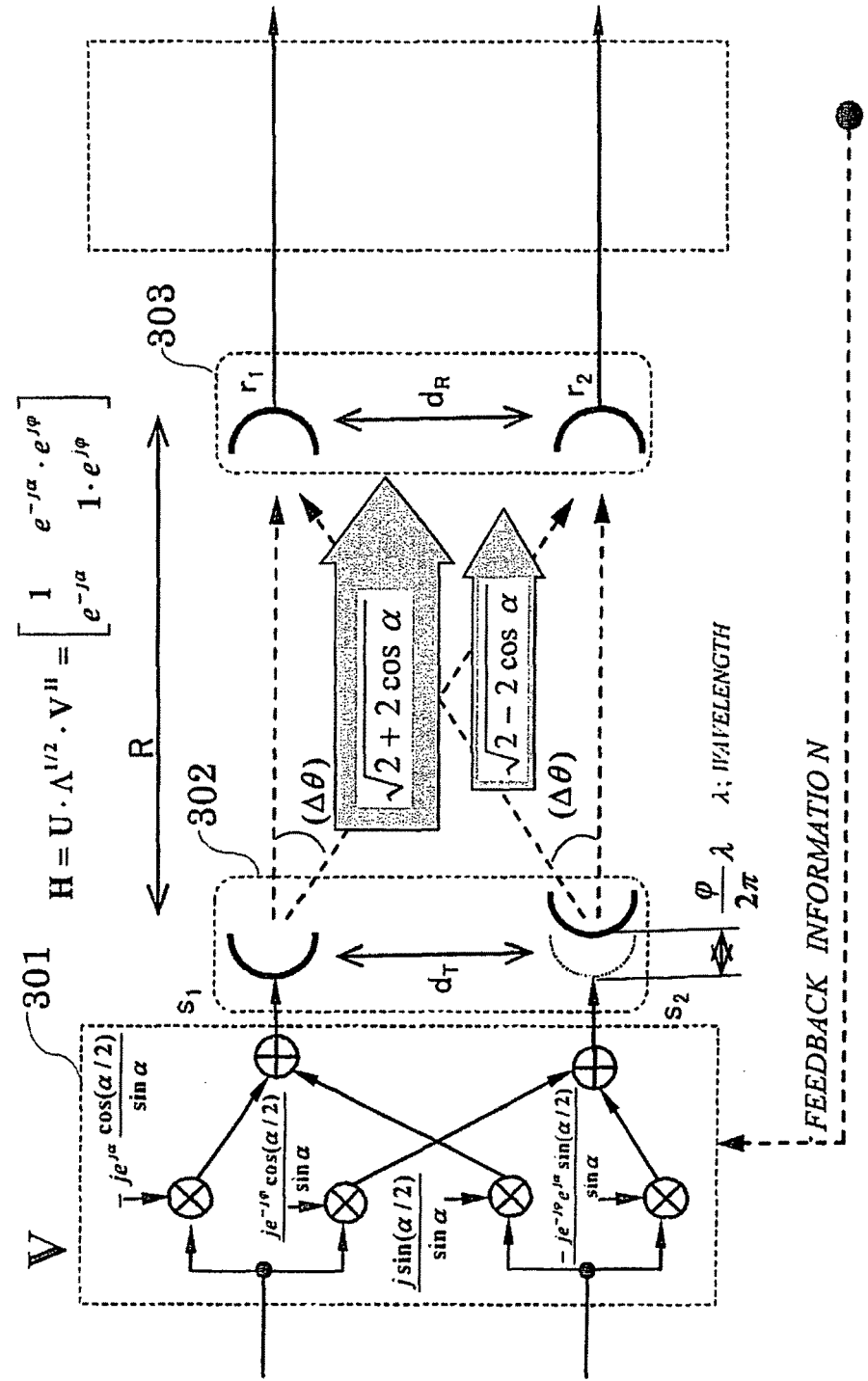
FIG. 3 A view showing an example of the MIMO communication system according to a second example of the present invention, where matrix calculation is performed only on the transmission side and where virtual orthogonal channels have different values.

In FIG. 3, transmission signals processed by a transmission side matrix calculation processing section 301 based on the matrix V are transmitted from a fixed antenna section 302 including a plurality of antennas as $s_1$ and $s_2$. The notation of the $s_1$ and $s_2$ is based on equivalent baseband representation, and the frequency conversion processing is omitted here for avoiding complexity.

The signals thus transmitted are received by a reception side fixed antenna section 303 including a plurality of antennas as $r_1$ and $r_2$. The notation of the $r_1$ and $r_2$ is based on equivalent baseband representation, and the frequency conversion processing into a signal of a baseband frequency is omitted here. The point is that receiving side matrix calculation processing based on the matrix U is not performed at all, but all matrix calculations are done on the transmission side.

As can be seen from [Numeral 78], in the case where the matrix calculation is performed only on the transmission side, the matrix includes a variation between the channels caused due to external factors such as a positional variation (modeled by Φ in FIG. 3) of the antennas highly sensitive to a subtle change of weather condition such as wind or surrounding temperature. Thus, even when the displacement in the highly sensitive antenna direction occurs, the matrix on the transmission side acts so as to compensate for the displacement. In this configuration, the feedback information for construction of the V matrix needs to be sent from the reception end to transmission end. The antennas to be used are not particularly limited and may be a parabola antenna or a horn antenna.

Thus, it can be understood that it is possible to form orthogonal channels regardless of whether the optimum position ($R=5000$ m and $d_T=d_R=5$ m) is achieved or not and by the matrix calculation processing only on the transmission side.

Figure 20:
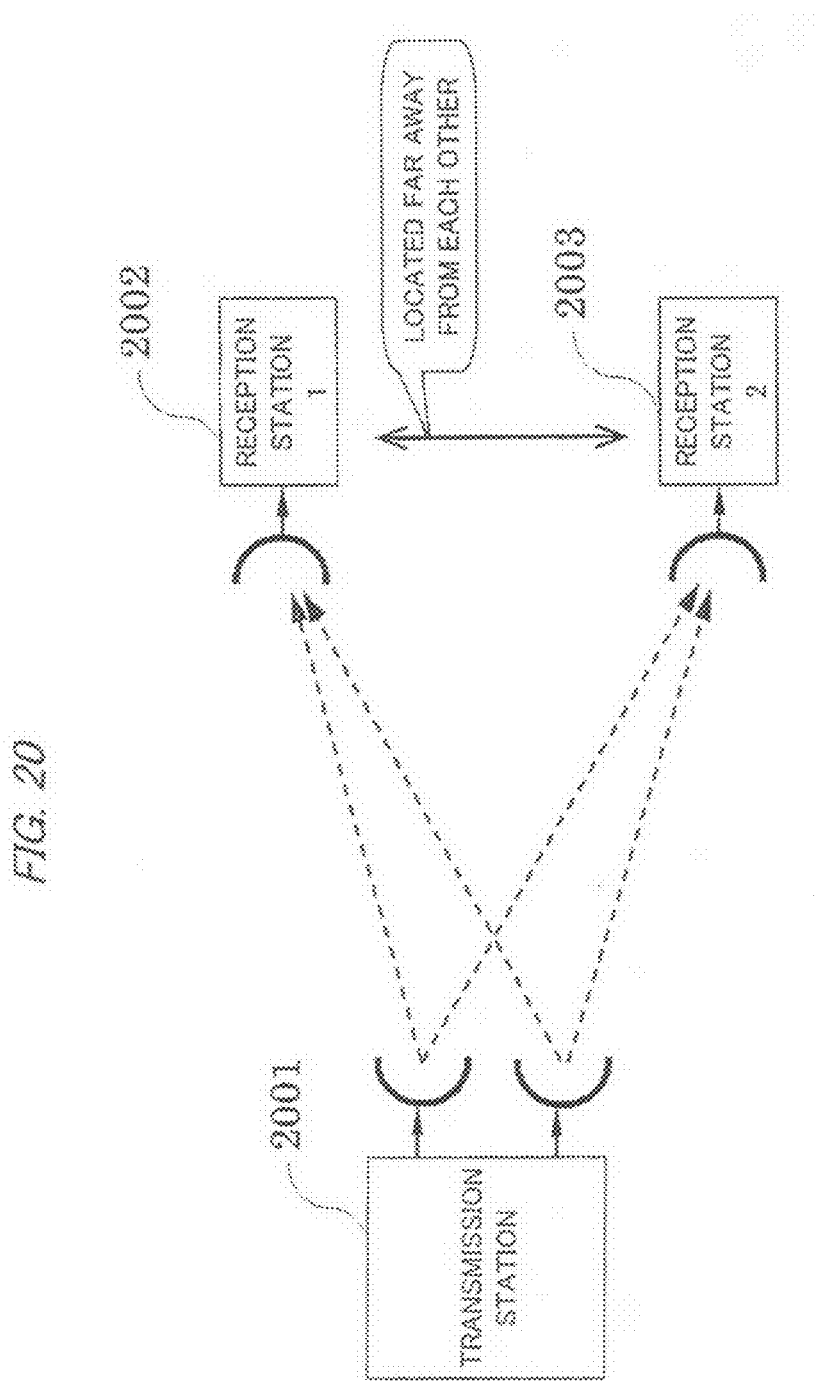
FIG. 20 A view showing an application example of a configuration in which matrix calculation is performed only on transmission side.

An application of the configuration in which the matrix calculation is performed only on the transmission side is shown in FIG. 20. As shown in FIG. 20, a plurality of antennas are provided in a transmission station 2001 located near a backbone network, and one antenna is provided in reception stations 2002 and 2003, located near a user network, respectively. The reception station 2001 and reception station 2003 are located far away from each other and, therefore, matrix calculation cannot be performed. On the other hand, the transmission station 2001 can perform the matrix calculation. Thus, it is possible to apply the configuration in which the matrix calculation is performed only on the transmission side to the configuration of FIG. 20. Such a concept in "one station to many stations" configuration may be applied to "many stations to one station" configuration to be described later as a configuration in which the matrix calculation is performed only on the reception side.

Third Example

As a third example of the present invention, a configuration example in which the unitary matrix calculation is performed only on the reception side and local oscillators are provided independently for respective antennas on the transmission side will be described.

This third configuration has the following features: the feedback information to be sent from the reception end to transmission end is not required; local oscillators may be provided independently for respective antennas on the transmission end; and exactly the same characteristics as those of the SVD method can be shown.

[Singular Value Diagonal Matrix $\Lambda^{1/2}$]

In this example, the virtual orthogonal channels have the same value, so that singular value diagonal matrix $\Lambda^{1/2}$ is represented by the following formula.

$$\Lambda^{1/2} = \begin{bmatrix} \sqrt{\lambda_1} & 0 \\ 0 & \sqrt{\lambda_2} \end{bmatrix}$$ [Numeral 79]

$$= \begin{bmatrix} \sqrt{2 + 2\cos\alpha} & 0 \\ 0 & \sqrt{2 - 2\cos\alpha} \end{bmatrix}$$

$$= \begin{bmatrix} \sqrt{2} & 0 \\ 0 & \sqrt{2} \end{bmatrix}$$

[Channel Matrix H]

In this example, the channel matrix H is represented by the following formula.

$$H = U\cdot\Lambda^{1/2}\cdot V^H = U\cdot\begin{bmatrix} \sqrt{2} & 0 \\ 0 & \sqrt{2} \end{bmatrix}\cdot\begin{bmatrix} 1 & 0 \\ 0 & 1 \end{bmatrix}$$ [Numeral 80]

where; $\Phi = \Phi_L + \Phi_A$

-continued $$\therefore U = \begin{bmatrix} U_{11} & U_{12} \\ U_{21} & U_{22} \end{bmatrix}$$

$$= \begin{bmatrix} 1 & -j \cdot e^{j\Phi} \\ -j & 1 \cdot e^{j\Phi} \end{bmatrix} \cdot \begin{bmatrix} 1/\sqrt{2} & 0 \\ 0 & 1/\sqrt{2} \end{bmatrix}$$

$$= \begin{bmatrix} 1/\sqrt{2} & -j \cdot e^{j\Phi}/\sqrt{2} \\ -j/\sqrt{2} & e^{j\Phi}/\sqrt{2} \end{bmatrix}$$

$$\therefore U^H = \begin{bmatrix} 1/\sqrt{2} & j/\sqrt{2} \\ j \cdot e^{-j\Phi}/\sqrt{2} & e^{-j\Phi}/\sqrt{2} \end{bmatrix} \text{ where;}$$

$$\alpha = 2\pi \left( \frac{d_R^2}{2R} \right) \Big/ \gamma = \frac{\pi}{\gamma} \cdot \frac{d_R^2}{R} = \frac{\pi}{2}$$

Figure 4:
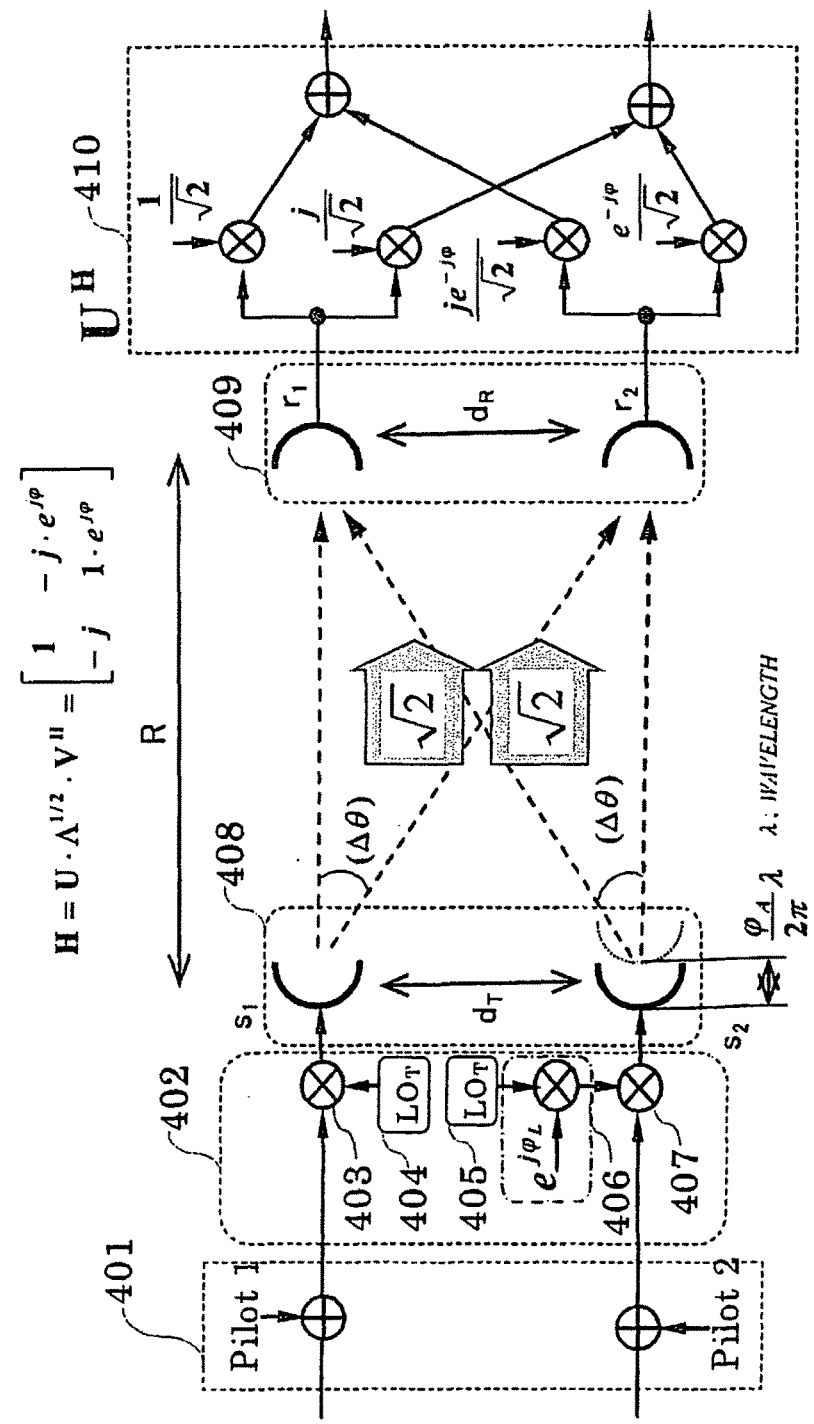
FIG. 4 A view showing an example of the MIMO communication system according to a third example of the present invention, where calculation based on a unitary matrix is performed only on the reception side and where local oscillators are provided independently for respective antennas on the transmission side.

A configuration obtained based on the above result is shown in FIG. 4.

As shown in FIG. 4, transmission side matrix calculation processing based on the unitary matrix V is not performed at all, but all matrix calculations are done on the reception side. As can be seen from [Numeral 80], in the case where the matrix calculation is performed only on the reception side, the matrix includes a variation between the channels caused due to external factors such as a positional variation (modeled by $\Phi_A$ in FIG. 4) of the antennas highly sensitive to a subtle change of weather condition such as wind or surrounding temperature. Thus, even when the displacement in the highly sensitive antenna direction occurs, the unitary matrix acts so as to compensate for the displacement.

Further, in this configuration, antenna interval must be widened in view of a frequency to be used in the fixed point microwave communication system and, correspondingly, local oscillators are installed near the antennas. That is, the point that the local oscillators are provided independently for respective antennas on the transmission side is a feature of the third configuration.

In FIG. 4, transmission signal are added with pilot signals of respective antennas by a pilot signal generation section 401, frequency converted into signals of a radio frequency by a transmission side frequency conversion section 402 including local oscillators 404 and 405, mixers 403 and 407, and then transmitted from a fixed antenna section 408 including a plurality of antennas as $s_1$ and $s_2$. The notation of the $s_1$ and $s_2$ is based on equivalent baseband representation.

It should be noted here that the local oscillators 404 and 405 are used independently for respective antennas. Thus, carrier synchronization is not achieved between carriers from the respective antennas, resulting in generation of phase noise $\Phi_L$. Reference numeral 406 is the modeling of the phase noise $\Phi_L$. The signals thus transmitted are received by a reception side fixed antenna section 409 including a plurality of antennas as $r_1$ and $r_2$. The notation of the $r_1$ and $r_2$ is based on equivalent baseband representation, and the frequency conversion processing into a signal of a baseband frequency is omitted here. The reception signals $r_1$ and $r_2$ are processed by a reception side matrix calculation processing section 410 based on the unitary matrix U, whereby signal separation/detection in MIMO is completed. It should be noted here that transmission side matrix calculation processing based on the unitary matrix V is not performed at all, but all matrix calculations are done on the reception side.

As can be seen from [Numeral 80], in the case where the matrix calculation is performed only on the reception side, the matrix includes a variation between the channels caused due to external factors such as a positional variation (modeled by $\Phi_A$ in FIG. 4) of the antennas highly sensitive to a subtle change of weather condition such as wind or surrounding temperature. Further, the matrix includes the phase noise due to absence of synchronization between carriers. Thus, even when the displacement in the highly sensitive antenna direction or phase rotation between carriers occurs, the unitary matrix acts so as to compensate for the displacement or phase rotation. The greatest merit of the third example is that it is not necessary to send the feedback information for construction of the V matrix from the reception end to transmission end. The thick arrows of FIG. 4 denote virtual orthogonal channels in which channel qualities thereof are proportional to $2^{1/2}$ and $2^{1/2}$. The antennas to be used are not particularly limited and may be a parabola antenna or a horn antenna.

As described above, even in the configuration in which the unitary matrix calculation is not performed on the transmission end, the orthogonal channels can be formed. Further, even when the local oscillators are provided independently for respective antennas on the transmission end, if phase difference $\Phi = \Phi_L + \Phi_A$ can be detected by pilot signals, the virtual orthogonal channels can be formed. The orthogonal channels thus formed are not influenced by the phase difference. Further, the feedback from the reception end to transmission end is not required. Since the matrix used is the unitary matrix, exactly the same characteristics as those of the SVD method can be shown.

Fourth Example

As a fourth example of the present invention, a configuration example in which virtual orthogonal channels having the same width are formed, the unitary calculation is performed only on the reception side, and local oscillators are provided independently for respective antennas on both the transmission and reception sides will be described.

This fourth configuration has the following features: the feedback information to be sent from the reception end to transmission end is not required; local oscillators may be provided independently for respective antennas on both the transmission and reception sides; and exactly the same characteristics as those of the SVD method can be shown. Further, analysis is made based on a fact that a significant phase rotation due to movement in the antenna direction highly sensitive to a subtle change of weather condition such as wind or surrounding temperature can be traced to the same modeling as a phase variation in the local oscillators provided for respective antennas both on the transmission and reception sides. Note that the above theoretical analysis analytically reveals that the above increase in channel capacity can be achieved even when such a displacement in the highly sensitive antenna direction occurs.

[Singular Value Diagonal Matrix $\Lambda^{1/2}$]

In this example, singular value diagonal matrix $\Lambda^{1/2}$ is represented by the following formula.

$$\Lambda^{1/2} = \begin{bmatrix} \sqrt{\lambda_1} & 0 \\ 0 & \sqrt{\lambda_2} \end{bmatrix} \quad \text{[Numeral 81]}$$

$$= \begin{bmatrix} \sqrt{2 + 2\cos\alpha} & 0 \\ 0 & \sqrt{2 - 2\cos\alpha} \end{bmatrix}$$

$$= \begin{bmatrix} \sqrt{2} & 0 \\ 0 & \sqrt{2} \end{bmatrix}$$

[Channel Matrix H]

In this example, the channel matrix H is represented by the following formula.

$$H = \begin{bmatrix} 1 & -j \cdot e^{j\Phi} \\ -j \cdot e^{j\phi} & 1 \cdot e^{j(\Phi+\phi)} \end{bmatrix}$$ [Numeral 82]

$$= U \cdot \Lambda^{1/2} \cdot V^H$$

$$= U \cdot \begin{bmatrix} \sqrt{2} & 0 \\ 0 & \sqrt{2} \end{bmatrix} \cdot \begin{bmatrix} 1 & 0 \\ 0 & 1 \end{bmatrix} \text{ where; } \begin{cases} \Phi = \Phi_L + \Phi_A \\ \phi = \phi_L + \phi_A \end{cases}$$

$$\therefore U = \begin{bmatrix} U_{11} & U_{12} \\ U_{21} & U_{22} \end{bmatrix}$$

$$= \begin{bmatrix} 1 & -j \cdot e^{j\Phi} \\ -j \cdot e^{j\phi} & 1 \cdot e^{j(\Phi+\phi)} \end{bmatrix} \cdot \begin{bmatrix} 1/\sqrt{2} & 0 \\ 0 & 1/\sqrt{2} \end{bmatrix}$$

$$= \begin{bmatrix} 1/\sqrt{2} & -j \cdot e^{j\Phi}/\sqrt{2} \\ -j \cdot e^{j\phi}/\sqrt{2} & e^{j(\Phi+\phi)}/\sqrt{2} \end{bmatrix}$$

$$\therefore U^H = \begin{bmatrix} 1/\sqrt{2} & j \cdot e^{j\phi}/\sqrt{2} \\ j \cdot e^{j\Phi}/\sqrt{2} & e^{-j(\Phi+\phi)}/\sqrt{2} \end{bmatrix} \text{ where;}$$

$$\alpha = 2\pi \left(\frac{d_R^2}{2R}\right) \Big/ \gamma = \frac{\pi}{\gamma} \cdot \frac{d_R^2}{R} = \frac{\pi}{2}$$

Figure 5:
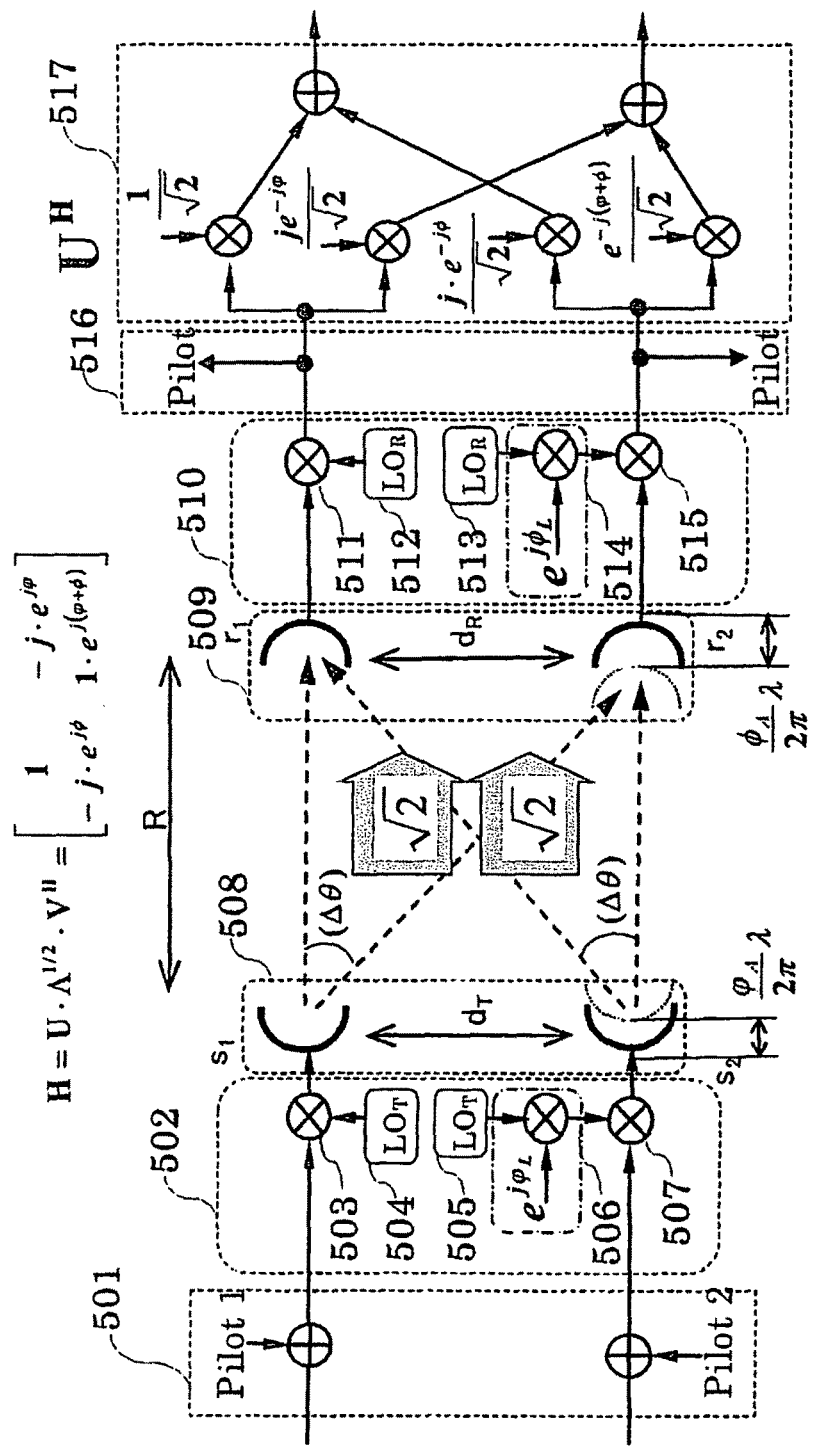
FIG. 5 A view showing an example of the MIMO communication system according to a fourth example of the present invention, where calculation based on a unitary matrix is performed only on the reception side and where local oscillators are provided independently for respective antennas both on the transmission and reception sides.

A configuration obtained based on the above result is shown in FIG. 5.

As shown in FIG. 5, transmission side matrix calculation processing based on the unitary matrix V is not performed at all, but all matrix calculations are done on the reception side. Even in the case where the matrix calculation is performed only on the reception side, the matrix includes a variation between the channels caused due to external factors such as a positional variation (modeled by $\Phi_A$ and $\phi_A$ in FIG. 5) of the transmission and reception side antennas highly sensitive to a subtle change of weather condition such as wind or surrounding temperature. Thus, even when the displacement in the highly sensitive antenna direction occurs, the unitary matrix acts so as to compensate for the displacement.

Further, in this configuration, antenna interval must be widened in view of a frequency to be used in the fixed point microwave communication system and, correspondingly, local oscillators are installed near the antennas. That is, the point that the local oscillators are provided independently for respective antennas on both the transmission and reception sides is the biggest feature of the fourth configuration. Thus, even if the local oscillators are used independently for respective antennas on both the transmission and reception sides, it is possible to obtain characteristics equivalent to the SVD method by appropriately detecting the pilot signals.

In FIG. 5, transmission signal are added with pilot signals of respective antennas by a pilot signal generation section 501, frequency converted into signals of a radio frequency by a transmission side frequency conversion section 502 including local oscillators 504 and 505, mixers 503 and 507, and then transmitted from a fixed antenna section 508 including a plurality of antennas as $s_1$ and $s_2$. The notation of the $s_1$ and $s_2$ is based on equivalent baseband representation.

It should be noted here that the local oscillators 504 and 505 are used independently for respective antennas. Thus, carrier synchronization is not achieved between carriers from the respective antennas, resulting in generation of phase noise $\Phi_L$. Reference numeral 506 is the modeling of the phase noise $\Phi_L$.

The signals thus transmitted are received by a reception side fixed antenna section 509 including a plurality of antennas as $r_1$ and $r_2$. The notation of the $r_1$ and $r_2$ is based on equivalent baseband representation. The reception signals $r_1$ and $r_2$ are frequency converted into signals of a baseband frequency by a reception side frequency conversion section 510 including local oscillators 512 and 513, mixers 511 and 515, passed through a pilot signal detection section 516, and processed by a reception side matrix calculation processing section 517 based on the unitary matrix U, whereby signal separation/detection in MIMO is completed.

It should be noted here that the local oscillators 512 and 513 are used independently for respective antennas on the reception side. Thus, phase noise $\Phi_L$ is generated due to absence of synchronization between carriers. Reference numeral 514 is the modeling of the phase noise $\Phi_L$. The antennas to be used are not particularly limited and may be a parabola antenna or a horn antenna.

Since the pilot signals are generated before the processing performed by the transmission side local oscillators and the pilot signals are detected after the processing performed by the reception side local oscillators, the pilot signal detection section 516 can detect $\Phi=\Phi_L+\Phi_A$ and $\phi=\phi_L+\phi_A$ in [Numeral 82]. Thus, all matrix calculations can be done only on the reception side with the transmission side matrix calculation processing based on the unitary matrix V omitted.

This is because that, as can be seen from [Numeral 82], the unitary matrix acts so as to compensate for a variation between the channels caused due to external factors such as a positional variation (modeled by $\Phi_A$ and $\phi_A$ in FIG. 5) of the antennas highly sensitive to a subtle change of weather condition such as wind or surrounding temperature and phase noise $\Phi_L$ or $\phi_L$ caused due to absence of synchronization between carriers. The greatest merit of the fourth example is that it is not necessary to send the feedback information for construction of the V matrix from the reception end to transmission end. The thick arrows of FIG. 5 denote virtual orthogonal channels in which channel qualities thereof are proportional to $2^{1/2}$ and $2^{1/2}$.

As described above, even in the configuration in which the unitary matrix calculation is not performed on the transmission end, the orthogonal channels can be formed. Further, phase difference $\Phi=\Phi_L+\Phi_A$ and phase noise $\phi=\phi_L+\phi_A$ can be detected using the pilot signals. Thus, even in the case where the local oscillators are provided independently for respective antennas on the transmission side and/or reception end, the virtual orthogonal channels can be formed. The orthogonal channels thus formed are not influenced by the phase difference $\Phi$ or $\phi$. The feedback from the reception end to the transmission end is not required. Further, since the matrix used is the unitary matrix, exactly the same characteristics as those of the SVD method can be shown.

Fifth Example

As a fifth example of the present invention, a configuration example in which virtual orthogonal channels having different widths are formed, the matrix calculation is performed only on the reception side, and local oscillators are provided independently for respective antennas on both the transmission and reception sides will be described.

This fifth example is an example in which virtual orthogonal channels have different values. Also in this example, feedback information to be sent from the reception end to transmission end is not required. Further, local oscillators may be provided independently for respective antennas on both the transmission and reception sides. In addition, analysis is made based on a fact that a significant phase rotation due to movement in the antenna direction highly sensitive to a subtle change of weather condition such as wind or surrounding temperature can be traced to the same modeling as a phase variation in the local oscillators provided for respective antennas both on the transmission and reception sides. For flexibility, antenna distance is set based on antenna positions different from optimum antenna positions. Therefore, different characteristics from the SVD method are shown. The characteristic analysis of this configuration will be described later.

[Singular Value Diagonal Matrix $\Lambda^{1/2}$]

In this example, the virtual orthogonal channels have different values, so that singular value diagonal matrix $\Lambda^{1/2}$ is represented by the following formula.

$$\Lambda^{1/2} = \begin{bmatrix} \sqrt{\lambda_1} & 0 \\ 0 & \sqrt{\lambda_2} \end{bmatrix}$$

$$= \begin{bmatrix} \sqrt{2+2\cos\alpha} & 0 \\ 0 & \sqrt{2-2\cos\alpha} \end{bmatrix}$$

$$= \begin{bmatrix} 2\cos\left(\frac{\alpha}{2}\right) & 0 \\ 0 & 2\sin\left(\frac{\alpha}{2}\right) \end{bmatrix}$$

$$= \begin{bmatrix} \left(e^{j\frac{\alpha}{2}} + e^{-j\frac{\alpha}{2}}\right) & 0 \\ 0 & -j\left(e^{j\frac{\alpha}{2}} - e^{-j\frac{\alpha}{2}}\right) \end{bmatrix}$$

[Numeral 83]

[Channel Matrix H]

In this example, the channel matrix H is represented by the following formula.

$$H = \begin{bmatrix} 1 & e^{-j\alpha} \cdot e^{j\Phi} \\ e^{-j\alpha} \cdot e^{j\phi} & 1 \cdot e^{j(\Phi+\phi)} \end{bmatrix} \text{where;}$$

$$\begin{cases} \Phi = \Phi_L + \Phi_A \\ \phi = \phi_L + \phi_A \end{cases}$$

[Numeral 84]

Here, transmission side highly sensitive antenna displacement $\Phi_A$ is included in phase variation $\Phi_L$ in the transmission side local oscillators provided independently for respective antennas to obtain $\Phi$, and reception side highly sensitive antenna displacement $\phi_A$ is included in phase variation $\phi_L$ in the reception side local oscillators provided independently for respective antennas to obtain $\phi$.

$$H = U \cdot \Lambda^{1/2} \cdot V^H$$ [Numeral 85]

$$= \begin{bmatrix} 1 & e^{-j\alpha} \cdot e^{j\Phi} \\ e^{-j\alpha} \cdot e^{j\phi} & 1 \cdot e^{j(\Phi+\phi)} \end{bmatrix}$$

$$= U \cdot \begin{bmatrix} \left(e^{j\frac{\alpha}{2}} + e^{-j\frac{\alpha}{2}}\right) & 0 \\ 0 & -j\left(e^{j\frac{\alpha}{2}} - e^{-j\frac{\alpha}{2}}\right) \end{bmatrix} \cdot \begin{bmatrix} 1 & 0 \\ 0 & 1 \end{bmatrix}$$

Here, the above formula is satisfied and thus the following [Numeral 86] is satisfied.

$$U = \begin{bmatrix} 1 & e^{-j\alpha} \cdot e^{j\Phi} \\ e^{-j\alpha} \cdot e^{j\phi} & 1 \cdot e^{j(\Phi+\phi)} \end{bmatrix} \cdot \begin{bmatrix} \left(e^{j\frac{\alpha}{2}} + e^{-j\frac{\alpha}{2}}\right) & 0 \\ 0 & -j\left(e^{j\frac{\alpha}{2}} - e^{-j\frac{\alpha}{2}}\right) \end{bmatrix}^{-1}$$

[Numeral 86]

Further, the following [Numeral 87] is satisfied and thus [Numeral 88] is satisfied.

$$\frac{1}{\left(e^{j\frac{\alpha}{2}} + e^{-j\frac{\alpha}{2}}\right)} = \frac{1}{2 \cdot \cos\left(\frac{\alpha}{2}\right)},$$

$$\frac{1}{-j\left(e^{j\frac{\alpha}{2}} - e^{-j\frac{\alpha}{2}}\right)} = \frac{1}{2 \cdot \sin\left(\frac{\alpha}{2}\right)}$$

[Numeral 87]

$$U = \begin{bmatrix} 1 & e^{-j\alpha} \cdot e^{j\Phi} \\ e^{-j\alpha} \cdot e^{j\phi} & 1 \cdot e^{j(\Phi+\phi)} \end{bmatrix} \cdot$$

$$\begin{bmatrix} \frac{1}{2 \cdot \cos\left(\frac{\alpha}{2}\right)} & 0 \\ 0 & \frac{1}{2 \cdot \sin\left(\frac{\alpha}{2}\right)} \end{bmatrix}$$

$$= \begin{bmatrix} \frac{1}{2 \cdot \cos\left(\frac{\alpha}{2}\right)} & \frac{e^{-j\alpha} \cdot e^{j\Phi}}{2 \cdot \sin\left(\frac{\alpha}{2}\right)} \\ \frac{e^{-j\alpha} \cdot e^{j\phi}}{2 \cdot \cos\left(\frac{\alpha}{2}\right)} & \frac{e^{j(\Phi+\phi)}}{2 \cdot \sin\left(\frac{\alpha}{2}\right)} \end{bmatrix}$$

[Numeral 88]

However, the square norm of the vector is represented by the following formula.

$$\frac{1}{4 \cdot \cos^2\left(\frac{\alpha}{2}\right)} + \frac{1}{4 \cdot \sin^2\left(\frac{\alpha}{2}\right)} = \frac{4}{16 \cdot \sin^2\left(\frac{\alpha}{2}\right) \cdot \cos^2\left(\frac{\alpha}{2}\right)}$$

$$= \frac{1}{2 \cdot \sin^2(\alpha)}$$

[Numeral 89]

Thus, U is no longer a unitary matrix.

Therefore, in order to calculate the matrix $U^H$, inverse matrix calculation is required. As a trial, when the channel matrix H is calculated using the obtained matrixes U, $\Lambda^{1/2}$, and $V^H$, the following formula is satisfied.

$$H = U \cdot \Lambda^{1/2} \cdot V^H$$ [Numeral 90]

$$= \begin{bmatrix} \frac{1}{2 \cdot \cos\left(\frac{\alpha}{2}\right)} & \frac{e^{-j\alpha} \cdot e^{j\Phi}}{2 \cdot \sin\left(\frac{\alpha}{2}\right)} \\ \frac{e^{-j\alpha} \cdot e^{j\phi}}{2 \cdot \cos\left(\frac{\alpha}{2}\right)} & \frac{e^{j(\Phi+\phi)}}{2 \cdot \sin\left(\frac{\alpha}{2}\right)} \end{bmatrix} \cdot$$

$$\begin{bmatrix} 2 \cdot \cos\left(\frac{\alpha}{2}\right) & 0 \\ 0 & 2 \cdot \sin\left(\frac{\alpha}{2}\right) \end{bmatrix} \cdot \begin{bmatrix} 1 & 0 \\ 0 & 1 \end{bmatrix}$$

$$= \begin{bmatrix} 1 & e^{-j\alpha} \cdot e^{j\Phi} \\ e^{-j\alpha} \cdot e^{j\phi} & 1 \cdot e^{j(\Phi+\phi)} \end{bmatrix}$$

As can be seen from the above, the channel matrix H is effected.

Next, inverse matrix of $U^{-1}$ of U is considered. A given matrix A represented by the following formula is assumed.

$$A = \begin{bmatrix} a_{11} & a_{12} \\ a_{21} & a_{22} \end{bmatrix}$$

[Numeral 91]

The inverse matrix $A^{-1}$ of the above matrix A is represented by the following formula.

$$A^{-1} = \frac{1}{a_{11}a_{12} - a_{12}a_{21}} \begin{bmatrix} a_{22} & -a_{12} \\ -a_{21} & a_{11} \end{bmatrix} \quad \text{[Numeral 92]}$$

$$\left( \begin{array}{l} \because AA^{-1} = \frac{1}{a_{11}a_{22} - a_{12}a_{21}} \begin{bmatrix} a_{11} & a_{12} \\ a_{21} & a_{22} \end{bmatrix} \cdot \\ \begin{bmatrix} a_{22} & -a_{12} \\ -a_{21} & a_{11} \end{bmatrix} = \frac{1}{a_{11}a_{22} - a_{12}a_{21}} \begin{bmatrix} a_{11}a_{22} - a_{12}a_{21} & 0 \\ 0 & a_{11}a_{22} - a_{12}a_{21} \end{bmatrix} \end{array} \right)$$

Accordingly, the following formula is obtained.

$$U^{-1} = \begin{bmatrix} \frac{1}{2\cos(\frac{\alpha}{2})} & \frac{e^{-j\alpha} \cdot e^{j\Phi}}{2\sin(\frac{\alpha}{2})} \\ \frac{e^{-j\alpha} \cdot e^{j\phi}}{2\cos(\frac{\alpha}{2})} & \frac{e^{j(\Phi+\phi)}}{2\sin(\frac{\alpha}{2})} \end{bmatrix}^{-1} \quad \text{[Numeral 93]}$$

$$= \frac{1}{\frac{1}{1\cos(\frac{\alpha}{2})} \cdot \frac{e^{j(\Phi+\phi)}}{2\sin(\frac{\alpha}{2})} - \frac{e^{-j\alpha} \cdot e^{j\Phi}}{2\sin(\frac{\alpha}{2})} \cdot \frac{e^{-j\alpha} \cdot e^{j\phi}}{2\cos(\frac{\alpha}{2})}} \begin{bmatrix} \frac{e^{j(\Phi+\phi)}}{2\sin(\frac{\alpha}{2})} & -\frac{e^{-j\alpha} \cdot e^{j\Phi}}{2\sin(\frac{\alpha}{2})} \\ -\frac{e^{-j\alpha} \cdot e^{j\phi}}{2\cos(\frac{\alpha}{2})} & \frac{1}{2\cos(\frac{\alpha}{2})} \end{bmatrix}$$

$$= \frac{2 \cdot (2\sin(\frac{\alpha}{2}) \cdot \cos(\frac{\alpha}{2}))}{1 - e^{-j2\alpha}} \begin{bmatrix} \frac{1}{2\sin(\frac{\alpha}{2})} & -\frac{e^{-j\alpha} \cdot e^{-j\phi}}{2\sin(\frac{\alpha}{2})} \\ -\frac{e^{-j\alpha} \cdot e^{j\Phi}}{2\cos(\frac{\alpha}{2})} & \frac{e^{-j(\Phi+\phi)}}{2\cos(\frac{\alpha}{2})} \end{bmatrix}$$

$$= \frac{2}{1 - e^{-j2\alpha}} \begin{bmatrix} \cos(\frac{\alpha}{2}) & -e^{-j\alpha} \cdot e^{-j\phi}\cos(\frac{\alpha}{2}) \\ -e^{-j\Phi}e^{-j\alpha}\sin(\frac{\alpha}{2}) & e^{-j(\Phi+\phi)}\sin(\frac{\alpha}{2}) \end{bmatrix}$$

$$= \frac{2}{e^{j\alpha} - e^{-j\alpha}} \begin{bmatrix} e^{j\alpha}\cos(\frac{\alpha}{2}) & -e^{-j\phi}\cos(\frac{\alpha}{2}) \\ -e^{-j\Phi}\sin(\frac{\alpha}{2}) & -e^{-j(\Phi+\phi)}e^{j\alpha}\sin(\frac{\alpha}{2}) \end{bmatrix}$$

$$= \frac{1}{j\sin\alpha} \begin{bmatrix} e^{j\alpha}\cos(\frac{\alpha}{2}) & -e^{-j\phi}\cos(\frac{\alpha}{2}) \\ -e^{-j\Phi}\sin(\frac{\alpha}{2}) & e^{-j(\Phi+\phi)}e^{j\alpha}\sin(\frac{\alpha}{2}) \end{bmatrix}$$

$$= \begin{bmatrix} -je^{j\alpha}\frac{\cos(\alpha/2)}{\sin\alpha} & je^{-j\phi}\frac{\cos(\alpha/2)}{\sin\alpha} \\ je^{-j\Phi}\frac{\sin(\alpha/2)}{\sin\alpha} & -je^{-j(\Phi+\phi)}e^{j\alpha}\frac{\sin(\alpha/2)}{\sin\alpha} \end{bmatrix}$$

where;

$$\alpha = 2\pi \left(\frac{d_R^2}{2R}\right) / \gamma = \frac{\pi}{\gamma} \cdot \frac{d_R^2}{R}$$

Figure 6:
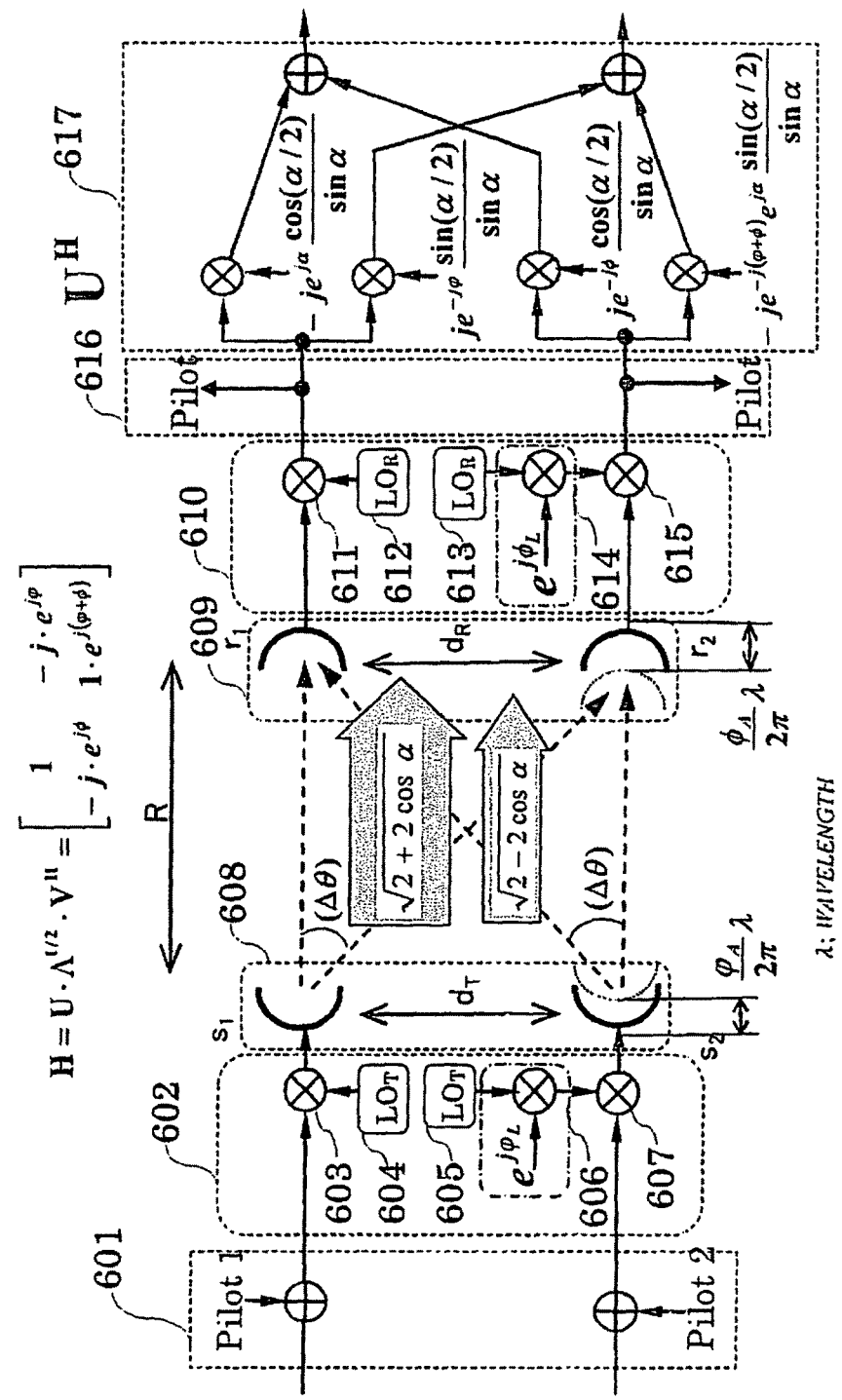
FIG. 6 A view showing an example of the MIMO communication system according to a fifth example of the present invention, where matrix calculation is performed only on the reception side, where virtual orthogonal channels have different values, and where local oscillators are provided independently for respective antennas both on the transmission and reception sides.

A configuration obtained based on the above result is shown in FIG. 6.

Although a case of the virtual orthogonal channels having different values has been described above, even if the local oscillators are provided independently for respective antennas on both the transmission and reception ends, it is possible to form the orthogonal channels by appropriately detecting the pilot signals. Since the matrix calculation is not performed on the transmission side, it is possible to eliminate the feedback information to be sent from the reception end to transmission end and to deal with a rapid phase variation such as transmission end phase variation $\Phi$ or reception end phase variation $\phi$.

Thus, it is possible to form orthogonal channels having different channel quality regardless of whether the optimum position (R=5000 m and $d_T$=$d_R$=5 m) is achieved or not without the transmission side matrix calculation processing. However, $U^H$ is no longer a unitary matrix but becomes an inverse matrix $U^{-1}$. Thus, characteristics are expected to degrade as compared to those of the SVD method. The difference in the characteristics between the SVD method and configuration of this example will be described later.

As shown in FIG. 6, transmission signals are added with pilot signals orthogonal to each other for respective antennas by a pilot signal generation section 601. The orthogonal pilot signals used may be an orthogonal pattern obtained from the Hadamard matrix or may be a CAZAC sequence. The transmission signals thus added with the pilot signals are frequency converted into signals of a radio frequency by a transmission side frequency conversion section 602 including local oscillators 604 and 605, mixers 603 and 607, and then transmitted from a fixed antenna section 608 including a plurality of antennas as $s_1$ and $s_2$. The notation of the $s_1$ and $s_2$ is based on equivalent baseband representation.

It should be noted here that the local oscillators 604 and 605 are used independently for respective antennas. Thus, carrier synchronization is not achieved between carriers from the respective antennas, resulting in generation of phase noise $\Phi_L$. Reference numeral 606 is the modeling of the phase noise $\Phi_L$. The signals thus transmitted are received by a reception side fixed antenna section 609 including a plurality of antennas as $r_1$ and $r_2$. The notation of the $r_1$ and $r_2$ is based on equivalent baseband representation. The reception signals $r_1$ and $r_2$ are frequency converted into signals of a baseband frequency by a reception side frequency conversion section 610 including local oscillators 612 and 613, mixers 611 and 615, passed through a pilot signal detection section 616, and processed by a reception side matrix calculation processing section 617 based on the matrix U, whereby signal separation/detection in MIMO is completed.

In the processing on the reception side, the local oscillators 612 and 613 provided independently for respective antennas are used. Thus, phase noise $\phi_L$ is generated due to absence of carrier synchronization between antennas. Reference numeral 614 is the modeling of the phase noise $\phi_L$. The antennas to be used are not particularly limited and may be a parabola antenna or a horn antenna.

Since the orthogonal pilot signals are generated before the processing performed by the transmission side local oscillators and the pilot signals are detected after the processing performed by the reception side local oscillators, the pilot signal detection section 616 can detect $\Phi=\Phi_L+\Phi_A$ and $\phi=\phi_L+\phi_A$ in [Numeral 93]. The orthogonal pilot signals used is an orthogonal pattern such as the Hadamard sequence or CAZAC sequence, so that the $\Phi$ and $\phi$ can be detected using a simple correlator (not shown). All matrix calculations can be done only on the reception side.

That is, as can be seen from [Numeral 93], the reception side matrix acts so as to compensate for a variation between the channels caused due to external factors such as a positional variation (modeled by $\Phi_A$ and $\phi_A$ in FIG. 6) of the antennas highly sensitive to a subtle change of weather condition such as wind or surrounding temperature and phase noise $\Phi_L$ or $\phi_L$ caused due to absence of synchronization between carriers. The greatest merit of the fifth example is that it is not necessary to send the feedback information for construction of the V matrix from the reception end to transmission end. The thick arrows of FIG. 6 denote virtual orthogonal channels having different widths, unlike the fourth example. However, as described later, the virtual orthogonal channels in this configuration have the same channel quality.

Although a case where two antennas are used has been described, the present invention is not limited to this, but a configuration using three or more antennas is possible.

In the following, a case where three or more antennas are used will be described. For simplification, only transmission/reception side-antennas are illustrated.

Sixth Example

A sixth example of the present invention shows a case where three antennas are used and unitary matrix calculation is performed only on reception side.

[Singular Value Diagonal Matrix $\Lambda^{1/2}$]

In this example, singular value diagonal matrix $\Lambda^{1/2}$ is represented by the following formula.

$$\Lambda^{1/2} = \begin{bmatrix} \sqrt{\lambda_1} & 0 & 0 \\ 0 & \sqrt{\lambda_2} & 0 \\ 0 & 0 & \sqrt{\lambda_3} \end{bmatrix} = \begin{bmatrix} \sqrt{3} & 0 & 0 \\ 0 & \sqrt{3} & 0 \\ 0 & 0 & \sqrt{3} \end{bmatrix} \quad \text{[Numeral 94]}$$

[Channel Matrix H]

Figure 7:
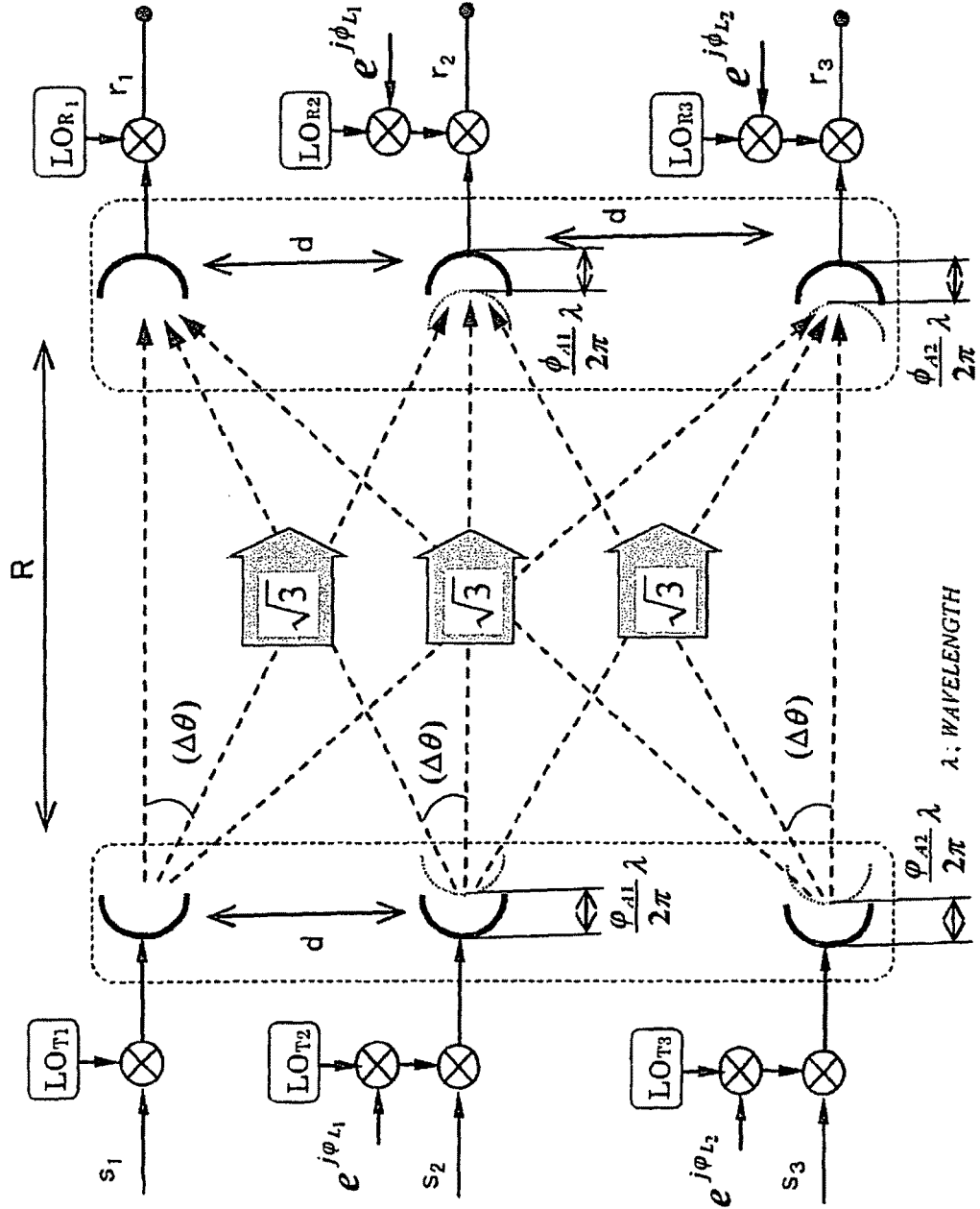
FIG. 7 A view showing an example of the MIMO communication system according to a sixth example of the present invention, where three antennas are installed respectively on the transmission and reception sides, and where local oscillators are provided independently for respective antennas both on the transmission and reception sides.

In this example, the following [Numeral 95] is derived from FIG. 7, and channel matrix H can be represented by [Numeral 96].

$$\frac{(n \cdot d)^2}{R} = \frac{n^2 \cdot \gamma}{3} \quad \text{[Numeral 95]}$$

where; $n = 0, 1, 2$ $$H = \begin{bmatrix} 1 & 0 & 0 \\ 0 & e^{j\phi_1} & 0 \\ 0 & 0 & e^{j\phi_2} \end{bmatrix} \cdot \begin{bmatrix} 1 & e^{-j\frac{\pi}{3}} & e^{j4\frac{\pi}{3}} \\ e^{-j\frac{\pi}{3}} & 1 & e^{-j\frac{\pi}{3}} \\ e^{-j4\frac{\pi}{3}} & e^{-j\frac{\pi}{3}} & 1 \end{bmatrix} \cdot \quad \text{[Numeral 96]}$$

$$\begin{bmatrix} 1 & 0 & 0 \\ 0 & e^{j\Phi_1} & 0 \\ 0 & 0 & e^{j\Phi_2} \end{bmatrix} \text{ where; } \begin{cases} \Phi_1 = \Phi_{L_1} + \Phi_{A_2} \\ \Phi_2 = \Phi_{L_2} + \Phi_{A_2} \\ \phi_1 = \phi_{L_1} + \phi_{A_1} \\ \phi_2 = \phi_{L_2} + \phi_{A_2} \end{cases}$$

$$= U \cdot \Lambda^{1/2} \cdot V^H = U \cdot \begin{bmatrix} \sqrt{3} & 0 & 0 \\ 0 & \sqrt{3} & 0 \\ 0 & 0 & \sqrt{3} \end{bmatrix} \cdot \begin{bmatrix} 1 & 0 & 0 \\ 0 & 1 & 0 \\ 0 & 0 & 1 \end{bmatrix}$$

$$\therefore U = \begin{bmatrix} U_{11} & U_{12} & U_{13} \\ U_{21} & U_{22} & U_{23} \\ U_{31} & U_{32} & U_{33} \end{bmatrix}$$

$$= \begin{bmatrix} 1 & e^{-j\frac{\pi}{3}} \cdot e^{j\Phi_1} & e^{-j4\frac{\pi}{3}} \cdot e^{j\Phi_2} \\ e^{-j\frac{\pi}{3}} \cdot e^{j\phi_1} & 1 \cdot e^{j(\phi_1+\Phi_1)} & e^{-j\frac{\pi}{3}} \cdot e^{j(\phi_1+\Phi_2)} \\ e^{-j4\frac{\pi}{3}} \cdot e^{j\phi_2} & e^{-j\frac{\pi}{3}} \cdot e^{j(\phi_2+\Phi_1)} & 1 \cdot e^{j(\phi_2+\Phi_2)} \end{bmatrix} \cdot$$

$$\begin{bmatrix} 1/\sqrt{3} & 0 & 0 \\ 0 & 1/\sqrt{3} & 0 \\ 0 & 0 & 1/\sqrt{3} \end{bmatrix}$$

$$= \begin{bmatrix} \frac{1}{\sqrt{3}} & \frac{e^{-j\frac{\pi}{3}} \cdot e^{j\Phi_1}}{\sqrt{3}} & \frac{e^{-j4\frac{\pi}{3}} \cdot e^{j\Phi_2}}{\sqrt{3}} \\ \frac{e^{-j\frac{\pi}{3}} \cdot e^{j\phi_1}}{\sqrt{3}} & \frac{1 \cdot e^{j(\phi_1+\Phi_1)}}{\sqrt{3}} & \frac{e^{-j\frac{\pi}{3}} \cdot e^{j(\phi_1+\Phi_2)}}{\sqrt{3}} \\ \frac{e^{-j4\frac{\pi}{3}} \cdot e^{j\phi_2}}{\sqrt{3}} & \frac{e^{-j\frac{\pi}{3}} \cdot e^{j(\phi_2+\Phi_1)}}{\sqrt{3}} & \frac{1 \cdot e^{j(\phi_2+\Phi_2)}}{\sqrt{3}} \end{bmatrix}$$

where;

$$\alpha = \frac{\pi}{\gamma} \cdot \frac{d^2}{R} = \frac{\pi}{3}$$

Accordingly, the following formula is obtained.

$$\therefore U^H = \begin{bmatrix} \frac{1}{\sqrt{3}} & \frac{e^{j\frac{\pi}{3}} \cdot e^{-j\phi_1}}{\sqrt{3}} & \frac{e^{j4\frac{\pi}{3}} \cdot e^{-j\phi_2}}{\sqrt{3}} \\ \frac{e^{j\frac{\pi}{3}} \cdot e^{-j\Phi_1}}{\sqrt{3}} & \frac{1 \cdot e^{-j(\phi_1+\Phi_1)}}{\sqrt{3}} & \frac{e^{j\frac{\pi}{3}} \cdot e^{-j(\phi_2+\Phi_1)}}{\sqrt{3}} \\ \frac{e^{j4\frac{\pi}{3}} \cdot e^{-j\Phi_2}}{\sqrt{3}} & \frac{e^{j\frac{\pi}{3}} \cdot e^{-j(\phi_1+\Phi_2)}}{\sqrt{3}} & \frac{1 \cdot e^{-j(\phi_2+\Phi_2)}}{\sqrt{3}} \end{bmatrix} \quad \text{[Numeral 97]}$$

where; $\begin{cases} \Phi_1 = \Phi_{L1} + \Phi_{A2} \\ \Phi_2 = \Phi_{L2} + \Phi_{A2} \\ \phi_1 = \phi_{L1} + \phi_{A1} \\ \phi_2 = \phi_{L2} + \phi_{A2} \end{cases}$ $\Phi_A$ and $\phi_A$ in [Numeral 97] each represent a carrier phase rotation caused due to a positional variation of the transmission/reception side-antennas highly sensitive to a subtle change of weather condition such as wind or surrounding temperature. Suffixes 1 and 2 represent a positional displacement of second and third antennas counting from the uppermost antennas. Further, antenna interval must be widened in view of a frequency to be used in the fixed point microwave communication system and, correspondingly, local oscillators are installed near the antennas. That is, the local oscillators are provided independently for respective antennas on both the transmission and reception sides. Accordingly, phase noise $\Phi_L$ or $\phi_L$ is caused due to absence of synchronization between carriers. Suffixes 1 and 2 represent a positional displacement of second and third antennas counting from the uppermost antennas.

A significant phase rotation due to movement in the antenna direction highly sensitive to a subtle change of weather condition such as wind or surrounding temperature can be traced to the same modeling as a phase variation in the local oscillators provided for respective antennas both on the transmission and reception sides. Thus, the analysis based on [Numeral 97] reveals that $\Phi_1=\Phi_{L1}+\Phi_{A1}$ and $\Phi_2=\Phi_{L2}+\Phi_{A2}$ are satisfied in the transmission side second and third antennas counting from the uppermost antenna and $\phi_1=\phi_{L1}+\phi_{A1}$ and $\phi_2=\phi_{L2}+\phi_{A2}$ are satisfied in the reception side second and third antennas counting from the uppermost antenna. That is, even in the configuration in which three antennas are used, the virtual orthogonal channels can be formed by the unitary matrix calculation only on the reception side. The thick arrows of FIG. 7 denote virtual orthogonal channels in which channel qualities thereof are proportional to $3^{1/2}$, $3^{1/2}$, and $3^{1/2}$.

Further, it is possible to obtain characteristics equivalent to the SVD method by appropriately detecting the phase differences using the pilot signals. The channel capacity becomes three times higher than the total power delivered to all antennas.

Seventh Example

A seventh example of the present invention shows a case where four antennas are used, unitary matrix calculation is performed only on reception side, and local oscillators on both transmission and reception ends are independently provided for respective antennas.

[Singular Value Diagonal Matrix $\Lambda^{1/2}$]

In this example, singular value diagonal matrix $\Lambda^{1/2}$ is represented by the following formula.

$$\Lambda^{1/2} = \begin{bmatrix} \sqrt{\lambda_1} & 0 & 0 & 0 \\ 0 & \sqrt{\lambda_2} & 0 & 0 \\ 0 & 0 & \sqrt{\lambda_3} & 0 \\ 0 & 0 & 0 & \sqrt{\lambda_4} \end{bmatrix} \quad \text{[Numeral 98]}$$

$$= \begin{bmatrix} \sqrt{4} & 0 & 0 & 0 \\ 0 & \sqrt{4} & 0 & 0 \\ 0 & 0 & \sqrt{4} & 0 \\ 0 & 0 & 0 & \sqrt{4} \end{bmatrix}$$

[Channel Matrix H]

Figure 8:
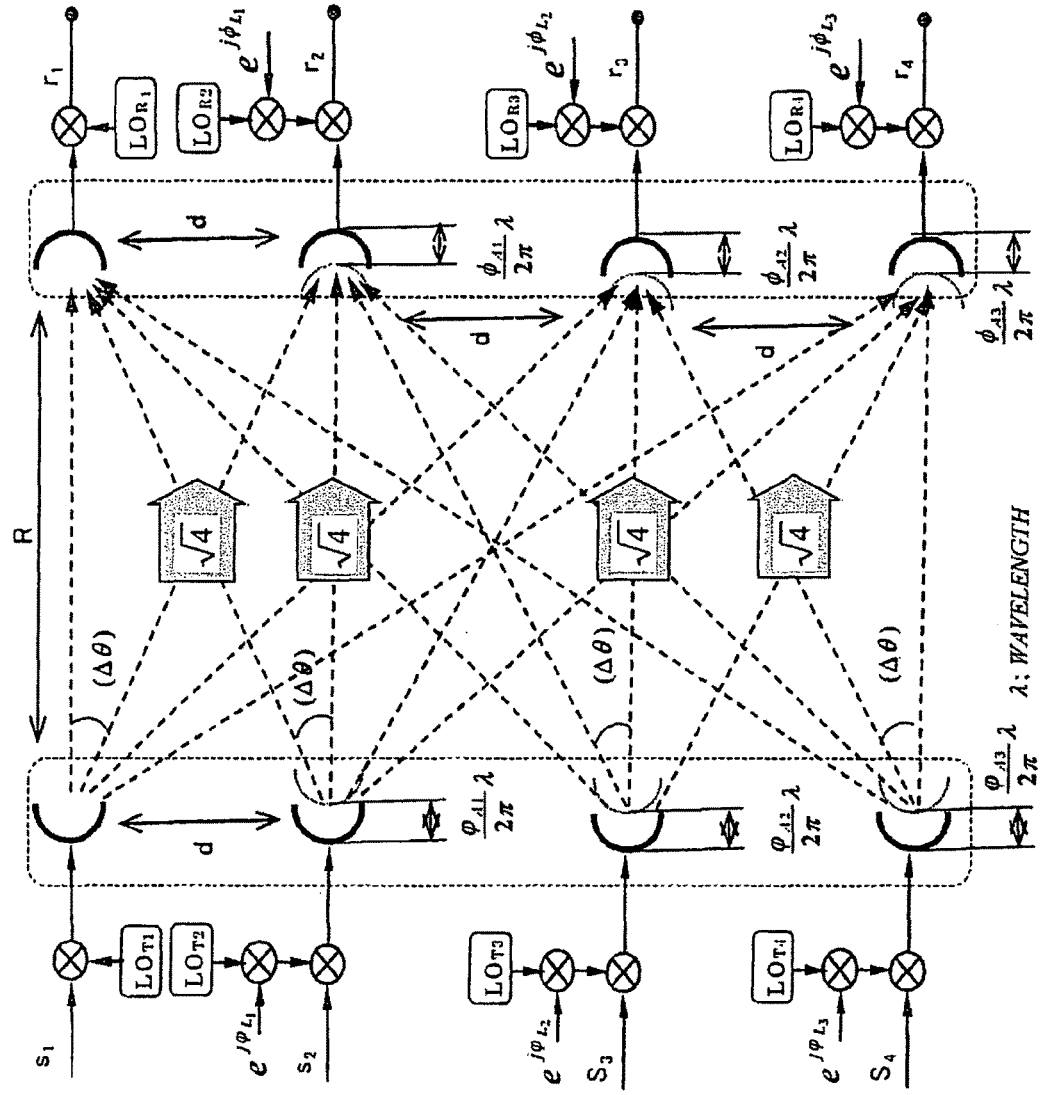
FIG. 8 A view showing an example of the MIMO communication system according to a seventh example of the present invention, where four antennas are installed respectively on the transmission and reception sides, and where local oscillators are provided independently for respective antennas both on the transmission and reception sides.

In this example, the following [Numeral 99] is derived from FIG. 8, $$\frac{(n \cdot d)^2}{R} = \frac{n^2 \cdot \gamma}{4} \quad \text{[Numeral 99]}$$

where;

$n = 0, 1, 2, 3$ and channel matrix H can be represented by the following [Numeral 100].

$$H = \begin{bmatrix} 1 & 0 & 0 & 0 \\ 0 & e^{j\phi_1} & 0 & 0 \\ 0 & 0 & e^{j\phi_2} & 0 \\ 0 & 0 & 0 & e^{j\phi_3} \end{bmatrix} \cdot \begin{bmatrix} 1 & e^{-j\frac{\pi}{4}} & e^{-j\frac{4\pi}{4}} & e^{-j\frac{9\pi}{4}} \\ e^{-j\frac{\pi}{4}} & 1 & e^{-j\frac{\pi}{4}} & e^{-j\frac{4\pi}{4}} \\ e^{-j\frac{4\pi}{4}} & e^{-j\frac{\pi}{4}} & 1 & e^{-j\frac{\pi}{4}} \\ e^{-j\frac{9\pi}{4}} & e^{-j\frac{4\pi}{4}} & e^{-j\frac{\pi}{4}} & 1 \end{bmatrix} \cdot \begin{bmatrix} 1 & 0 & 0 & 0 \\ 0 & e^{j\phi_1} & 0 & 0 \\ 0 & 0 & e^{j\phi_2} & 0 \\ 0 & 0 & 0 & e^{j\phi_3} \end{bmatrix}$$

$$= U \cdot \Lambda^{1/2} \cdot V^H = U \cdot \begin{bmatrix} \sqrt{4} & 0 & 0 & 0 \\ 0 & \sqrt{4} & 0 & 0 \\ 0 & 0 & \sqrt{4} & 0 \\ 0 & 0 & 0 & \sqrt{4} \end{bmatrix} \cdot \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

[Numeral 100]

where;
$$\begin{cases} \Phi_1 = \Phi_{L_1} + \Phi_{A_2} \\ \Phi_2 = \Phi_{L_2} + \Phi_{A_2} \\ \Phi_3 = \Phi_{L_3} + \Phi_{A_3} \\ \phi_1 = \phi_{L_1} + \phi_{A_1} \\ \phi_2 = \phi_{L_2} + \phi_{A_2} \\ \phi_3 = \phi_{L_3} + \phi_{A_3} \end{cases}$$

-continued $$\therefore U = \begin{bmatrix} 1 & e^{-j\frac{\pi}{4}} \cdot e^{j\Phi_1} & e^{-j\frac{4\pi}{4}} \cdot e^{j\Phi_2} & e^{-j\frac{9\pi}{4}} \cdot e^{j\Phi_3} \\ e^{-j\frac{\pi}{4}} \cdot e^{j\phi_1} & 1 \cdot e^{j(\phi_1+\Phi_1)} & e^{-j\frac{\pi}{4}} \cdot e^{j(\phi_1+\Phi_2)} & e^{-j\frac{4\pi}{4}} \cdot e^{j(\phi_1+\Phi_3)} \\ e^{-j\frac{4\pi}{4}} \cdot e^{j\phi_2} & e^{-j\frac{\pi}{4}} \cdot e^{j(\phi_2+\Phi_1)} & 1 \cdot e^{j(\phi_2+\Phi_2)} & e^{-j\frac{\pi}{4}} \cdot e^{j(\phi_2+\Phi_3)} \\ e^{-j\frac{9\pi}{4}} \cdot e^{j\phi_3} & e^{-j\frac{4\pi}{4}} \cdot e^{j(\phi_3+\Phi_1)} & e^{-j\frac{\pi}{4}} \cdot e^{j(\phi_3+\Phi_2)} & 1 \cdot e^{j(\phi_3+\Phi_3)} \end{bmatrix}$$

$$= \begin{bmatrix} 1/\sqrt{4} & 0 & 0 & 0 \\ 0 & 1/\sqrt{4} & 0 & 0 \\ 0 & 0 & 1/\sqrt{4} & 0 \\ 0 & 0 & 0 & 1/\sqrt{4} \end{bmatrix}$$

$$= \begin{bmatrix} \frac{1}{\sqrt{4}} & \frac{e^{-j\frac{\pi}{4}} \cdot e^{j\Phi_1}}{\sqrt{4}} & \frac{e^{-j\frac{4\pi}{4}} \cdot e^{j\Phi_2}}{\sqrt{4}} & \frac{e^{-j\frac{9\pi}{4}} \cdot e^{j\Phi_3}}{\sqrt{4}} \\ \frac{e^{-j\frac{\pi}{4}} \cdot e^{j\phi_1}}{\sqrt{4}} & \frac{1 \cdot e^{j(\phi_1+\Phi_1)}}{\sqrt{4}} & \frac{e^{-j\frac{\pi}{4}} \cdot e^{j(\phi_1+\Phi_2)}}{\sqrt{4}} & \frac{e^{-j\frac{4\pi}{4}} \cdot e^{j(\phi_1+\Phi_3)}}{\sqrt{4}} \\ \frac{e^{-j\frac{4\pi}{4}} \cdot e^{j\phi_2}}{\sqrt{4}} & \frac{e^{-j\frac{\pi}{4}} \cdot e^{j(\phi_2+\Phi_1)}}{\sqrt{4}} & \frac{1 \cdot e^{j(\phi_2+\Phi_2)}}{\sqrt{4}} & \frac{e^{-j\frac{\pi}{4}} \cdot e^{j(\phi_2+\Phi_3)}}{\sqrt{4}} \\ \frac{e^{-j\frac{9\pi}{4}} \cdot e^{j\phi_3}}{\sqrt{4}} & \frac{e^{-j\frac{4\pi}{4}} \cdot e^{j(\phi_3+\Phi_1)}}{\sqrt{4}} & \frac{e^{-j\frac{\pi}{4}} \cdot e^{j(\phi_3+\Phi_2)}}{\sqrt{4}} & \frac{1 \cdot e^{j(\phi_3+\Phi_3)}}{\sqrt{4}} \end{bmatrix}$$

where;

$$\alpha = \frac{\pi}{\gamma} \cdot \frac{d^2}{R} = \frac{\pi}{4}$$

Accordingly, the following formula is obtained.

[Numeral 101]

$$\therefore U^H = \begin{bmatrix} \frac{1}{\sqrt{4}} & \frac{e^{j\frac{\pi}{4}} \cdot e^{-j\phi_1}}{\sqrt{4}} & \frac{e^{j\frac{4\pi}{4}} \cdot e^{-j\phi_2}}{\sqrt{4}} & \frac{e^{j\frac{9\pi}{4}} \cdot e^{-j\phi_3}}{\sqrt{4}} \\ \frac{e^{j\frac{\pi}{4}} \cdot e^{-j\Phi_1}}{\sqrt{4}} & \frac{1 \cdot e^{-j(\phi_1+\Phi_1)}}{\sqrt{4}} & \frac{e^{j\frac{\pi}{4}} \cdot e^{-j(\phi_2+\Phi_1)}}{\sqrt{4}} & \frac{e^{j\frac{4\pi}{4}} \cdot e^{-j(\phi_3+\Phi_1)}}{\sqrt{4}} \\ \frac{e^{j\frac{4\pi}{4}} \cdot e^{-j\Phi_2}}{\sqrt{4}} & \frac{e^{j\frac{\pi}{4}} \cdot e^{-j(\phi_1+\Phi_2)}}{\sqrt{4}} & \frac{1 \cdot e^{-j(\phi_2+\Phi_2)}}{\sqrt{4}} & \frac{e^{j\frac{4\pi}{4}} \cdot e^{-j(\phi_3+\Phi_2)}}{\sqrt{4}} \\ \frac{e^{j\frac{9\pi}{4}} \cdot e^{-j\Phi_3}}{\sqrt{4}} & \frac{e^{j\frac{4\pi}{4}} \cdot e^{-j(\phi_1+\Phi_3)}}{\sqrt{4}} & \frac{e^{j\frac{\pi}{4}} \cdot e^{-j(\phi_2+\Phi_3)}}{\sqrt{4}} & \frac{1 \cdot e^{-j(\phi_3+\Phi_3)}}{\sqrt{4}} \end{bmatrix}$$

where;

$$\begin{cases} \Phi_1 = \Phi_{L_1} + \Phi_{A_2} \\ \Phi_2 = \Phi_{L_2} + \Phi_{A_2} \\ \Phi_3 = \Phi_{L_3} + \Phi_{A_3} \\ \phi_1 = \phi_{L_1} + \phi_{A_1} \\ \phi_2 = \phi_{L_2} + \phi_{A_2} \\ \phi_3 = \phi_{L_3} + \phi_{A_3} \end{cases}$$

$\Phi_A$ and $\phi_A$ in [Numeral 101] each represent a carrier phase rotation caused due to a positional variation of the transmission/reception side-antennas highly sensitive to a subtle change of weather condition such as wind or surrounding temperature. Suffixes 1, 2, and 3 represent a positional displacement of second, third, and fourth antennas counting from the uppermost antennas. Antenna interval must be widened in view of a frequency to be used in the fixed point microwave communication system and, correspondingly, local oscillators are installed near the antennas. That is, the local oscillators are provided independently for respective antennas on both the transmission and reception sides. Accordingly, phase noise $\Phi_L$ or $\phi_L$ is caused due to absence of synchronization between carriers. Suffixes 1, 2, and 3 represent a positional displacement of local oscillators of second, third, and fourth antennas counting from the uppermost antennas.

A significant phase rotation due to movement in the antenna direction highly sensitive to a subtle change of weather condition such as wind or surrounding temperature can be traced to the same modeling as a phase rotation in the local oscillators provided for respective antennas both on the transmission and reception sides. Thus, the analysis based on [Numeral 101] reveals that $\Phi_1=\Phi_{L1}+\Phi_{A1}$, $\Phi_2=\Phi_{L2}+\Phi_{A2}$, and $\Phi_3=\Phi_{L3}+\Phi_{A3}$ are satisfied in the transmission side second, third, and fourth antennas counting from the uppermost antenna and $\phi_1=\phi_{L1}+\phi_{A1}$, $\phi_2=\phi_{L2}+\phi_{A2}$, and $\phi_3=\phi_{L3}+\phi_{A3}$ are satisfied in the reception side second, third, and fourth antennas counting from the uppermost antenna. That is, even in the configuration in which four antennas are used, the virtual orthogonal channels can be formed by the unitary matrix calculation only on the reception side. The thick arrows of FIG. 8 denote virtual orthogonal channels in which channel qualities thereof are proportional to $4^{1/2}$, $4^{1/2}$, $4^{1/2}$, and $4^{1/2}$.

Further, it is possible to obtain characteristics equivalent to the SVD method by appropriately detecting the phase variations using the pilot signals. The channel capacity becomes four times higher than the total power delivered to all antennas.

In the following, a case where an arbitrary number N of antennas are used will be described for respective cases where matrix calculation is performed only on the transmission side, where only on the reception side, and where both on the transmission and reception sides.

In this example, a configuration (general solution) using an arbitrary number N of antennas is considered.

[Singular Value Diagonal Matrix $\Lambda^{1/2}$]

In this example, singular value diagonal matrix $\Lambda^{1/2}$ is represented by the following formula.

$$\Lambda^{1/2} = \begin{bmatrix} \sqrt{\lambda_1} & 0 & \cdots & 0 \\ 0 & \sqrt{\lambda_2} & \cdots & 0 \\ \vdots & \vdots & \ddots & \vdots \\ 0 & 0 & \cdots & \sqrt{\lambda_N} \end{bmatrix}$$

$$= \begin{bmatrix} \sqrt{N} & 0 & \cdots & 0 \\ 0 & \sqrt{N} & \cdots & 0 \\ \vdots & \vdots & \ddots & \vdots \\ 0 & 0 & \cdots & \sqrt{N} \end{bmatrix}$$

[Numeral 102]

Based on the following [Numeral 103], an ideal line-of-sight channel matrix where there is no phase rotation on both the transmission and reception sides is represented by [Numeral 104].

$$\frac{(n \cdot d)^2}{R} = \frac{n^2 \cdot \gamma}{N}$$

[Numeral 103]

where;

$n = 0, 1, 2, 3, \ldots, N-1$ $$H_o = \begin{bmatrix} 1 & e^{-j\frac{\pi}{N}} & \cdots & e^{-j\frac{(N-1)^2\pi}{N}} \\ e^{-j\frac{\pi}{N}} & 1 & \cdots & e^{-j\frac{(N-2)^2\pi}{N}} \\ \vdots & \ddots & \ddots & \vdots \\ e^{-j\frac{(N-1)^2\pi}{N}} & e^{-j\frac{(N-2)^2\pi}{N}} & \cdots & 1 \end{bmatrix}$$

[Numeral 104]

Further, a transmission side phase rotation matrix T is defined as the following formula.

$$T = \begin{bmatrix} 1 & 0 & \cdots & 0 \\ 0 & e^{j\phi_1} & \cdots & 0 \\ \vdots & \vdots & \ddots & \vdots \\ 0 & 0 & \cdots & e^{j\phi_{N-1}} \end{bmatrix}$$

[Numeral 105]

Similarly, a reception side phase rotation matrix W is defined as the right formula.

$$W = \begin{bmatrix} 1 & 0 & \cdots & 0 \\ 0 & e^{j\phi_1} & \cdots & 0 \\ \vdots & \vdots & \ddots & \vdots \\ 0 & 0 & \cdots & e^{j\phi_{N-1}} \end{bmatrix}$$

[Numeral 106]

Here, the following [Numeral 107] and [Numeral 108] are both satisfied.

$$\begin{cases} \phi_1 = \phi_{L_1} + \phi_{A_1} \\ \vdots \\ \phi_{N-1} = \phi_{L_{N-1}} + \phi_{A_{N-1}} \end{cases}$$

[Numeral 107]

$$\begin{cases} \Phi_1 + \Phi_{L_1} + \Phi_{A_1} \\ \vdots \\ \Phi_{N-1} = \Phi_{L_{N-1}} + \Phi_{A_{N-1}} \end{cases}$$

[Numeral 108]

$\Phi_A$ and $\phi_A$ each represent a carrier phase rotation caused due to a positional variation of the transmission/reception side-antennas highly sensitive to a subtle change of weather condition such as wind or surrounding temperature. $\Phi_L$ or $\phi_L$ represents a phase variation caused due to absence of synchronization between carriers. Each Suffix represents the location corresponding to each antenna with respect to the uppermost antennas.

Thus, an actual line-of-sight channel matrix where a phase rotation is present on both the transmission and reception sides is represented by the following formula.

$$H = W \cdot H_o \cdot T$$

[Numeral 109]

$$= \begin{bmatrix} 1 & 0 & \cdots & 0 \\ 0 & e^{j\phi_1} & \cdots & 0 \\ \vdots & \vdots & \ddots & \vdots \\ 0 & 0 & \cdots & e^{j\phi_{N-1}} \end{bmatrix} \cdot$$

$$\begin{bmatrix} 1 & e^{-j\frac{\pi}{N}} & \cdots & e^{-j\frac{(N-1)^2\pi}{N}} \\ e^{-j\frac{\pi}{N}} & 1 & \ddots & e^{-j\frac{(N-2)^2\pi}{N}} \\ \vdots & \ddots & \ddots & \vdots \\ e^{-j\frac{(N-1)^2\pi}{N}} & e^{-j\frac{(N-2)^2\pi}{N}} & \cdots & 1 \end{bmatrix} \cdot$$

$$\begin{bmatrix} 1 & 0 & \cdots & 0 \\ 0 & e^{j\Phi_1} & \cdots & 0 \\ \vdots & \vdots & \ddots & \vdots \\ 0 & 0 & \cdots & e^{j\Phi_{N-1}} \end{bmatrix}$$

(Case where Unitary Matrix Calculation is Performed Only on Reception Side)

In this case, the following formula is satisfied.

$$H = W \cdot H_o \cdot T$$

[Numeral 110]

$$= U \cdot \Lambda^{1/2} \cdot V^H$$

$$= U \cdot \begin{bmatrix} \sqrt{N} & 0 & \cdots & 0 \\ 0 & \sqrt{N} & \cdots & 0 \\ \vdots & \vdots & \ddots & \vdots \\ 0 & 0 & \cdots & \sqrt{N} \end{bmatrix} \cdot \begin{bmatrix} 1 & 0 & \cdots & 0 \\ 0 & 1 & \cdots & 0 \\ \vdots & \vdots & \ddots & \vdots \\ 0 & 0 & \cdots & 1 \end{bmatrix}$$

Accordingly, the following formula is satisfied.

$$U = \frac{1}{\sqrt{N}} \cdot W \cdot H_o \cdot T$$

[Numeral 111]

Thus, the following formula is obtained.

$$U^H = \frac{1}{\sqrt{N}} \cdot T^H \cdot H_o^H \cdot W^H$$

[Numeral 112]

-continued $$= \frac{1}{\sqrt{N}} \cdot \begin{bmatrix} 1 & 0 & \cdots & 0 \\ 0 & e^{-j\Phi_1} & \cdots & 0 \\ \vdots & \vdots & \ddots & \vdots \\ 0 & 0 & \cdots & e^{-j\Phi_{N-1}} \end{bmatrix} \cdot$$

$$\begin{bmatrix} 1 & e^{j\frac{\pi}{N}} & \cdots & e^{j\frac{(N-1)^2\pi}{N}} \\ e^{j\frac{\pi}{N}} & 1 & \ddots & e^{j\frac{(N-2)^2\pi}{N}} \\ \vdots & \ddots & \ddots & \vdots \\ e^{j\frac{(N-1)^2\pi}{N}} & e^{j\frac{(N-2)^2\pi}{N}} & \cdots & 1 \end{bmatrix} \cdot$$

$$\begin{bmatrix} 1 & 0 & \cdots & 0 \\ 0 & e^{-j\phi_1} & \cdots & 0 \\ \vdots & \vdots & \ddots & \vdots \\ 0 & 0 & \cdots & e^{-j\phi_{N-1}} \end{bmatrix}$$

That is, even in the configuration in which arbitrary number N of antennas are used, the virtual orthogonal channels can be formed by the matrix calculation only on the reception side even in the case where the local oscillators are provided independently for respective antennas and where a displacement in the highly sensitive antenna direction occurs.

Incidentally, it is assumed that the following formula is satisfied.

$$U^H \cdot U = \frac{1}{\sqrt{N}} \cdot T^H \cdot H_o^H \cdot W^H \cdot \frac{1}{\sqrt{N}} \cdot W \cdot H_o \cdot T \quad \text{[Numeral 113]}$$

$$= \frac{1}{N} T^H \cdot H_o^H \cdot H_o \cdot T$$

Here, the following formula is satisfied.

$$H_o^H \cdot H_o = \begin{bmatrix} 1 & e^{j\frac{\pi}{N}} & \cdots & e^{j\frac{(N-1)^2\pi}{N}} \\ e^{j\frac{\pi}{N}} & 1 & \ddots & e^{j\frac{(N-2)^2\pi}{N}} \\ \vdots & \ddots & \ddots & \vdots \\ e^{j\frac{(N-1)^2\pi}{N}} & e^{j\frac{(N-2)^2\pi}{N}} & \cdots & 1 \end{bmatrix} \cdot \quad \text{[Numeral 114]}$$

$$\begin{bmatrix} 1 & e^{-j\frac{\pi}{N}} & \cdots & e^{-j\frac{(N-1)^2\pi}{N}} \\ e^{-j\frac{\pi}{N}} & 1 & \ddots & e^{-j\frac{(N-2)^2\pi}{N}} \\ \vdots & \ddots & \ddots & \vdots \\ e^{-j\frac{(N-1)^2\pi}{N}} & e^{-j\frac{(N-2)^2\pi}{N}} & \cdots & 1 \end{bmatrix}$$

$$= N \cdot I$$

When N is an even number, an arbitrary column vector or arbitrary row vector is a vector obtained by cyclic shifting Chu sequence, and the autocorrelation values thereof (E[a·a*]) are orthogonal to each other. When N is an odd number, cyclic shift does not appear. However, it can be understood from the following description that the orthogonal relationship has been established.

(Case where Unitary Matrix Calculation is Performed Only on Transmission Side)

In this case, the following formula is satisfied.

$$H = W \cdot H_o \cdot T \quad \text{[Numeral 115]}$$

$$= U \cdot \Lambda^{1/2} \cdot V^H$$

$$= \begin{bmatrix} 1 & 0 & \cdots & 0 \\ 0 & 1 & \cdots & 0 \\ \vdots & \vdots & \ddots & \vdots \\ 0 & 0 & \cdots & 1 \end{bmatrix} \cdot \begin{bmatrix} \sqrt{N} & 0 & \cdots & 0 \\ 0 & \sqrt{N} & \cdots & 0 \\ \vdots & \vdots & \ddots & \vdots \\ 0 & 0 & \cdots & \sqrt{N} \end{bmatrix} \cdot V^H$$

Accordingly, the following formula is satisfied.

$$V^H = \frac{1}{\sqrt{N}} \cdot W \cdot H_o \cdot T \quad \text{[Numeral 116]}$$

Thus, the following formula is obtained.

$$V = \frac{1}{\sqrt{N}} \cdot T^H \cdot H_o^H \cdot W^H \quad \text{[Numeral 117]}$$

$$= \frac{1}{\sqrt{N}} \cdot \begin{bmatrix} 1 & 0 & \cdots & 0 \\ 0 & e^{-j\Phi_1} & \cdots & 0 \\ \vdots & \vdots & \ddots & \vdots \\ 0 & 0 & \cdots & e^{-j\Phi_{N-1}} \end{bmatrix} \cdot$$

$$\begin{bmatrix} 1 & e^{j\frac{\pi}{N}} & \cdots & e^{j\frac{(N-1)^2\pi}{4}} \\ e^{j\frac{\pi}{N}} & 1 & \ddots & e^{j\frac{(N-2)^2\pi}{4}} \\ \vdots & \ddots & \ddots & \vdots \\ e^{j\frac{(N-1)^2\pi}{4}} & e^{j\frac{(N-2)^2\pi}{4}} & \cdots & 1 \end{bmatrix} \cdot$$

$$\begin{bmatrix} 1 & 0 & \cdots & 0 \\ 0 & e^{-j\phi_1} & \cdots & 0 \\ \vdots & \vdots & \ddots & \vdots \\ 0 & 0 & \cdots & e^{-j\phi_{N-1}} \end{bmatrix}$$

That is, even in the configuration in which arbitrary number N of antennas are used, the virtual orthogonal channels can be formed by the matrix calculation V only on the transmission side even in the case where the local oscillators are provided independently for respective antennas and where a displacement in the highly sensitive antenna direction occurs.

(Case where Unitary Matrix Calculation is Performed Both on Transmission and Reception Sides)

[Singular Value Diagonal Matrix $\Lambda^{1/2}$]

In this case, singular value diagonal matrix $\Lambda^{1/2}$ is represented by the following formula.

$$\Lambda^{1/2} = \begin{bmatrix} \sqrt{\lambda_1} & 0 & \cdots & 0 \\ 0 & \sqrt{\lambda_2} & \cdots & 0 \\ \vdots & \vdots & \ddots & \vdots \\ 0 & 0 & \cdots & \sqrt{\lambda_N} \end{bmatrix} \quad \text{[Numeral 118]}$$

-continued $$= \begin{bmatrix} \sqrt{N} & 0 & \cdots & 0 \\ 0 & \sqrt{N} & \cdots & 0 \\ \vdots & \vdots & \ddots & \vdots \\ 0 & 0 & \cdots & \sqrt{N} \end{bmatrix}$$

Accordingly, the following formula is obtained.

$$H = W \cdot H_o \cdot T = U \cdot \Lambda^{1/2} \cdot V^H = \sqrt{N} \cdot U \cdot V^H \qquad \text{[Numeral 119]}$$

When an arbitrary unitary matrix is used as V, the following formula is obtained.

$$U = \frac{1}{\sqrt{N}} \cdot W \cdot H_o \cdot T \cdot V \qquad \text{[Numeral 120]}$$

Incidentally, the following formula is satisfied.

$$U^H \cdot U = \frac{1}{\sqrt{N}} \cdot V^H \cdot T^H \cdot H_o^H \cdot W^H \cdot \qquad \text{[Numeral 121]}$$

$$\frac{1}{\sqrt{N}} \cdot W \cdot H_o \cdot T \cdot V$$

$$= \frac{1}{N} \cdot N \cdot I$$

$$= I$$

Thus, even when an arbitrary unitary matrix is used as V, U becomes a unitary matrix.

Accordingly, the following formula is obtained.

$$U^H = \frac{1}{\sqrt{N}} \cdot V^H \cdot T^H \cdot H_o^H \cdot W^H \qquad \text{[Numeral 122]}$$

$$= \frac{V^H}{\sqrt{N}} \cdot \begin{bmatrix} 1 & 0 & \cdots & 0 \\ 0 & e^{-j\Phi_1} & \cdots & 0 \\ \vdots & \vdots & \ddots & \vdots \\ 0 & 0 & \cdots & e^{-j\Phi_{N-1}} \end{bmatrix} \cdot$$

$$\begin{bmatrix} 1 & e^{j\frac{\pi}{N}} & \cdots & e^{j\frac{(N-1)^2\pi}{N}} \\ e^{j\frac{\pi}{N}} & 1 & \cdots & e^{j\frac{(N-2)^2\pi}{N}} \\ \vdots & \vdots & \ddots & \vdots \\ e^{j\frac{(N-1)^2\pi}{N}} & e^{j\frac{(N-2)^2\pi}{N}} & \cdots & 1 \end{bmatrix} \cdot$$

$$\begin{bmatrix} 1 & 0 & \cdots & 0 \\ 0 & e^{-j\phi_1} & \cdots & 0 \\ \vdots & \vdots & \ddots & \vdots \\ 0 & 0 & \cdots & e^{-j\phi_{N-1}} \end{bmatrix}$$

That is, even when an arbitrary number N of antennas are used in the configuration in which unitary matrix calculation is performed both on the transmission and reception sides, the virtual orthogonal channels can be formed by the unitary matrix calculation only on the reception side even in the case where the local oscillators are provided independently for respective antennas and where a displacement in the highly sensitive antenna direction occurs.

At this time, a fixed transmission matrix V may be any one as long as it is a unitary matrix, and a reception side unitary matrix calculation is represented by the following formula to act so as to compensate for a variation caused by the local oscillators or due to antenna displacement.

$$U^H = \frac{V^H}{\sqrt{N}} \cdot T^H \cdot H_o^H \cdot W^H \qquad \text{[Numeral 123]}$$

As a simple example, the above formula is applied to a configuration in which two antennas are used.

As a fixed arbitrary transmission matrix, a matrix represented by the following formula is selected.

$$V = \begin{bmatrix} \frac{-1}{\sqrt{2}} & \frac{1}{\sqrt{2}} \\ \frac{-1}{\sqrt{2}} & \frac{-1}{\sqrt{2}} \end{bmatrix} \qquad \text{[Numeral 124]}$$

Here, the following formula is satisfied.

$$H_0 = \begin{bmatrix} 1 & -j \\ -j & 1 \end{bmatrix} \qquad \text{[Numeral 125]}$$

Accordingly, the following formula is satisfied.

$$U^H = \frac{V^H}{\sqrt{N}} \cdot T^H \cdot H_o^H \cdot W^H \qquad \text{[Numeral 126]}$$

$$= \begin{bmatrix} \frac{-1}{2} & \frac{-1}{2} \\ \frac{1}{2} & \frac{-1}{2} \end{bmatrix} \cdot \begin{bmatrix} 1 & 0 \\ 0 & e^{-j\Phi_1} \end{bmatrix} \cdot \begin{bmatrix} 1 & j \\ j & 1 \end{bmatrix} \cdot \begin{bmatrix} 1 & 0 \\ 0 & e^{-j\phi_1} \end{bmatrix}$$

$$= \begin{bmatrix} \frac{-1 - je^{-j\Phi_1}}{2} & \frac{-je^{-j\phi_1} - je^{-j(\Phi_1+\phi_1)}}{2} \\ \frac{1 - je^{-j\Phi_1}}{2} & \frac{je^{-j\phi_1} - je^{-j(\Phi_1+\phi_1)}}{2} \end{bmatrix}$$

In the following, the orthogonal relationship used in [Numeral 114] will be described.

Here, a product of arbitrary m-row vectors and arbitrary n-column vectors in the following formula is calculated.

$$H_0^H \cdot H_0 = \begin{bmatrix} 1 & e^{j\frac{\pi}{N}} & \cdots & e^{j\frac{(N-1)^2\pi}{N}} \\ e^{j\frac{\pi}{N}} & 1 & \ddots & e^{j\frac{(N-2)^2\pi}{N}} \\ \vdots & \ddots & \ddots & \vdots \\ e^{j\frac{(N-1)^2\pi}{N}} & e^{j\frac{(N-2)^2\pi}{N}} & \cdots & 1 \end{bmatrix} \cdot \qquad \text{[Numeral 127]}$$

$$\begin{bmatrix} 1 & e^{-j\frac{\pi}{N}} & \cdots & e^{-j\frac{(N-1)^2\pi}{N}} \\ e^{-j\frac{\pi}{N}} & 1 & \ddots & e^{-j\frac{(N-2)^2\pi}{N}} \\ \vdots & \ddots & \ddots & \vdots \\ e^{-j\frac{(N-1)^2\pi}{N}} & e^{-j\frac{(N-2)^2\pi}{N}} & \cdots & 1 \end{bmatrix}$$

1) When m<n, the following formula is satisfied.

$$\sum_{k=1}^{m} e^{j\frac{(m-k)2\pi}{N}} \cdot e^{-j\frac{(n-k)2\pi}{N}} + \sum_{k=m+1}^{n} e^{j\frac{(k-m)2\pi}{N}} \cdot e^{-j\frac{(n-k)2\pi}{N}} +$$ [Numeral 128]

$$\sum_{k=n+1}^{N} e^{j\frac{(k-m)2\pi}{N}} \cdot e^{-j\frac{(k-n)2\pi}{N}} =$$

$$\sum_{k=1}^{N} e^{j\frac{(m-k)2\pi}{N}} \cdot e^{-j\frac{(n-k)2\pi}{N}} =$$

$$\sum_{k=1}^{N} e^{j\frac{(m^2-n^2-2k(m-n))\pi}{N}} = e^{j\frac{(m^2-n^2)\pi}{N}} \cdot \sum_{k=1}^{N} e^{-j\frac{2k(m-n)\pi}{N}}$$

Here, it is assumed that the following formula is satisfied.

$$S = \sum_{k=1}^{N} e^{-j\frac{2k(m-n)\pi}{N}} = \sum_{k=1}^{N} \left(e^{-j\frac{2(m-n)\pi}{N}}\right)^k$$ [Numeral 129]

In this case, the following formula is satisfied.

$$\left(1 - e^{-j\frac{2(m-n)\pi}{N}}\right) \cdot S = e^{-j\frac{2(m-n)\pi}{N}} - \left(e^{-j\frac{2(m-n)\pi}{N}}\right)^{N+1}$$ [Numeral 130]

$$= e^{-j\frac{2(m-n)\pi}{N}} \cdot \left\{1 - \left(e^{-j\frac{2(m-n)\pi}{N}}\right)^N\right\}$$

$$= 0 \therefore S = 0$$

Thus, the orthogonal relationship is established.

2) When m>n, the following formula is satisfied.

$$\sum_{k=1}^{n} e^{j\frac{(m-k)2\pi}{N}} \cdot e^{-j\frac{(n-k)2\pi}{N}} + \sum_{k=n+1}^{m} e^{j\frac{(m-k)2\pi}{N}} \cdot e^{-j\frac{(k-n)2\pi}{N}} +$$ [Numeral 131]

$$\sum_{k=m+1}^{N} e^{j\frac{(k-m)2\pi}{N}} \cdot e^{-j\frac{(k-n)2\pi}{N}} =$$

$$\sum_{k=1}^{N} e^{j\frac{(m-k)2\pi}{N}} \cdot e^{-j\frac{(n-k)2\pi}{N}} =$$

$$\sum_{k=1}^{N} e^{j\frac{(m^2-n^2-2k(m-n))\pi}{N}} = e^{j\frac{(m^2-n^2)\pi}{N}} \cdot \sum_{k=1}^{N} e^{-j\frac{2k(m-n)\pi}{N}}$$

Similarly, the following formula is satisfied.

$$S = \sum_{k=1}^{N} e^{-j\frac{2k(m-n)\pi}{N}} = \sum_{k=1}^{N} \left(e^{-j\frac{2(m-n)\pi}{N}}\right)^k = 0$$ [Numeral 132]

Thus, the orthogonal relationship is established.

From the above, the following formula is obtained.

$$H_0^H \cdot H_0 = \begin{bmatrix} 1 & e^{j\frac{\pi}{N}} & \cdots & e^{j\frac{(N-1)2\pi}{N}} \\ e^{j\frac{\pi}{N}} & 1 & \ddots & e^{j\frac{(N-2)2\pi}{N}} \\ \vdots & \vdots & \ddots & \vdots \\ e^{j\frac{(N-1)2\pi}{N}} & e^{j\frac{(N-2)2\pi}{N}} & \cdots & 1 \end{bmatrix}$$ [Numeral 133]

$$\begin{bmatrix} 1 & e^{-j\frac{\pi}{N}} & \cdots & e^{-j\frac{(N-1)2\pi}{N}} \\ e^{-j\frac{\pi}{N}} & 1 & \ddots & e^{-j\frac{(N-2)2\pi}{N}} \\ \vdots & \ddots & \ddots & \vdots \\ e^{-j\frac{(N-1)2\pi}{N}} & e^{-j\frac{(N-2)2\pi}{N}} & \cdots & 1 \end{bmatrix}$$

$$= N \cdot I$$

The configuration using a plurality of antennas, in which a displacement in the highly sensitive antenna direction occurs and phase noise caused due to absence of synchronization between carriers in the configuration where the local oscillators are provided for respective antennas are compensated only by the reception side unitary matrix U, and communication capacity becomes a multiple of the number of antennas has been described.

In the following, characteristics in a condition where an ideal antenna interval is not set, i.e., where the virtual orthogonal channels have different widths will be described. The fifth example is used as an example.

[Analysis of Characteristics in SVD Method Based on Line-of-Sight Fixed Channels and in Fifth Configuration Example] (Case where Virtual Orthogonal Channels have Different Widths, where Matrix Calculation is Performed Only on Reception Side, and where Local Oscillators are Provided Independently for Respective Antennas Both on Transmission and Reception Sides)

Characteristics analysis is performed for the proposed method (fifth example) in which antenna interval is set based on antenna positions different from optimum antenna positions for flexibility, while comparing to the SVD method.

First, referring to the fifth example, assuming that reception signal vector is r, a signal vector after the matrix calculation on the reception side is represented by the following formula.

$$U^{-1} \cdot r = U^{-1} \cdot (H \cdot S + n) = U^{-1} \cdot (U \cdot \Lambda^{1/2} \cdot S + n) = \Lambda^{1/2} \cdot S + U^{-1} \cdot n \because V = I$$ [Numeral 134]

where S denotes a transmission signal vector, and n denotes a noise vector.

Further, from the fifth example, the following formula is satisfied.

$$U^{-1} = \begin{bmatrix} -je^{j\alpha}\frac{\cos(\alpha/2)}{\sin\alpha} & je^{-j\Phi}\frac{\sin(\alpha/2)}{\sin\alpha} \\ je^{-j\Phi}\frac{\sin(\alpha/2)}{\sin\alpha} & -je^{-j(\Phi+\phi)}e^{j\alpha}\frac{\sin(\alpha/2)}{\sin\alpha} \end{bmatrix}$$ [Numeral 135]

Accordingly, the transmission signal vector S and noise vector n are set as the following formula.

$$S = \begin{bmatrix} s_1 \\ s_2 \end{bmatrix}, n = \begin{bmatrix} n_1 \\ n_2 \end{bmatrix}$$ [Numeral 136]

Further, normalization is applied to obtain the following formula for comparison using relative values.

$$E[|s_1|^2]=E[|s_2|^2]=1, E[|n_1|^2]=e[|n_2|^2]=1 \quad \text{[Numeral 137]}$$

Thus, the $SNR_1$ of $\lambda_1$ channel is represented by the following formula.

$$SNR_1 = \frac{|\lambda_1 \cdot s_1|^2}{E\left[\left|-je^{j\alpha}\frac{\cos(\alpha/2)}{\sin\alpha}\cdot n_1 + je^{-j\phi}\frac{\cos(\alpha/2)}{\sin\alpha}\cdot n_2\right|^2\right]} \quad \text{[Numeral 138]}$$

$$= \frac{2+2\cos\alpha}{\left(2\cdot\frac{\cos(\alpha/2)}{\sin\alpha}\right)^2}$$

$$= \frac{4\cdot\cos^2(\alpha/2)}{4\cdot\frac{\cos^2(\alpha/2)}{\sin^2\alpha}}$$

$$= \sin^2\alpha$$

Similarly, the $SNR_2$ of $\lambda_2$ channel is represented by the following formula.

$$SNR_2 = \frac{|\lambda_2 \cdot s_2|^2}{E\left[\left|je^{-j\Phi}\frac{\sin(\alpha/2)}{\sin\alpha}\cdot n_1 - je^{-j(\Phi+\phi)}e^{j\alpha}\frac{\sin(\alpha/2)}{\sin\alpha}\cdot n_2\right|^2\right]} \quad \text{[Numeral 139]}$$

$$= \frac{2-2\cos\alpha}{\left(2\cdot\frac{\cos(\alpha/2)}{\sin\alpha}\right)^2}$$

$$= \frac{4\cdot\sin^2(\alpha/2)}{4\cdot\frac{\sin^2(\alpha/2)}{\sin^2\alpha}}$$

$$= \sin^2\alpha$$

Thus, although the orthogonal channels have different widths, both the $SNR_1$ and $SNR_2$ become $\sin^2\alpha$.

(SVD Method)

For comparison to the fifth example, characteristics analysis of the SVD method is performed.

First, from the configuration diagram of FIG. 1, a reception signal vector after unitary matrix calculation according to the SVD method is represented by the following formula.

$$U^H \cdot r = U^H \cdot (H \cdot V \cdot S + n) = U^H \cdot (U \cdot \Lambda^{1/2} \cdot V^H \cdot V \cdot S + n) = \Lambda^{1/2} \cdot S + U^H \cdot n \quad \text{[Numeral 140]}$$

Accordingly, from $U^H$ of [Numeral 43], $SNR_1$ of the $\lambda_1$ channel after normalization is represented by the following formula.

$$SNR_1 = \frac{|\lambda_1 \cdot s_1|^2}{E\left[\left|\frac{-e^{j\alpha/2}}{\sqrt{2}}\cdot n_1 + \frac{-e^{j\alpha/2}}{\sqrt{2}}\cdot n_2\right|^2\right]} \quad \text{[Numeral 141]}$$

$$= \frac{2+2\cos\alpha}{\left(2\cdot\frac{1}{\sqrt{2}}\right)^2}$$

$$= 1 + \cos\alpha$$

Similarly, $SNR_2$ of $\lambda_2$ channel is represented by the following formula.

$$SNR_2 = \frac{|\lambda_2 \cdot s_2|^2}{E\left[\left|\frac{-je^{j\alpha/2}}{\sqrt{2}}\cdot n_1 + \frac{je^{j\alpha/2}}{\sqrt{2}}\cdot n_2\right|^2\right]} \quad \text{[Numeral 142]}$$

$$= \frac{2-2\cos\alpha}{\left(2\cdot\frac{1}{\sqrt{2}}\right)^2}$$

$$= 1 - \cos\alpha$$

Thus, the widths of the orthogonal channels are proportional to $\lambda_1=2+2\cos\alpha$ and $\lambda_2=2-2\cos\alpha$ and, accordingly, the $SNR_1$ and $SNR_2$ become $1+1\cos\alpha$ and $1-1\cos\alpha$, respectively.

(Comparison Between SNRs of Orthogonal Channels Based on Respective Methods in Terms of Antenna Interval)

Figure 9:
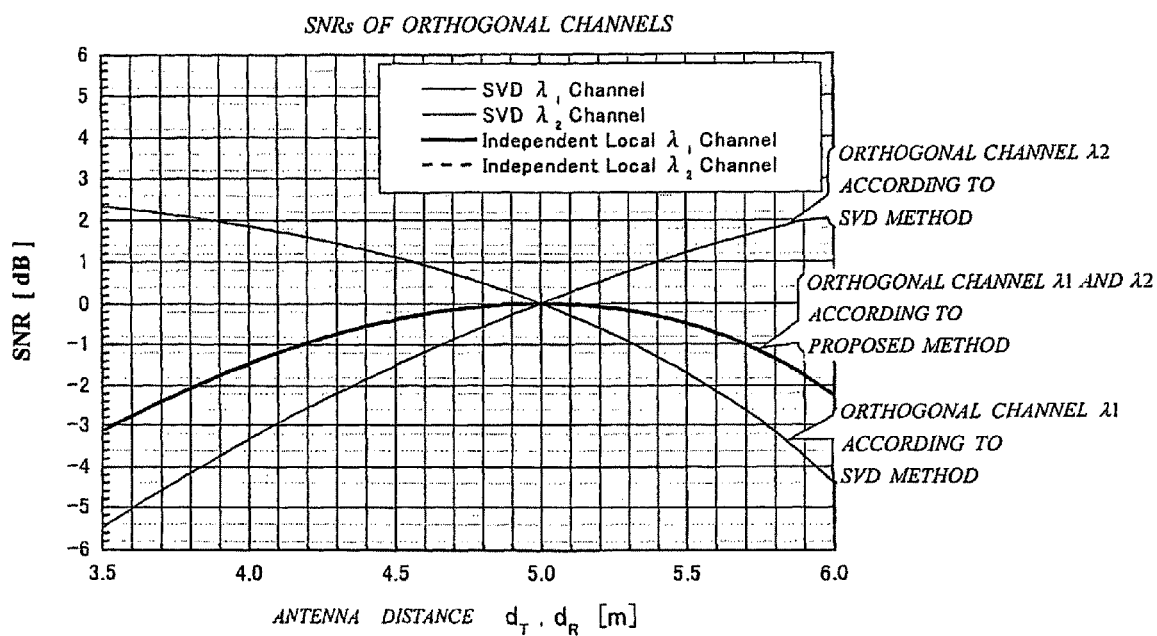
FIG. 9 A view showing comparison between SNRs of virtual orthogonal channels based on respective methods in terms of antenna distance.

When the characteristics analysis results of the proposed method (fifth example) and SVD method are compared with each other in terms of antenna intervals $d_T$ and $d_R$, a graph of FIG. 9 is obtained. The proposed method exhibits the same SNR value between the orthogonal channels $\lambda_1$ and $\lambda_2$ and thus it can be understood that a variation with respect to the antenna interval is small.

For achievement of a practical and flexible configuration, the analysis has been made with the assumption that matrix calculation processing is performed only on the reception side so as to eliminate the need to use the feedback information to be sent to the transmission side in a configuration different from one in which there exists an inter-antenna position at which an eigenvalue is a multiplicity condition to generated a singular point.

Signal power after the matrix calculation on the reception side is proportional to eigenvalue both in the proposed method and SVD method. In the case of the SVD method, the matrix calculation on the reception side is based on the unitary matrix, so that noise power does not change but keeps a constant value even if the eigenvalue changes. Therefore, the SNRs of the respective paths in the SNR method become different values which are proportional to the eigenvalue and change in accordance with the antenna interval.

On the other hand, in the proposed method, the matrix calculation on the reception side is not based on the unitary matrix, so that noise power changes in accordance with eigenvalue. Thus, an analysis result of FIG. 9 reveals that although signal power exhibits high power and low power in proportion to the eigenvalue, the SNRs of the respective paths always exhibit the same value and change in accordance with the antenna interval in the same proportion.

Thus, in the proposed method, the SNR with respect to the virtual orthogonal channel does not change even when the antennal interval changes and, if a change occurs, the change amount is small, so that it can be said that the proposed method is more practical and easier to use than the SVD method.

The content of theoretical analysis with the assumption that the local oscillators are provided independently for respective antennas can be traced to the same modeling also with respect to the movement in the highly sensitive antenna direction, thus fully covering influence by a subtle change of weather condition such as wind.

Next, arrangement considering actual installation locations will be described. It is likely to be difficult to ensure antenna installation location nearer to the user side. On the other hand, it is more likely to be easier to ensure antenna installation locations on the backbone network side opposed to the user side. In the following, a configuration shown in FIG. 10 in which antenna intervals differ from each other between the transmission and reception side will be described.

Figure 10:
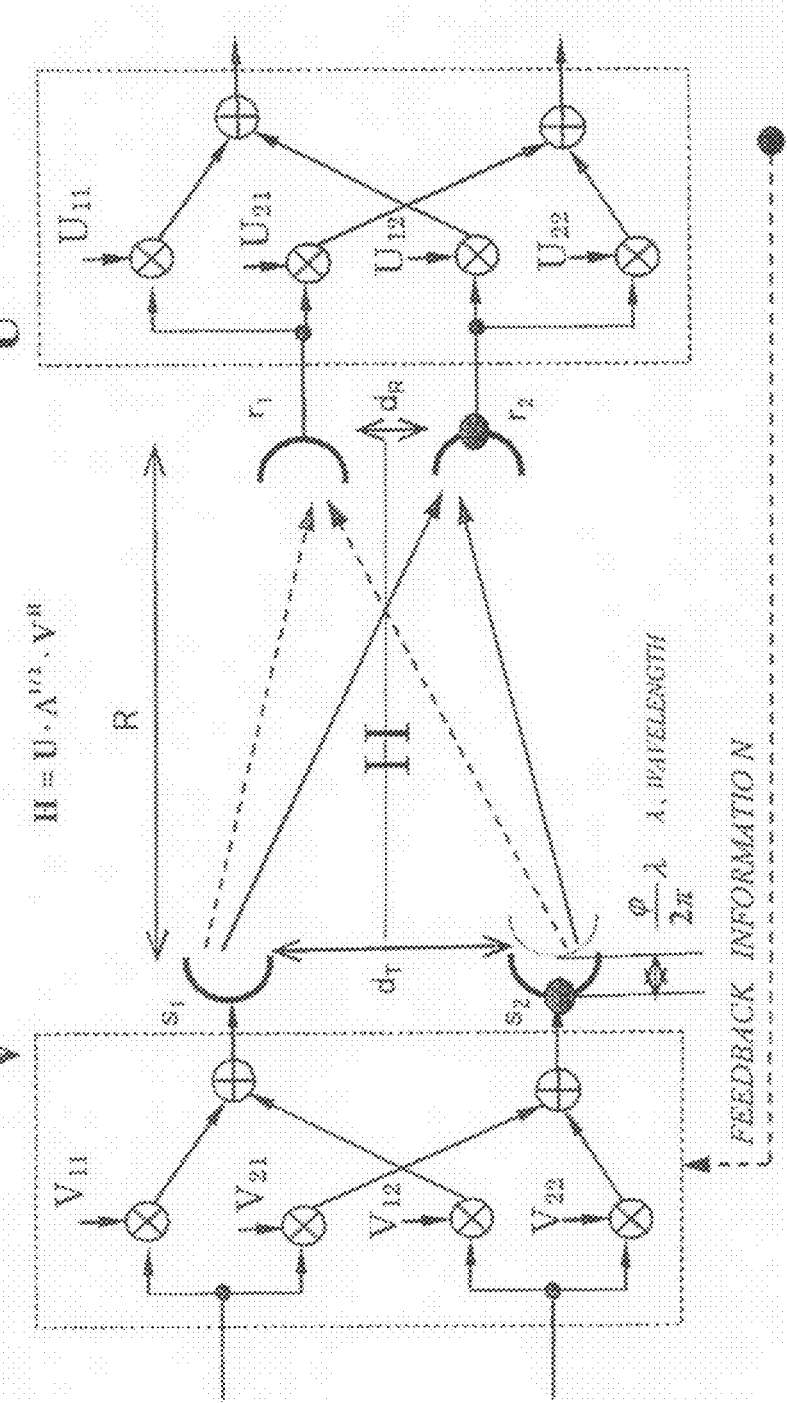
FIG. 10 A view showing a configuration example in which antenna distances differ from each other between transmission and reception sides.
Figure 11:
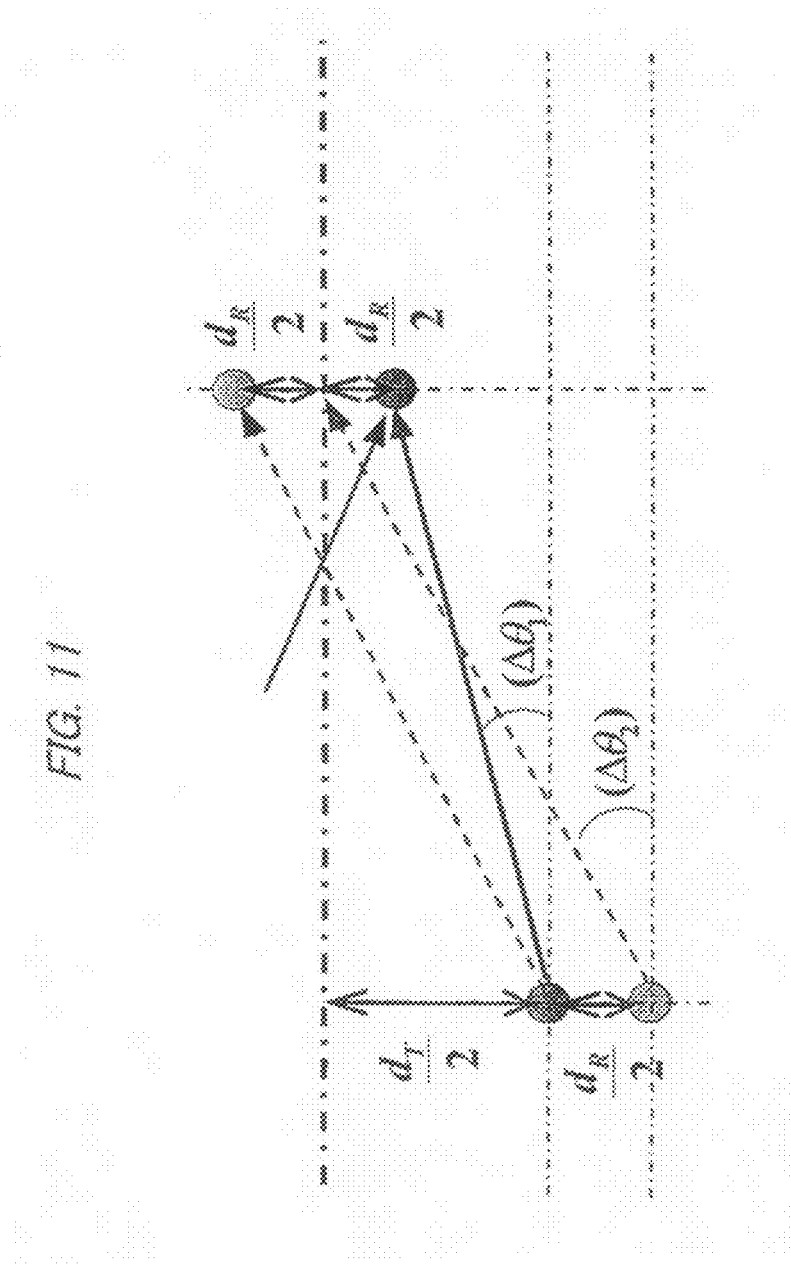
FIG. 11 A view obtained by modeling the lower half of the vertically symmetric channel configuration of FIG. 10.

FIG. 11, which is obtained by modeling the lower half of the vertically symmetric channel configuration of FIG. 10 is used to perform analysis as follows.

The distance decay and common phase shift based on a transmitter-receiver distance R are determined by relative phase shift and therefore can be ignored. In the following, R is set as a reference. Then, the channel difference of a diagonal channel of angle $\Delta\theta_1$ with respect to R is represented by the following formula.

$$R \cdot (1 - \cos(\Delta\theta_1)) \approx R \cdot \left(\frac{(\Delta\theta_1)^2}{2}\right) \quad \text{[Numeral 143]}$$
$$= R \cdot \left(\frac{1}{2}\left(\frac{d_T - d_R}{2R}\right)^2\right)$$
$$= \frac{(d_T - d_R)^2}{8R}$$
$$\because \frac{\frac{d_T}{2} - \frac{d_R}{2}}{R}$$
$$= \frac{d_T - d_R}{2R}$$
$$= \tan(\Delta\theta_1)$$
$$\approx (\Delta\theta_1)$$

Similarly, the channel difference of a diagonal channel of angle $\Delta\theta_2$ with respect to R is represented by the following formula.

$$R \cdot (1 - \cos(\Delta\theta_1)) \approx R \cdot \left(\frac{(\Delta\theta_2)^2}{2}\right) \quad \text{[Numeral 144]}$$
$$= R \cdot \left(\frac{1}{2}\left(\frac{d_T + d_R}{2R}\right)^2\right)$$
$$= \frac{(d_T + d_R)^2}{8R}$$
$$\because \frac{\frac{d_T}{2} + \frac{d_R}{2}}{R}$$
$$= \frac{d_t + d_R}{2R}$$
$$= \tan(\Delta\theta_2)$$
$$\approx (\Delta\theta_2)$$

The phase rotation $\alpha$ resulting from the channel difference between two waves at the reception points is represented by the following formula.

$$\alpha = 2\pi\left(\frac{(d_T + d_R)^2 - (d_T - d_R)^2}{8R}\right)\bigg/\gamma \quad \text{[Numeral 145]}$$
$$= \frac{\pi}{\gamma} \cdot \frac{4 \cdot d_T \cdot d_R}{4 \cdot R}$$
$$= \frac{\pi}{\gamma} \cdot \frac{d_T \cdot d_R}{R}$$

Incidentally, assuming that RF frequency=30 GHz, R=2000 m, $d_T$=5 m, and $d_R$=2 m, the following formula is satisfied.

$$\alpha = \frac{\pi}{\gamma} \cdot \frac{d_T \cdot d_R}{R} = \frac{\pi}{(3 \cdot 10^8)/(30 \cdot 10^9)} \cdot \frac{5 \times 2}{2000} = \frac{\pi}{2} \quad \text{[Numeral 146]}$$

With phase shift $\Phi$ caused due to a positional variation of an antenna for transmitting a signal $s_2$ taken into consideration, the channel matrix H normalized by the diagonal channel of angle $\Delta\theta_1$ is represented by the following formula.

$$H = \begin{bmatrix} 1 & e^{-j\alpha} \cdot e^{j\Phi} \\ e^{-j\alpha} & 1 \cdot e^{j\Phi} \end{bmatrix} \quad \text{[Numeral 147]}$$

Thus, the same condition as results that have so far been obtained is exhibited.

Further, from the following [Numeral 148], [Numeral 149] is obtained.

$$\Omega = H^H \cdot H \quad \text{[Numeral 148]}$$
$$= \begin{bmatrix} 1 & e^{j\alpha} \\ e^{j\alpha} \cdot e^{-j\Phi} & e^{-j\Phi} \end{bmatrix} \cdot \begin{bmatrix} 1 & e^{-j\alpha} \cdot e^{j\Phi} \\ e^{-j\alpha} & e^{j\Phi} \end{bmatrix}$$
$$= \begin{bmatrix} 2 & e^{j\alpha}(e^{j\alpha} + e^{-j\alpha}) \\ e^{-j\Phi}(e^{j\alpha} + e^{-j\alpha}) & 2 \end{bmatrix}$$
$$= \begin{bmatrix} 2 & 2 \cdot \cos\alpha \cdot e^{j\Phi} \\ 2 \cdot \cos\alpha \cdot e^{-j\Phi} & 2 \end{bmatrix}$$

$$\begin{vmatrix} 2 - \lambda & 2 \cdot \cos\alpha \cdot e^{j\Phi} \\ 2 \cdot \cos\alpha \cdot e^{-j\Phi} & 2 - \lambda \end{vmatrix} = \lambda^2 + 4 - 4\lambda - 4\cos^2\alpha \quad \text{[Numeral 149]}$$
$$= \lambda^2 - 4\lambda - 4\sin^2\alpha$$
$$= 0$$

$$\therefore \lambda = 2 \pm \sqrt{4 - 4\sin^2\alpha}$$
$$= 2 \pm 2\cos\alpha$$

Figure 12:
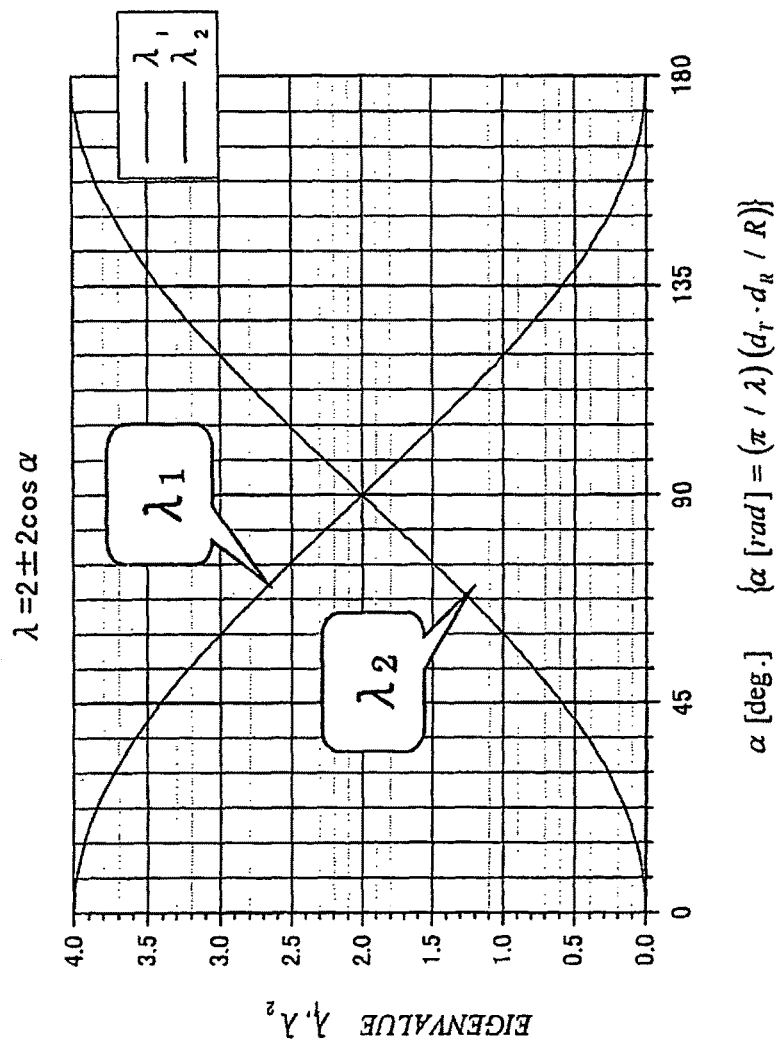
FIG. 12 A view showing communication capacity in the case of FIG. 10 where antenna distances differ from each other between transmission and reception sides.

FIG. 12 is a graph showing this result. When $\alpha=(\pi/\lambda)\cdot(d_R^2/R) \to \alpha=(\pi/\lambda)\cdot(d_T \cdot d_R/R)$ is constructed from the above result, the same result is obtained. Thus, it can be understood that the proposed method can be used without modification.

A case where a diamond-shaped misalignment occurs in the antenna arrangement direction between the transmission and reception antennas will be described.

Figure 13:
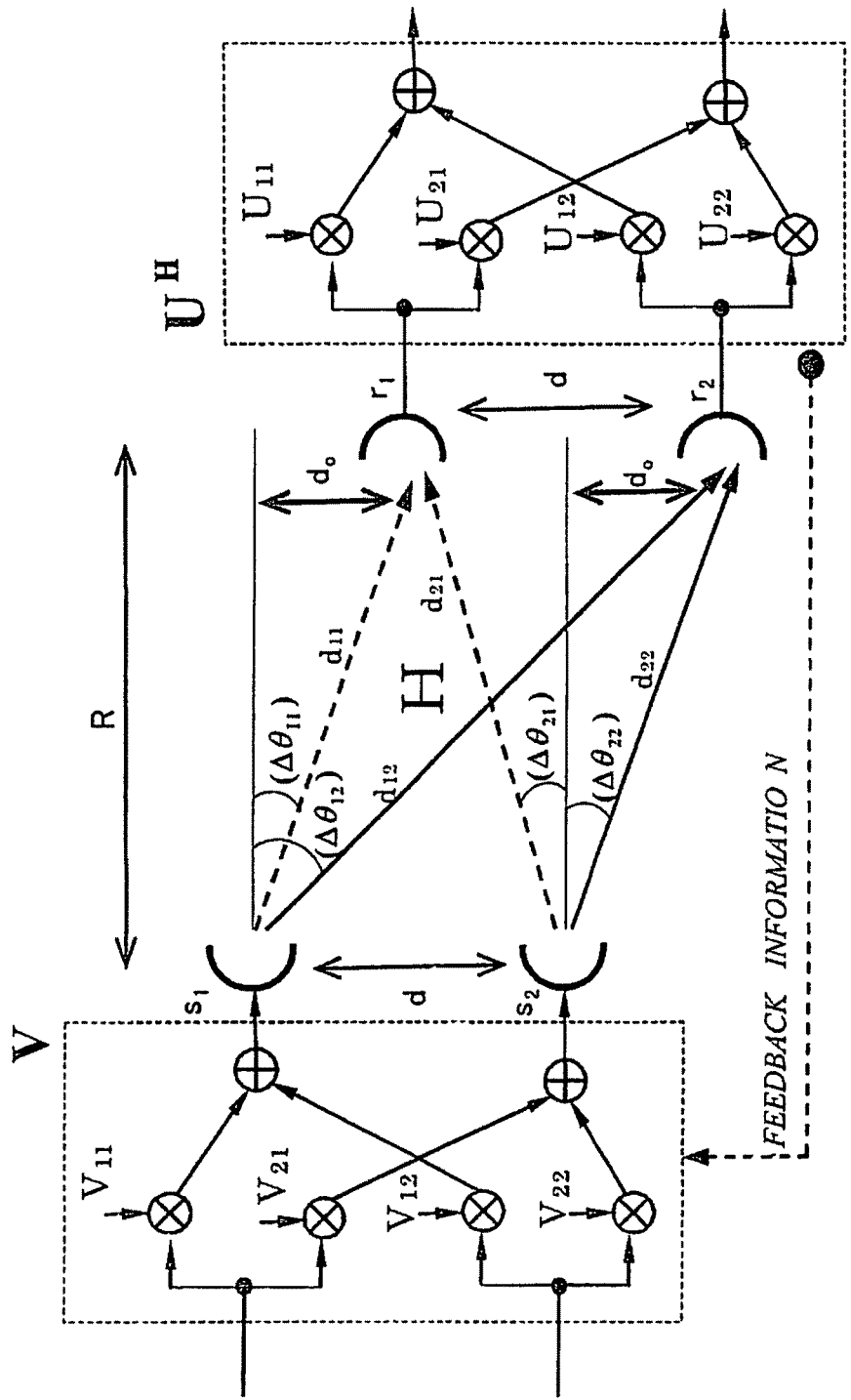
FIG. 13 A view showing a configuration example in which antenna arrangement between the transmission and reception sides is formed in a diamond shape along the antenna arrangement direction.

In FIG. 13, R is set as a reference, as in the above case. Then, channel differences of diagonal channels $d_{11}$, $d_{12}$, $d_{21}$, and $d_{22}$ with respect to R are represented as follows.

In the case of $d_{11}$;

$$R \cdot (1 - \cos(\Delta\theta_{11})) \approx R \cdot \left(\frac{(\Delta\theta_{11})^2}{2}\right) \quad \text{[Numeral 150]}$$
$$= R \cdot \left(\frac{1}{2}\left(\frac{d_o}{R}\right)^2\right)$$
$$= \frac{d_o^2}{2R}$$
$$\therefore \frac{d_o}{R} = \tan(\Delta\theta_{11})$$
$$\approx (\Delta\theta_{11})$$

In the case of $d_{12}$;

$$R \cdot (1 - \cos(\Delta\theta_{12})) \approx R \cdot \left(\frac{(\Delta\theta_{12})^2}{2}\right) \quad \text{[Numeral 151]}$$
$$= R \cdot \left(\frac{1}{2}\left(\frac{d + d_o}{R}\right)^2\right)$$
$$= \frac{(d + d_o)^2}{2R}$$
$$= \frac{d^2 + d_o^2 + 2dd_o}{2R}$$
$$\therefore \frac{d + d_o}{R} = \tan(\Delta\theta_{12})$$
$$\approx (\Delta\theta_{12})$$

In the case of $d_{21}$;

$$R \cdot (1 - \cos(\Delta\theta_{21})) \approx R \cdot \left(\frac{(\Delta\theta_{21})^2}{2}\right) \quad \text{[Numeral 152]}$$
$$= R \cdot \left(\frac{1}{2}\left(\frac{d - d_o}{R}\right)^2\right)$$
$$= \frac{(d - d_o)^2}{2R}$$
$$= \frac{d^2 + d_o^2 - 2dd_o}{2R}$$
$$\therefore \frac{d - d_o}{R} = \tan(\Delta\theta_{21})$$
$$\approx (\Delta\theta_{21})$$

In the case of $d_{22}$;

$$R \cdot (1 - \cos(\Delta\theta_{22})) \approx R \cdot \left(\frac{(\Delta\theta_{22})^2}{2}\right) \quad \text{[Numeral 153]}$$
$$= R \cdot \left(\frac{1}{2}\left(\frac{d_o}{R}\right)^2\right)$$
$$= \frac{d_o^2}{2R}$$
$$\therefore \frac{d_o}{R} = \tan(\Delta\theta_{22})$$
$$\approx (\Delta\theta_{22})$$

Assuming that that the phase rotation resulting from the channel difference is represented by $\alpha = 2\pi(d^2/2R)/\gamma = (\pi/\gamma) \cdot (d^2/R)$, $\zeta = 2\pi(2 \cdot d \cdot d_o/2R)/\gamma = (\pi/\gamma) \cdot (2 \cdot d \cdot d_o/R)$, the channel matrix H normalized by the channel $d_{11}$ is represented by the following formula.

$$H = \begin{bmatrix} 1 & e^{-j\alpha} \cdot e^{j\xi} \\ e^{-j\alpha} \cdot e^{-j\xi} & 1 \end{bmatrix} \quad \text{[Numeral 154]}$$

Accordingly, the following formula is obtained.

$$\Omega = H^H \cdot H \quad \text{[Numeral 155]}$$
$$= \begin{bmatrix} 1 & e^{j\alpha} \cdot e^{j\xi} \\ e^{j\alpha} \cdot e^{-j\xi} & 1 \end{bmatrix} \cdot \begin{bmatrix} 1 & e^{-j\alpha} \cdot e^{j\xi} \\ e^{-j\alpha} \cdot e^{-j\xi} & 1 \end{bmatrix}$$
$$= \begin{bmatrix} 2 & e^{j\xi}(e^{j\alpha} + e^{-j\alpha}) \\ e^{-j\xi}(e^{j\alpha} + e^{-j\alpha}) & 2 \end{bmatrix}$$
$$= \begin{bmatrix} 2 & 2 \cdot \cos\alpha \cdot e^{j\xi} \\ 2 \cdot \cos\alpha \cdot e^{-j\xi} & 2 \end{bmatrix}.$$

From the above, the following formula is obtained.

$$\begin{vmatrix} 2 - \gamma & 2 \cdot \cos\alpha \cdot e^{j\xi} \\ 2 \cdot \cos\alpha \cdot e^{-j\xi} & 2 - \gamma \end{vmatrix} = \gamma^2 + 4 - 4\gamma - 4\cos^2\alpha \quad \text{[Numeral 156]}$$
$$= \gamma^2 - 4\gamma - 4\sin^2\alpha$$
$$= 0$$
$$\therefore \gamma = 2 \pm \sqrt{4 - 4\sin^2\alpha}$$
$$= 2 \pm 2\cos\alpha$$

Thus, it can be understood that even if a diamond-shaped misalignment occurs, there is no influence on the eigenvalues corresponding to the widths of the respective paths.

(Singular Value Decomposition $H = U \cdot \Lambda^{1/2} \cdot V^H$)

The singular value decomposition of the channel matrix H is represented by the following formula.

$$H = U \cdot \Lambda^{1/2} \cdot V^H \quad \text{[Numeral 157]}$$
$$= \begin{bmatrix} \frac{-e^{-j\frac{\alpha}{2}}}{\sqrt{2}} & \frac{j \cdot e^{-j\frac{\alpha}{2}}}{\sqrt{2}} \\ \frac{-e^{-j\frac{\alpha}{2}} \cdot e^{-j\xi}}{\sqrt{2}} & \frac{-j \cdot e^{-j\frac{\alpha}{2}} \cdot e^{-j\xi}}{\sqrt{2}} \end{bmatrix} \cdot$$
$$\begin{bmatrix} (e^{j\frac{\alpha}{2}} + e^{-j\frac{\alpha}{2}}) & 0 \\ 0 & -j(e^{j\frac{\alpha}{2}} - e^{-j\frac{\alpha}{2}}) \end{bmatrix}.$$
$$\begin{bmatrix} \frac{-1}{\sqrt{2}} & \frac{-e^{j\xi}}{\sqrt{2}} \\ \frac{1}{\sqrt{2}} & \frac{-e^{j\xi}}{\sqrt{2}} \end{bmatrix}$$
$$= \begin{bmatrix} \frac{-(1 + e^{-j\alpha})}{\sqrt{2}} & \frac{(1 - e^{-j\alpha})}{\sqrt{2}} \\ \frac{-(1 + e^{-j\alpha}) \cdot e^{-j\xi}}{\sqrt{2}} & \frac{-(1 - e^{-j\alpha}) \cdot e^{-j\xi}}{\sqrt{2}} \end{bmatrix}.$$
$$\begin{bmatrix} \frac{-1}{\sqrt{2}} & \frac{-e^{j\xi}}{\sqrt{2}} \\ \frac{1}{\sqrt{2}} & \frac{-e^{j\xi}}{\sqrt{2}} \end{bmatrix}$$

-continued $$= \begin{bmatrix} 1 & e^{-j\alpha} \cdot e^{j\xi} \\ e^{-j\alpha} \cdot e^{-j\xi} & 1 \end{bmatrix}$$

Further, the U and V are represented by the following formulas.

[Numeral 158]
$$U^H \cdot U = \begin{bmatrix} \dfrac{-e^{j\frac{\alpha}{2}}}{\sqrt{2}} & \dfrac{-e^{j\frac{\alpha}{2}} \cdot e^{j\xi}}{\sqrt{2}} \\ \dfrac{-j \cdot e^{j\frac{\alpha}{2}}}{\sqrt{2}} & \dfrac{j \cdot e^{j\frac{\alpha}{2}} \cdot e^{j\xi}}{\sqrt{2}} \end{bmatrix} \cdot$$

$$\begin{bmatrix} \dfrac{-e^{-j\frac{\alpha}{2}}}{\sqrt{2}} & \dfrac{j \cdot e^{-j\frac{\alpha}{2}}}{\sqrt{2}} \\ \dfrac{-e^{-j\frac{\alpha}{2}} \cdot e^{-j\xi}}{\sqrt{2}} & \dfrac{-j \cdot e^{-j\frac{\alpha}{2}} \cdot e^{-j\xi}}{\sqrt{2}} \end{bmatrix}$$

$$= \begin{bmatrix} 1 & 0 \\ 0 & 1 \end{bmatrix}$$

$$V \cdot V^H = \begin{bmatrix} \dfrac{-1}{\sqrt{2}} & \dfrac{1}{\sqrt{2}} \\ \dfrac{-e^{-j\xi}}{\sqrt{2}} & \dfrac{-e^{-j\xi}}{\sqrt{2}} \end{bmatrix} \cdot$$

$$\begin{bmatrix} \dfrac{-1}{\sqrt{2}} & \dfrac{-e^{j\xi}}{\sqrt{2}} \\ \dfrac{1}{\sqrt{2}} & \dfrac{-e^{j\xi}}{\sqrt{2}} \end{bmatrix}$$

$$= \begin{bmatrix} 1 & 0 \\ 0 & 1 \end{bmatrix}$$

Thus, it can be confirmed that the singular value decomposition of H is achieved by the unitary matrixes of U and V. That is, even if a diamond-shaped misalignment occurs, the eigenvalues corresponding to the widths of the respective paths before generation of the misalignment can be kept, and the singular value decomposition of H is achieved by the unitary matrixes of U and V. It goes without saying that the same configuration as above can be obtained even if the phase shift Φ is caused due to a positional variation of a transmission antenna.

[Case where Matrix Calculation is Performed Only on Reception Side and where Antenna Arrangement Between Transmission/Reception Sides is Formed in Diamond Shape]

Next, how the proposed method in which the matrix calculation is performed only on the reception end operates in the case where such a diamond-shaped misalignment occurs will be described.

A case where a diamond-shaped misalignment occurs in the antenna arrangement direction between transmission and reception antennas in the configuration according to the present invention in which the matrix calculation is performed only on the reception side will be descried. Here, the diamond-shaped channel matrix H obtained in the above examination is used without modification.

Figure 14:
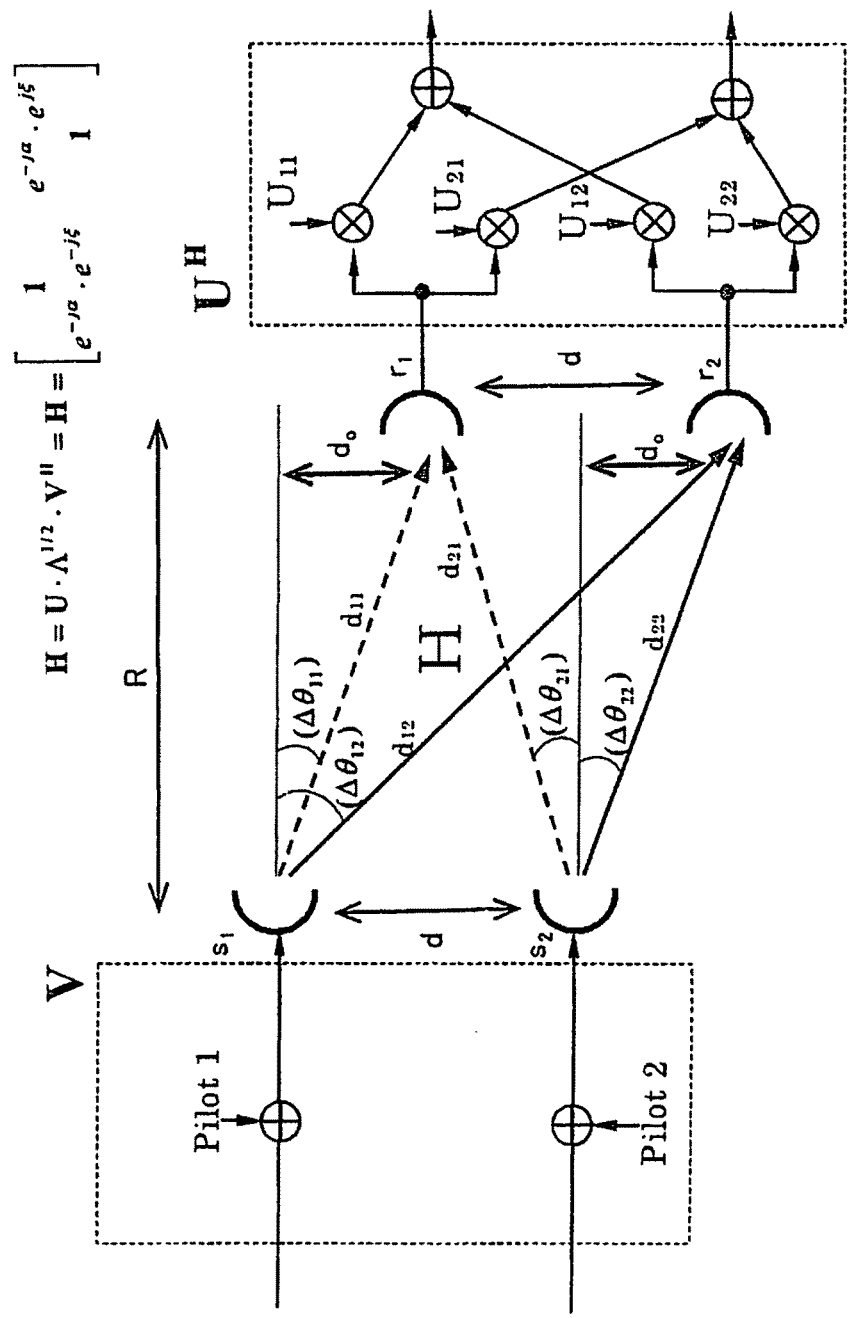
FIG. 14 A view showing a configuration example in which antenna arrangement between the transmission and reception sides is formed in a diamond shape along the antenna arrangement direction and where calculation based on a unitary matrix is performed only on reception side.

From FIG. 14, considering an inter-antenna position where $e^{j\alpha} = j$ is satisfied, singular value diagonal matrix $\Lambda^{1/2}$ and channel matrix H are represented by the following formulas.

[Singular Value Diagonal Matrix $\Lambda^{1/2}$]

[Numeral 159]
$$\Lambda^{1/2} = \begin{bmatrix} \sqrt{\lambda_1} & 0 \\ 0 & \sqrt{\lambda_2} \end{bmatrix}$$

$$= \begin{bmatrix} \sqrt{2 + 2\cos\alpha} & 0 \\ 0 & \sqrt{2 - 2\cos\alpha} \end{bmatrix}$$

$$= \begin{bmatrix} \sqrt{2} & 0 \\ 0 & \sqrt{2} \end{bmatrix}$$

[Channel Matrix H]

[Numeral 160]
$$H = \begin{bmatrix} 1 & -j \cdot e^{j\xi} \\ -j \cdot e^{-j\xi} & 1 \end{bmatrix}$$

$$= U \cdot \Lambda^{1/2} \cdot V^H$$

$$= U \cdot \begin{bmatrix} \sqrt{2} & 0 \\ 0 & \sqrt{2} \end{bmatrix} \cdot \begin{bmatrix} 1 & 0 \\ 0 & 1 \end{bmatrix}$$

where;

$$\alpha = \frac{\pi}{2},$$

$$\xi = \frac{2\pi \cdot d \cdot d_o}{\gamma R}$$

$$\therefore U = \begin{bmatrix} U_{11} & U_{12} \\ U_{21} & U_{22} \end{bmatrix}$$

$$= \begin{bmatrix} 1 & -j \cdot e^{j\xi} \\ -j \cdot e^{-j\xi} & 1 \end{bmatrix} \cdot$$

$$\begin{bmatrix} 1/\sqrt{2} & 0 \\ 0 & 1/\sqrt{2} \end{bmatrix}$$

$$= \begin{bmatrix} 1/\sqrt{2} & -j \cdot e^{j\xi}/\sqrt{2} \\ -j \cdot e^{-j\xi}/\sqrt{2} & 1/\sqrt{2} \end{bmatrix}$$

$$\therefore U^H = \begin{bmatrix} 1/\sqrt{2} & j \cdot e^{j\xi}/\sqrt{2} \\ j \cdot e^{-j\xi}/\sqrt{2} & 1/\sqrt{2} \end{bmatrix}$$

where;

$$\alpha = \frac{\pi}{\gamma} \cdot \frac{d^2}{R}$$

$$= \frac{\pi}{2},$$

$$\xi = \frac{2\pi \cdot d \cdot d_o}{\gamma R}$$

Here, the following equation is satisfied.

[Numeral 161]
$$U^H \cdot U = \begin{bmatrix} 1/\sqrt{2} & j \cdot e^{j\xi}/\sqrt{2} \\ j \cdot e^{-j\xi}/\sqrt{2} & 1/\sqrt{2} \end{bmatrix} \cdot$$

$$\begin{bmatrix} 1/\sqrt{2} & -j \cdot e^{j\xi}/\sqrt{2} \\ -j \cdot e^{-j\xi}/\sqrt{2} & 1/\sqrt{2} \end{bmatrix}$$

$$= \begin{bmatrix} 1 & 0 \\ 0 & 1 \end{bmatrix}$$

Thus, even if a diamond-shaped misalignment occurs, the configuration in which the matrix calculation is performed only on the reception side is effected. Note that even if phase shift Φ or φ is caused by the local oscillators or due to antenna position displacement, the same configuration as above can be obtained.

[Case where Antenna Arrangement Shape Between Transmission/Reception Sides is Further Generalized]

A case where the antenna arrangement shape between the transmission and reception sides is further generalized will be described. This is an application example, including a wireless LAN or the like constructed in a line-of-sight communication system, having high flexibility of installation position.

Figure 15:
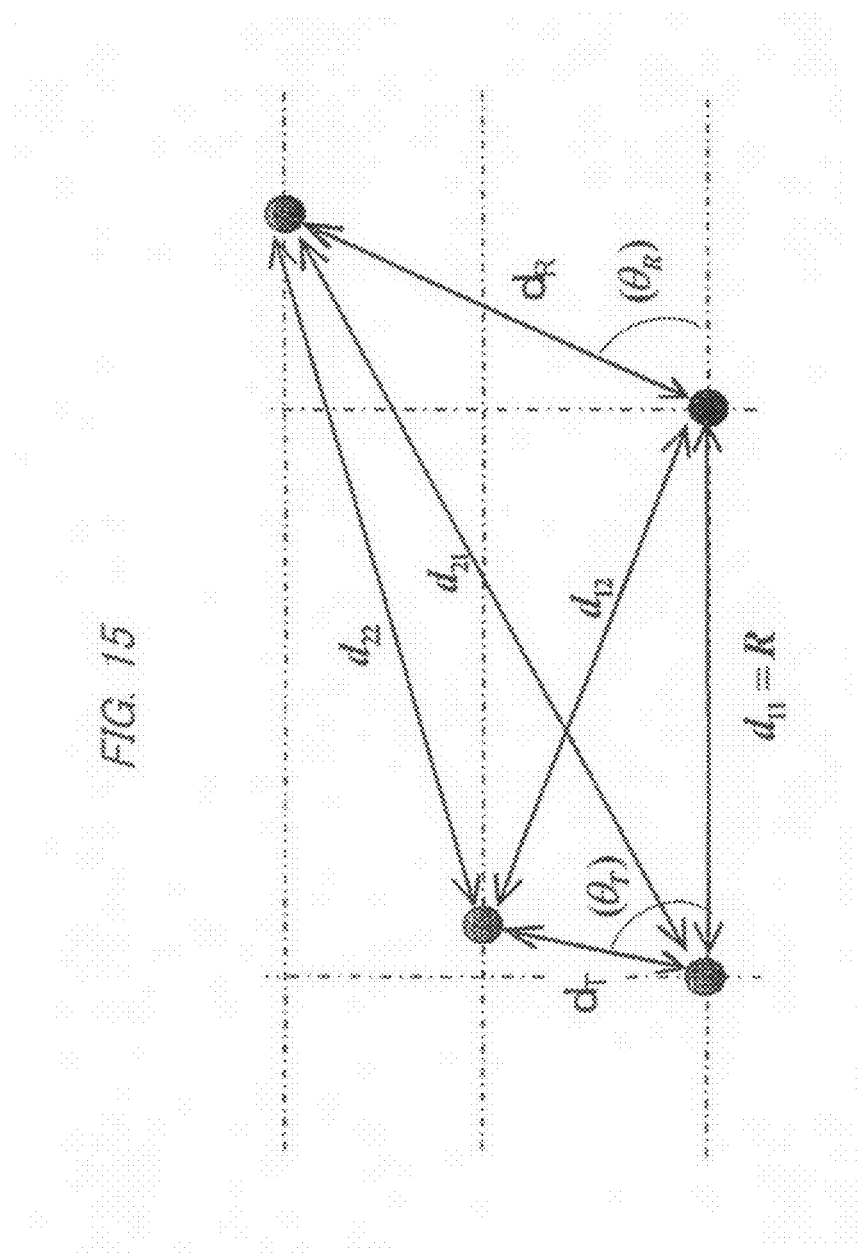
FIG. 15 A view showing a case where antenna arrangement is formed in a given geometric form.

From FIG. 15, the following formulas are obtained.

$$d_{11} = R \qquad \text{[Numeral 162]}$$

$$d_{12} = \{(R - d_T\cos(\theta_T))^2 + (d_T\sin(\theta_T))^2\}^{1/2}$$

$$\approx (R - d_T\cos(\theta_T))\left(1 + \frac{(d_T\sin(\theta_T))^2}{2(R - d_T\cos(\theta_T))^2}\right)$$

$$\approx R - d_T\cos(\theta_T) + \frac{(d_T\sin(\theta_T))^2}{2(R - d_T\cos(\theta_T))}$$

$$\approx R - d_T\cos(\theta_T) + \frac{(d_T\sin(\theta_T))^2}{2R}$$

$$d_{21} = \{(R + d_R\cos(\theta_R))^2 + (d_R\sin(\theta_R))^2\}^{1/2}$$

$$\approx (R + d_R\cos(\theta_R))\left(1 + \frac{(d_R\sin(\theta_R))^2}{2(R + d_R\cos(\theta_R))^2}\right)$$

$$\approx R + d_R\cos(\theta_R) + \frac{(d_R\sin(\theta_R))^2}{2(R + d_R\cos(\theta_R))}$$

$$\approx R + d_R\cos(\theta_R) + \frac{(d_R\sin(\theta_R))^2}{2R}$$

$$d_{22} = \left\{ \begin{array}{c} (R - d_T\cos(\theta_T) + d_R\cos(\theta_R))^2 + \\ (d_R\sin(\theta_R) - d_T\sin(\theta_T))^2 \end{array} \right\}^{1/2}$$

$$\approx (R - d_T\cos(\theta_T) + d_R\cos(\theta_R))$$

$$\left(1 + \frac{(d_R\sin(\theta_R) - d_T\sin(\theta_T))^2}{2(R - d_T\cos(\theta_T) + d_R\cos(\theta_R))^2}\right)$$

$$\approx R - d_T\cos(\theta_T) + d_R\cos(\theta_R) + \frac{(d_R\sin(\theta_R) - d_T\sin(\theta_T))^2}{2(R - d_T\cos(\theta_T) + d_R\cos(\theta_R))}$$

$$\approx R - d_T\cos(\theta_T) + d_R\cos(\theta_R) + \frac{(d_R\sin(\theta_R) - d_T\sin(\theta_T))^2}{2R}$$

Further, from FIG. 15, the channel matrix H focusing only on a phase difference between reception antennas is represented by the following formula.

$$H = \begin{bmatrix} 1 & e^{j\frac{2\pi}{\gamma}(d_{12}-d_{11})} \\ e^{j\frac{2\pi}{\gamma}(d_{21}-d_{22})} & 1 \end{bmatrix} \qquad \text{[Numeral 163]}$$

From the above, the following formula is obtained.

$$\Omega = H^H \cdot H \qquad \text{[Numeral 164]}$$

-continued $$= \begin{bmatrix} 1 & e^{j\frac{2\pi}{\gamma}(d_{21}-d_{22})} \\ e^{j\frac{2\pi}{\gamma}(d_{12}-d_{11})} & 1 \end{bmatrix} \cdot \begin{bmatrix} 1 & e^{-j\frac{2\pi}{\gamma}(d_{12}-d_{11})} \\ e^{-j\frac{2\pi}{\gamma}(d_{21}-d_{22})} & 1 \end{bmatrix}$$

$$= \begin{bmatrix} 2 & e^{-j\frac{2\pi}{\gamma}(d_{12}-d_{11})} + e^{j\frac{2\pi}{\gamma}(d_{21}-d_{22})} \\ e^{j\frac{2\pi}{\gamma}(d_{12}-d_{11})} + e^{-j\frac{2\pi}{\gamma}(d_{21}-d_{22})} & 2 \end{bmatrix}$$

$$\Rightarrow \begin{bmatrix} 2 & 0 \\ 0 & 2 \end{bmatrix}$$

Thus, in order for the eigenvalue to be a multiplicity condition, it is only necessary for the first term, i.e., $(2\pi/\gamma)\cdot(d_{12}-d_{11})$ and the second term, i.e., $-(2\pi/\gamma)\cdot(d_{21}-d_{22})$ to have inversed phases with each other. That is, since $(2\pi/\gamma)\cdot(d_{12}-d_{11})=-(2\pi/\gamma)\cdot(d_{21}-d_{22})$ mod $20\pi$ is satisfied, or a difference between the first and second terms is $\pi$, the following formula is satisfied.

$$\frac{2\pi}{\gamma}(d_{12} - d_{11}) + \frac{2\pi}{\gamma}(d_{21} - d_{22}) = \pi \bmod 2\pi \qquad \text{[Numeral 165]}$$

From the above, the following formula is obtained.

$$\therefore \frac{2\pi}{\gamma}|d_{12} - d_{11} + d_{21} - d_{22}| = \pi(2n+1) \; n \in Z^+ \qquad \text{[Numeral 166]}$$

$$\therefore |d_{12} - d_{11} + d_{21} - d_{22}| = \frac{\gamma}{2}(2n+1) \; n \in Z^+$$

When $d_{11}$ to $d_{22}$ are assigned to the obtained relationship, the following formula is satisfied.

$$|d_{12} - d_{11} + d_{21} - d_{22}| = \begin{vmatrix} -d_T\cos(\theta_T) + \\ \frac{(d_T\sin(\theta_T))^2}{2R} + \\ \frac{(d_R\sin(\theta_R))^2}{2R} + \\ d_T\cos(\theta_T) - \\ \frac{(d_R\sin(\theta_R) - d_T\sin(\theta_T))^2}{2R} \end{vmatrix} \qquad \text{[Numeral 167]}$$

$$= \begin{vmatrix} \frac{(d_T\sin(\theta_T))^2}{2R} + \\ \frac{(d_R\sin(\theta_R))^2}{2R} + \\ \frac{(d_R\sin(\theta_R) - d_T\sin(\theta_T))^2}{2R} \end{vmatrix}$$

$$= \left| \frac{-2 \cdot d_T \cdot d_R \cdot \sin(\theta_T) \cdot \sin(\theta_R)}{2R} \right|$$

$$= \frac{d_T \cdot d_R \cdot \sin(\theta_T) \cdot \sin(\theta_R)}{R}$$

Accordingly, the following formula is obtained.

$$\frac{d_T \cdot d_R \cdot \sin(\theta_T) \cdot \sin(\theta_R)}{R} = \frac{\gamma}{2}(2n+1) \; n \in Z^+ \qquad \text{\{Numeral 168\}}$$

Thus, as a condition that the eigenvalue becomes a multiplicity condition, the following formula is obtained.

$$\therefore d_T \cdot d_R = \frac{R}{\sin(\theta_T) \cdot \sin(\theta_R)} \cdot \gamma \cdot \left(n + \frac{1}{2}\right) \, n \in Z^+ \quad \text{[Numeral 169]}$$

Various antenna configuration can be possible with the paths having the same width as long as the above condition is satisfied. It should be noted that definitions of the R used here and abovementioned R are slightly different from each other.

In the above description, the pilot signals are used as a detection means for detecting a positional variation in the antennas or channels caused by external factors or a phase variation caused due to use of the local oscillators provided independently for respective antennas. However, the above variations can be detected by a configuration not using the pilot signals. For example, a method that uses data for conveying information may be employed. Further, although not shown, a method that estimates a phase variation using a determination result after equalization or method that estimates a phase variation by re-encoding a signal after error correction may be employed. In the following, the method that detects the above variations without use of the pilot signals will be described taking a case where two antennas are used as an example.

Here, description is made using the channel matrix described above, i.e., channel matrix represented by the following formula.

$$H = \begin{bmatrix} 1 & -j \cdot e^{j\Phi} \\ -j \cdot e^{j\phi} & 1 \cdot e^{j(\Phi+\phi)} \end{bmatrix} \quad \text{\{Numeral 170\}}$$

It is assumed that transmission and reception signal vectors are represented by the following formulas.

$$S = \begin{bmatrix} s_1 \\ s_2 \end{bmatrix}, \quad \text{[Numeral 171]}$$

$$Y = \begin{bmatrix} y_1 \\ y_2 \end{bmatrix}$$

In this case, the following formula is obtained.

$$Y = \begin{bmatrix} y_1 \\ y_2 \end{bmatrix} = H \cdot S = \begin{bmatrix} 1 & -j \cdot e^{j\Phi} \\ -j \cdot e^{j\phi} & 1 \cdot e^{j(\Phi+\phi)} \end{bmatrix} \cdot \begin{bmatrix} s_1 \\ s_2 \end{bmatrix} \quad \text{[Numeral 172]}$$

Assuming that $s_1$ and $s_2$ in the above formula have been obtained properly from a determination result after equalization or signal reproduction after error correction, [Numeral 174] is obtained from the relationship represented by [Numeral 173].

$$y_1 = s_1 - j \cdot e^{j\Phi} \cdot s_2 \quad \text{[Numeral 173]}$$

$$e^{j\Phi} = \frac{s_1 - y_1}{j \cdot s_2} \quad \text{[Numeral 174]}$$

Thus, $\Phi$ can be detected.

Then, the detected $\Phi$ is used. Before that, from the relationship represented by [Numeral 172], the following formula is satisfied.

$$y_2 = -j \cdot e^{j\phi} \cdot s_1 + e^{j(\Phi+\phi)} \cdot s_2 \quad \text{[Numeral 175]}$$

Accordingly, the following formula is obtained.

$$e^{j\phi} = \frac{y_2}{e^{j\Phi} \cdot s_2 - j \cdot s_1} \quad \text{[Numeral 176]}$$

Thus, $\phi$ can be detected.

As described above, not by using pilot signal, but by using data conveying information, it is possible to detect a positional variation in the antennas or channels caused by external factors or a phase variation caused due to use of the local oscillators provided independently for respective antennas. In the above example, operation after start-up processing has been described. That is, once the start-up processing is completed, data flows constantly, so that the detection of a phase variation is constantly executed.

[Actual Radio Wave Propagation Model]

Figure 16:
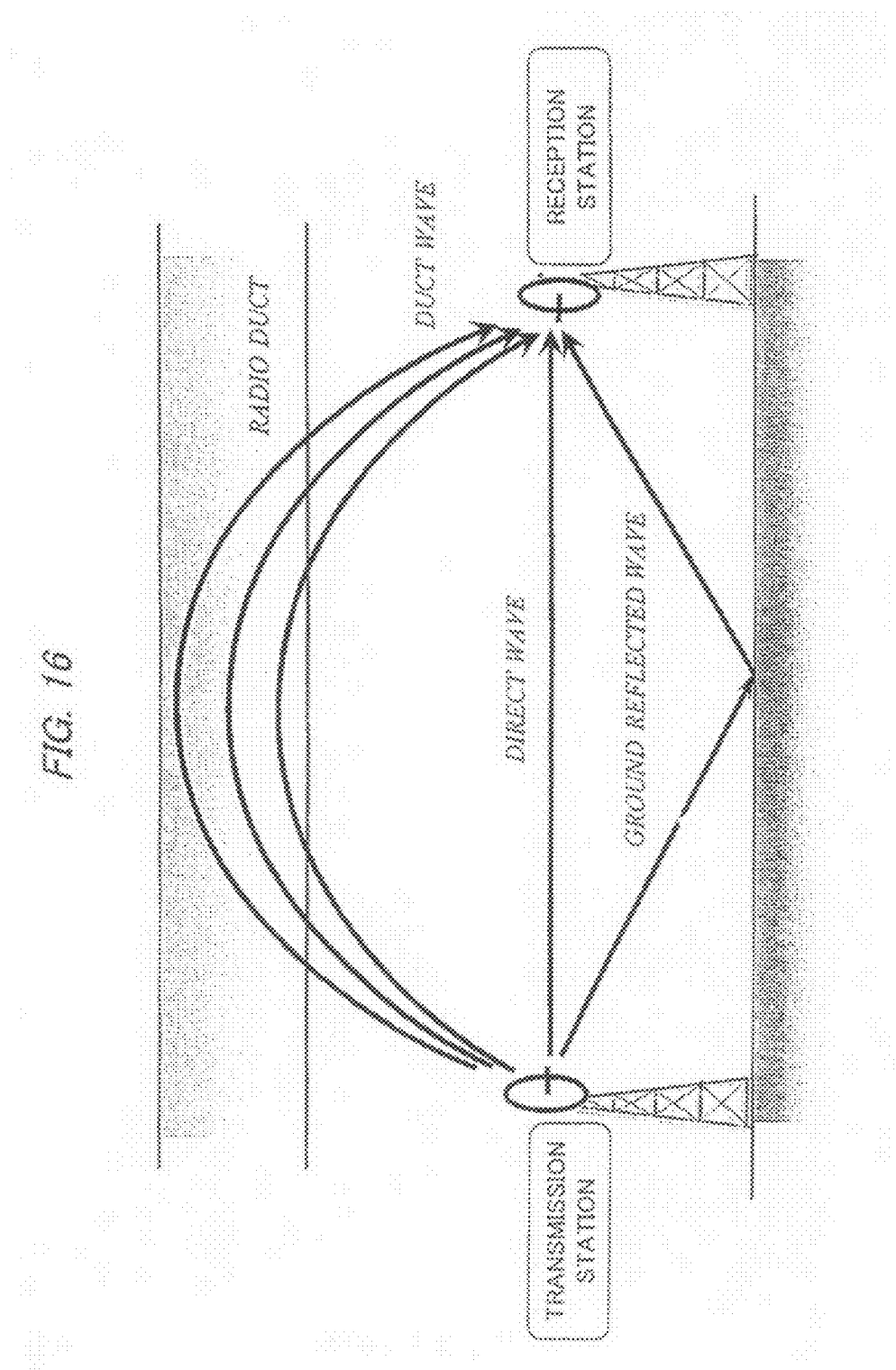
FIG. 16 A view showing a line-of-sight microwave propagation model (three-ray model).

The above results have been obtained in the configuration where only the direct wave is taken into consideration. In the actual radio wave propagation environment, a reflected wave exists. FIG. 16 is a view showing a propagation model used in the fixed point microwave communication, called three-ray model. The three-ray model is composed of duct wave, ground reflected wave, and direct wave. Assuming that the duct wave can be ignored depending on the distance between transmission and reception stations or beam width of antennas to be used, the three-ray model can be approximated as two-ray model composed of the ground reflected wave and direct wave. Thus, the following description will be made with the actual radio wave propagation model regarded as two-ray model.

Figure 17:
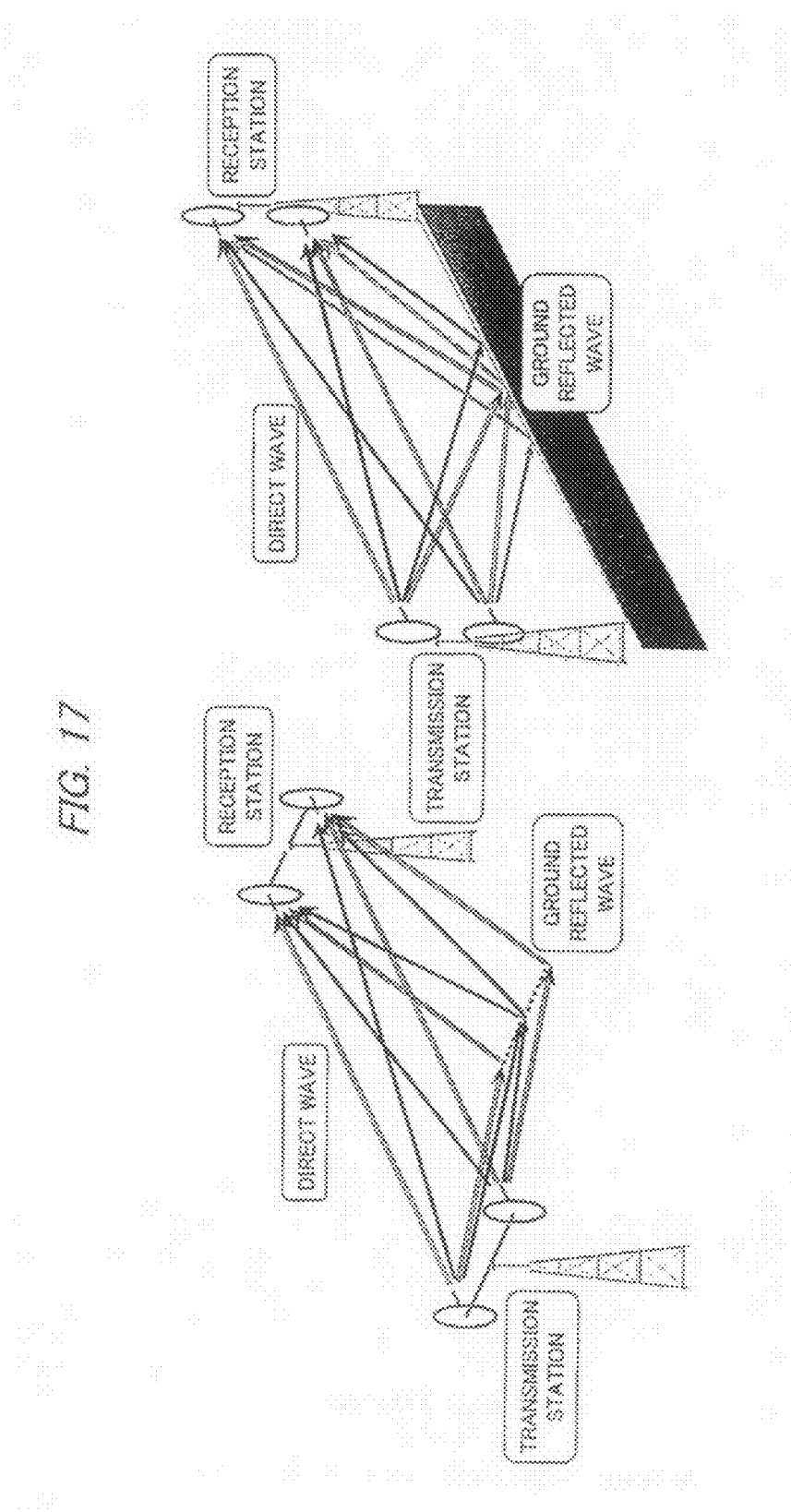
FIG. 17 A view showing an ideal MIMO operating condition in a line-of-sight two-ray model.

First, as shown in FIG. 17, the ideal operating condition of the MIMO in the line-of-sight radio wave propagation model where the ground reflected wave exists is defined as follows.

It is assumed that even when the matrix calculation (channel matrix calculation processing means) for construction of orthogonal channels performed for the direct wave is applied to delayed wave, the orthogonal channels can be formed.

In FIG. 17, black lines represent the direct wave, and brown lines represent the delayed wave corresponding to the ground reflected wave.

[Case where MIMO Antennas are Horizontally Arranged]

Figure 18:
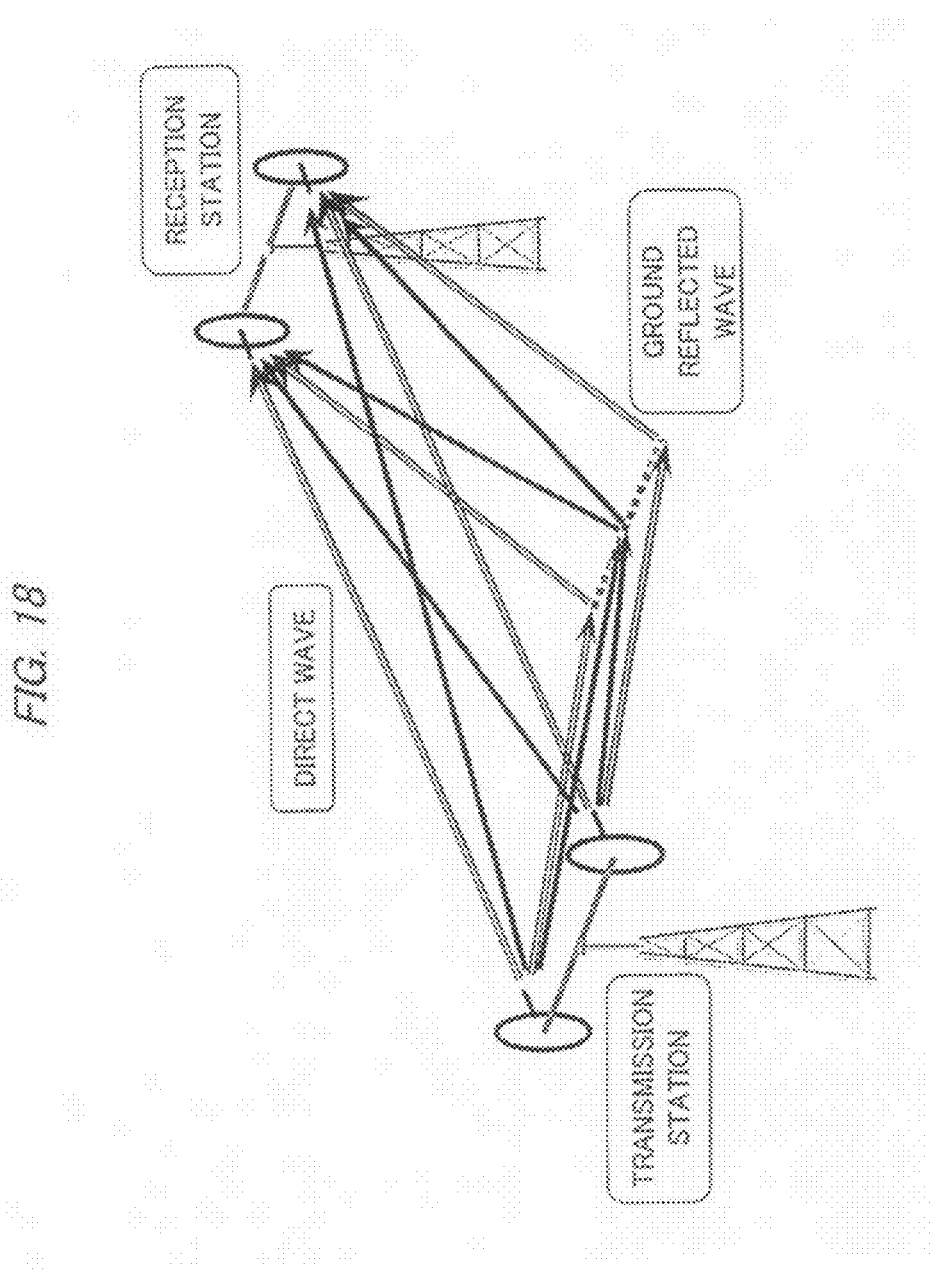
FIG. 18 A view showing a case where MIMO antennas are horizontally arranged.
Figure 19:
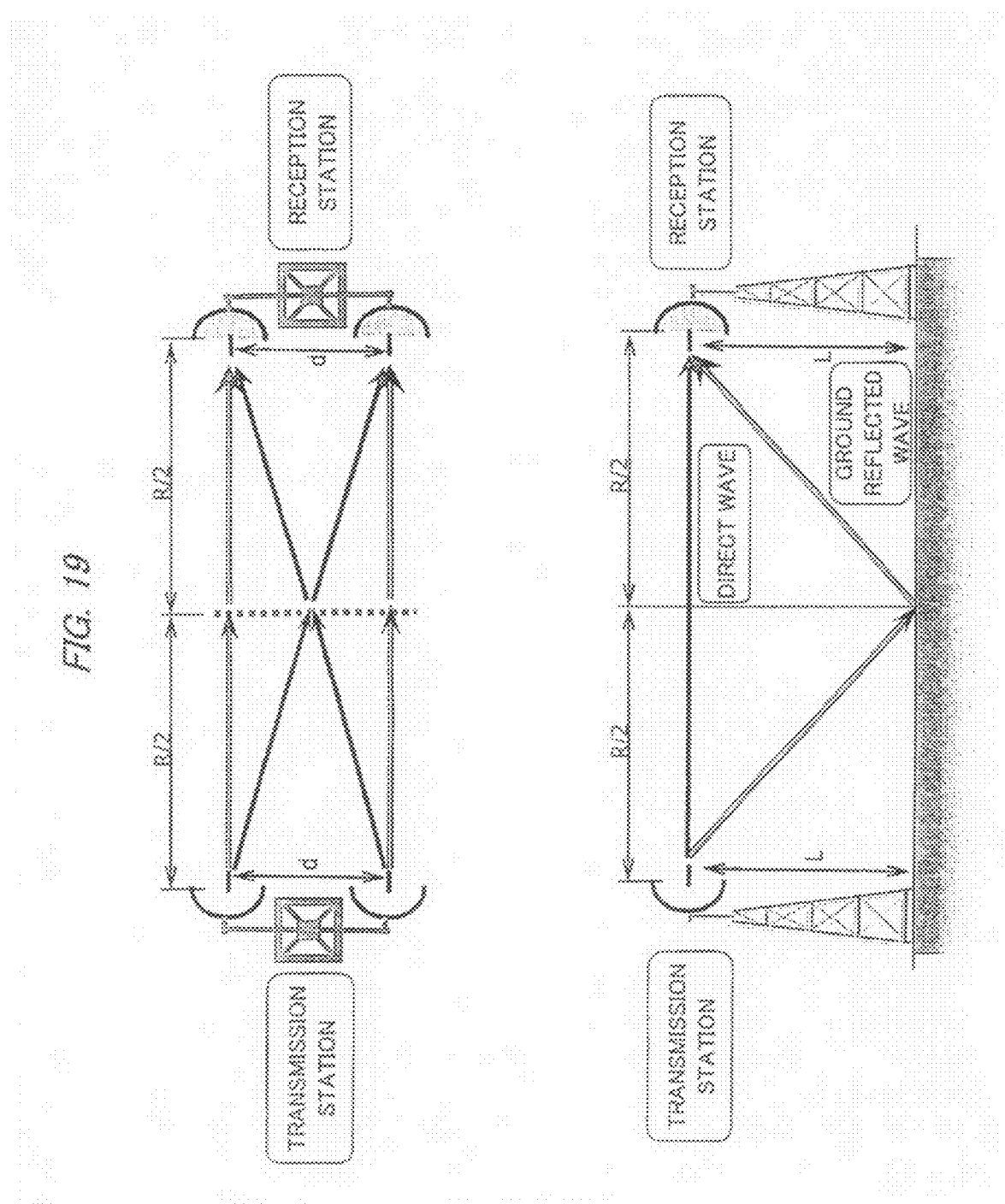
FIG. 19 A view showing a case where MIMO antennas are horizontally arranged, as viewed from above (upper part) and edge-on (lower part).

An example in which the MIMO antennas are horizontally arranged in the two-ray model composed of the ground reflected wave and direct wave is shown in FIG. 18. FIG. 19 shows the arrangement of FIG. 18 as viewed from directly above and as viewed edge-on. In FIG. 18, the upper lines represent the direct wave, lower lines represent the ground reflected wave, and double lines represent a diagonal channel in the MIMO.

It is assumed, in FIGS. 18 and 19, that the MIMO antennas are arranged so that virtual orthogonal channels can be constructed by the matrix calculation performed only for the direct wave.

That is, as described above, it is assumed that, with respect to the channel difference $\Delta R = d^2/(2R)$ between the direct waves, the phase rotation $\alpha$ resulting from the channel difference has the relationship: $\alpha = (\pi/\lambda) \cdot (d^2/R)$, and the matrix calculation is processed based on the relationship.

The channel difference between the ground reflected waves is calculated as follows.

Assuming that the antenna height from the ground is L, the channel difference $\Delta R_r$ between the ground reflected waves is represented by the following formula.

[Numeral 177]
$$\Delta R_r = 2 \cdot \left( \sqrt{\left(\frac{R+\Delta R}{2}\right)^2 + L^2} - \sqrt{\left(\frac{R}{2}\right)^2 + L^2} \right)$$

$$= 2 \cdot \sqrt{(R^2/4) + L^2} \cdot \left( \sqrt{\frac{(R^2/4) + (R \cdot \Delta R/2) + (\Delta R^2/4) + L^2}{(R^2/4) + L^2}} - 1 \right)$$

$$= 2 \cdot \sqrt{(R^2/4) + L^2} \cdot \left( \sqrt{1 + \frac{(R \cdot \Delta R/2) + (\Delta R^2/4)}{(R^2/4) + L^2}} - 1 \right)$$

$$\approx 2 \cdot \sqrt{(R^2/4) + L^2} \cdot \frac{1}{2} \cdot \frac{(R \cdot \Delta R/2) + (\Delta R^2/4)}{(R^2/4) + L^2}$$

$$\approx \frac{(R \cdot \Delta R/2)}{\sqrt{(R^2/4) + L^2}}$$

$$\approx \Delta R$$

Thus, it can be understood that the same channel difference $\Delta R = d^2/(2R)$ as those obtained between the direct waves can be obtained and, accordingly, the phase rotation resulting from the channel difference is the same (phase rotation ($\alpha = (\pi/\lambda) \cdot (d^2/R)$)). However, in terms of the absolute phase, the channel difference in the case of the ground reflected wave is represented by the following formula.

[Numeral 178]
$$\Delta R_{abs} = 2 \cdot \left( \sqrt{\left(\frac{R}{2}\right)^2 + L^2} - \left(\frac{R}{2}\right) \right)$$

$$= 2 \cdot \left(\frac{R}{2}\right) \cdot \left( \sqrt{1 + \left(\frac{2 \cdot L}{R}\right)^2} - 1 \right)$$

$$\approx \left(\frac{R}{2}\right) \cdot \left(\frac{2 \cdot L}{R}\right)^2$$

$$\approx \frac{2 \cdot L^2}{R}$$

Further, in terms of the absolute phase, the phase difference in the case of the ground reflected wave is represented by the following formula.

[Numeral 179]
$$\alpha_{abs} \approx 4 \cdot \frac{\pi}{\lambda} \cdot \frac{L^2}{R}$$

Based on the above results, a reception signal vector Y is represented by the following formula.

[Numeral 180]
$$Y = U^H \cdot (H + a \cdot H \cdot e^{-j\alpha_{abs}}) \cdot V \cdot X$$

$$= U^H \cdot \begin{pmatrix} U \cdot \Lambda^{1/2} \cdot V^H + \\ U \cdot \Lambda^{1/2} \cdot V^H \cdot e^{-j\alpha_{abs}} \end{pmatrix} \cdot V \cdot X$$

$$= (\Lambda^{1/2} + a \cdot \Lambda^{1/2} \cdot e^{-j\alpha_{abs}}) \cdot X$$

-continued
$$= \begin{bmatrix} \lambda_1 \cdot (1 + a \cdot e^{-j\alpha_{abs}}) & 0 \\ 0 & \lambda_2 \cdot (1 + a \cdot e^{-j\alpha_{abs}}) \end{bmatrix} \cdot \begin{bmatrix} x_1 \\ x_2 \end{bmatrix}$$

$$= \begin{bmatrix} \lambda_1 \cdot (1 + a \cdot e^{-j\alpha_{abs}}) \cdot x_1 \\ \lambda_2 \cdot (1 + a \cdot e^{-j\alpha_{abs}}) \cdot x_2 \end{bmatrix}$$

where a denotes the reflection coefficient of the ground.

The above result reveals that, in the case of the configuration where the MIMO antennas are horizontally arranged, even if the ground reflected wave is present, orthogonality constructed by the MIMO is maintained irrespective of the antenna height L from the ground.

In the case where the matrix calculation is performed only on the reception side, V=I is satisfied.

The above can be summarized as follows.

In the case of the configuration where the MIMO antennas are horizontally arranged, even if the ground reflected wave is present, orthogonality constructed by the MIMO is ensured irrespective of the antenna height L.

[Case where MIMO Antennas are Vertically Arranged]

Figure 21:
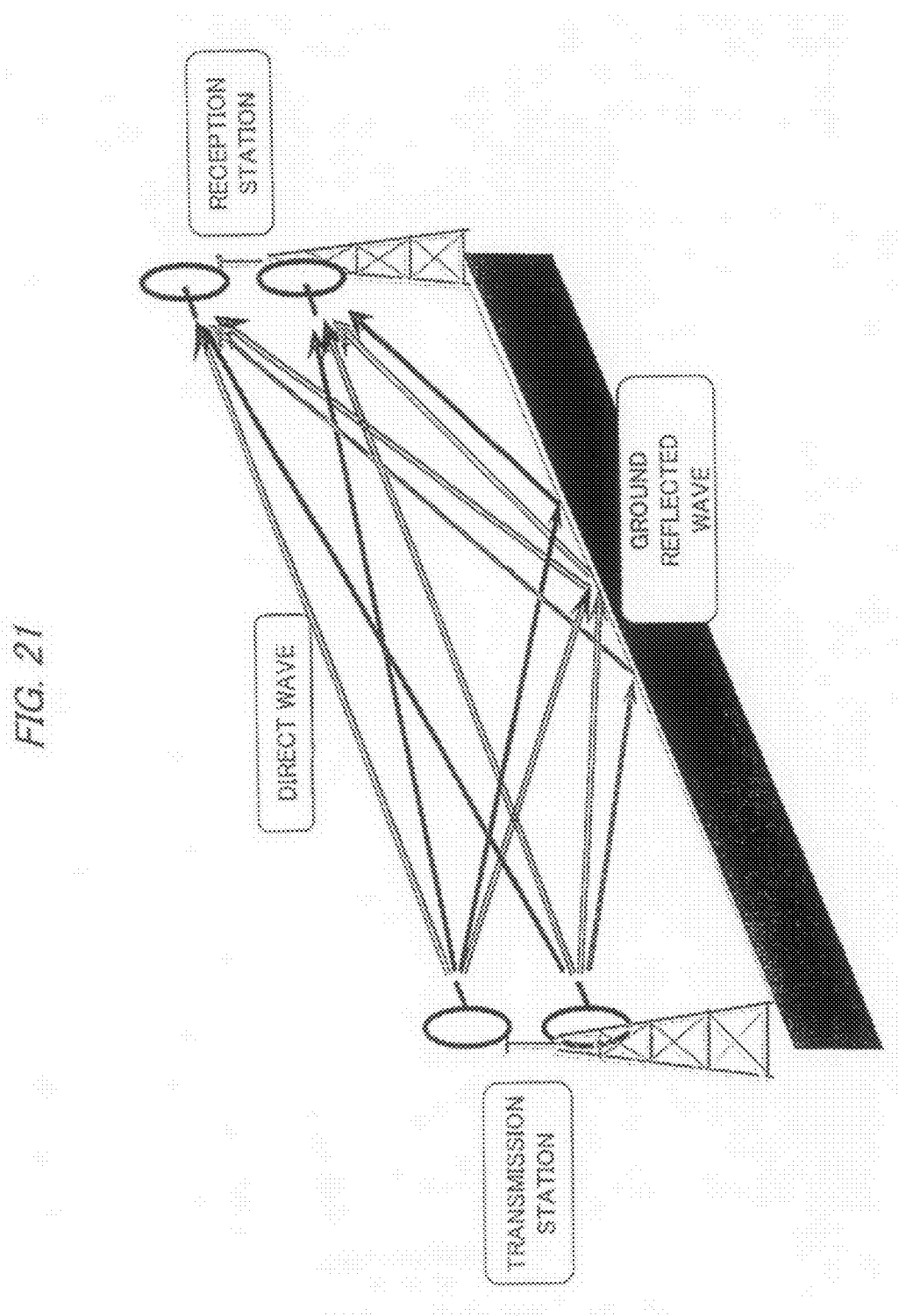
FIG. 21 A view showing a case where MIMO antennas are vertically arranged.
Figure 22:
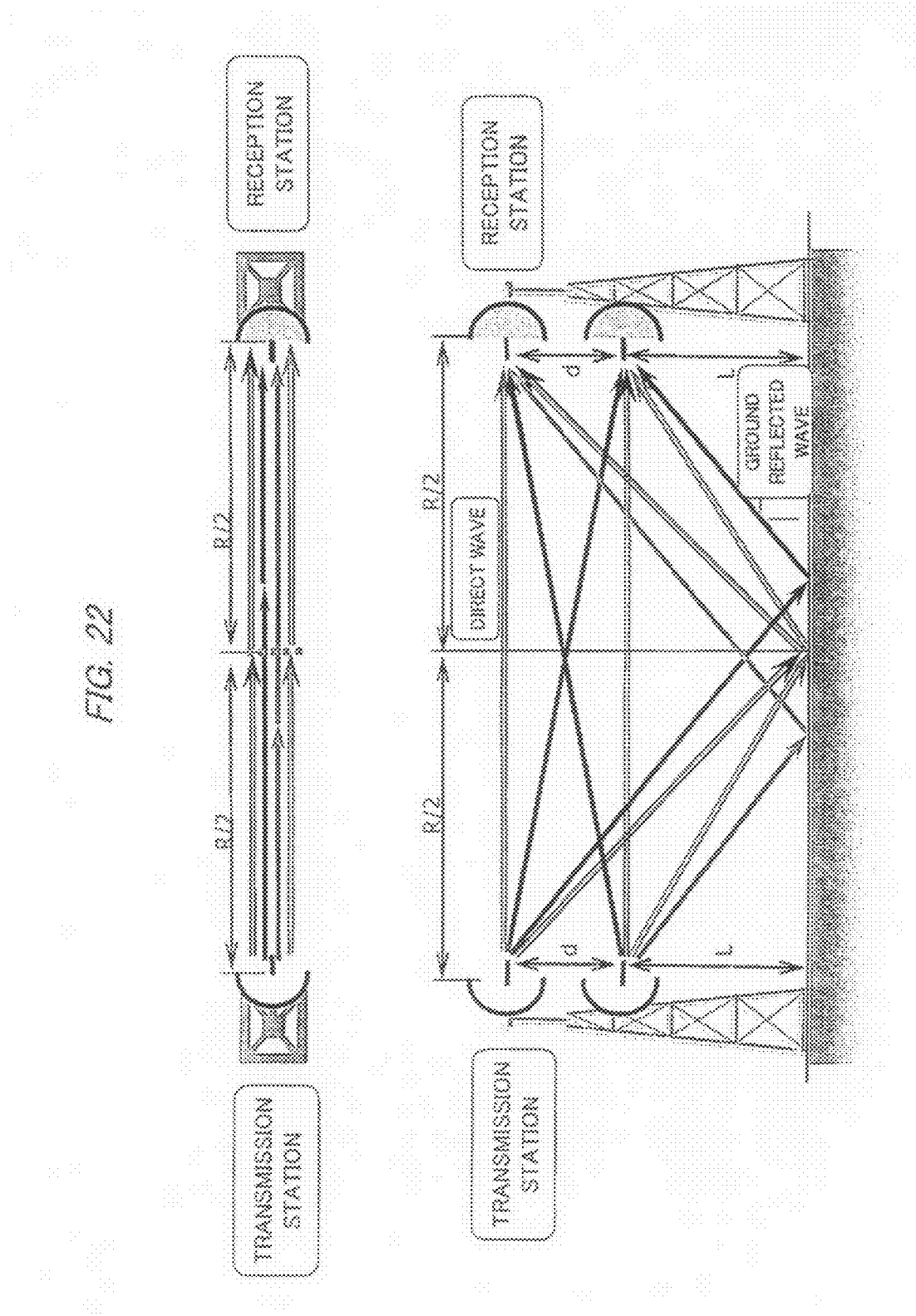
FIG. 22 A view showing a case where MIMO antennas are vertically arranged, as viewed from above (upper part) and edge-on (lower part).

An example in which the MIMO antennas are vertically arranged in the two-ray model composed of the ground reflected wave and direct wave is shown in FIG. 21. In FIG. 21, the upper lines represent the direct wave, lower lines represent the ground reflected wave, and double lines represent a diagonal channel in the MIMO. In the case of the configuration where the MIMO antennas are vertically arranged, all the waves pass on the straight lines set between the transmission and reception stations. Therefore, this configuration can be represented only by an edge-on view. FIG. 22 shows the arrangement of FIG. 21 as viewed from directly above (upper part) and as viewed edge-on (lower part).

Figure 23:
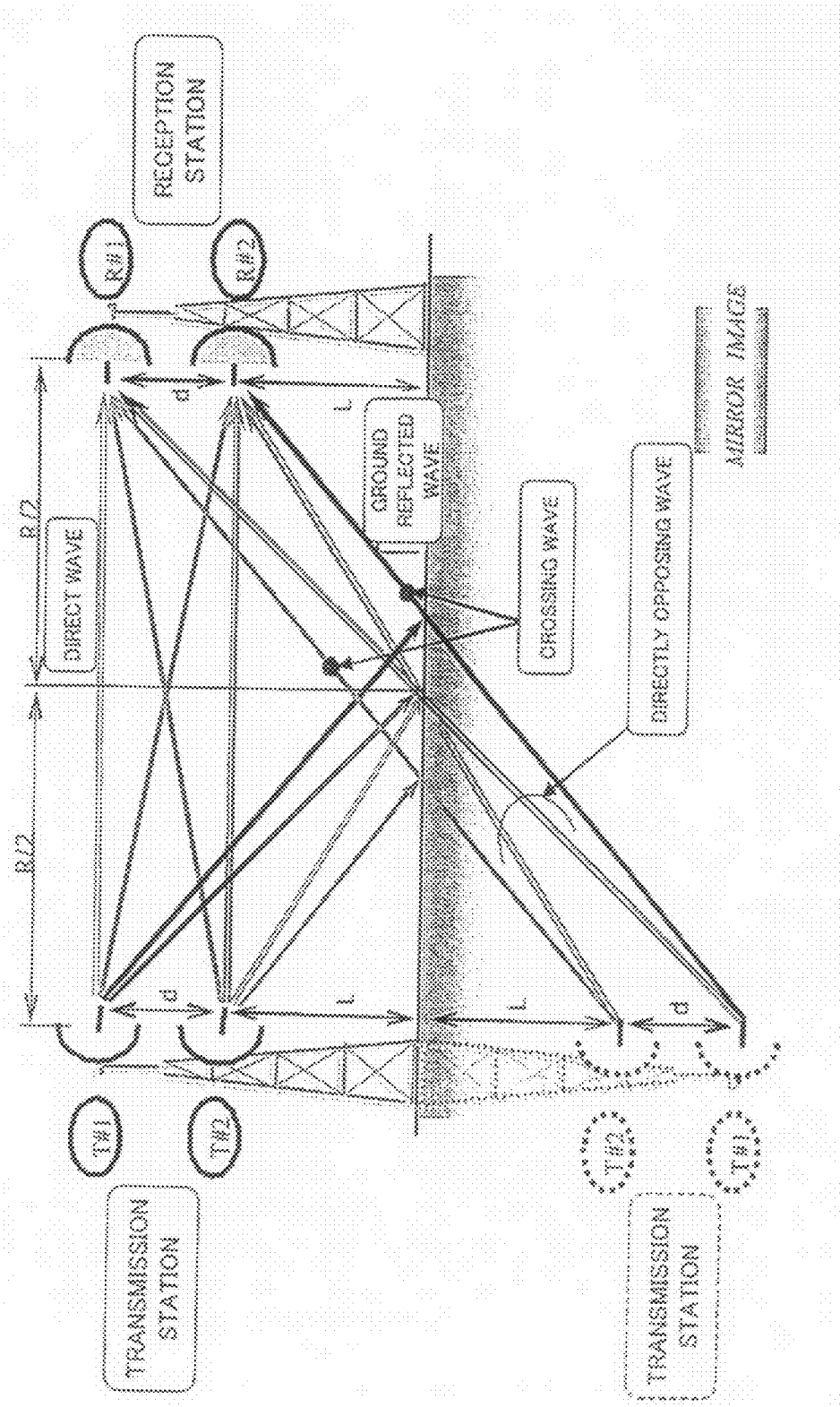
FIG. 23 A view showing a mirror image model of a configuration in which MIMO antennas are vertically arranged.

For characteristic analysis of the configuration where the MIMO antennas are vertically arranged, a mirror image model of FIG. 23 is also used. As shown in FIG. 23, the wave reflected by the ground looks as if it were emitted from the mirror image. It is assumed in FIG. 23 that the MIMO antennas are arranged so that the virtual orthogonal channels can be formed by the matrix calculation performed only for the direct wave.

That is, it is assumed that, with respect to the channel difference $\Delta R = d^2/(2R)$ between the direct waves, the phase rotation $\alpha$ resulting from the channel difference has the relationship: $\alpha = (\pi/\lambda) \cdot (d^2/R) = \pi/2$, and the matrix calculation is processed in accordance with the direct wave.

The configuration between the transmission station in the mirror image and reception station corresponds to the above-mentioned configuration in which antenna arrangement between transmission/reception sides is formed in diamond shape, and assuming that $\alpha = (\pi/\lambda) \cdot (d^2/R) = \pi/2$, $\zeta = -(\pi/\gamma) \cdot (2 \cdot d \cdot L/R)$ is satisfied, the channel matrix H in this case is represented as the following formula.

[Numeral 181]
$$H = \begin{bmatrix} 1 & e^{-j\alpha} \cdot e^{j\xi} \\ e^{-j\alpha} \cdot e^{-j\xi} & 1 \end{bmatrix}$$

It should be noted that in this case a directly opposing wave and a crossing wave are replaced by each other.

Based on the above formula, the phase difference ($\pi/2$) between the directly opposing wave and crossing wave in the ground reflected wave will be examined.

From the upper-right element of the channel matrix H, the following formula can be obtained with the sign inversed (since the directly opposing wave and crossing wave are replaced by each other).

$$\alpha - \xi = 2\pi p - \frac{\pi}{2}$$ [Numeral 182]

where $p = 1, 2, \ldots$

Similarly, from the lower-left element of the channel matrix H, the following formula can be obtained with the sign inversed.

$$\alpha + \xi = 2\pi q - \frac{\pi}{2}$$ [Numeral 183]

where $q = 1, 2, \ldots$

The difference between [Numeral 182] and [Numeral 183] is represented by the following formula.

$$-\xi = \pi r \text{ where } r = 1, 2, \ldots$$ [Numeral 184]

From $\alpha = (\pi/\lambda) \cdot (d^2/R) = \pi/2$, $d = (\lambda R/2)^{1/2}$ can be derived, so that the following formula can be obtained.

$$\xi = -\frac{\pi}{\lambda} \cdot \frac{2dL}{R} = -\frac{\pi}{\lambda} \cdot \frac{2L}{R} \cdot \sqrt{\frac{\lambda R}{2}} = -\pi \cdot \sqrt{\frac{2}{\lambda R}} \cdot L$$ [Numeral 185]

Accordingly, from $-\pi \cdot r = -\pi \cdot (\lambda R/2)^{1/2} \cdot L$, the following formula can be obtained.

$$L = \sqrt{\frac{\lambda R}{2}} \cdot r = d \cdot r$$ [Numeral 186]

where $r = 1, 2, \ldots$

That is, in the case where the MIMO antennas are vertically arranged, in order to allow the phase difference $\pi/2$ between the directly opposing wave and crossing wave with respect to the direct wave to be applied without modification to the delayed wave, it is necessary to make the antenna height L from the ground an integral multiple of the antenna interval d in the MIMO configuration.

In the following, it is assumed that the antenna height L from the ground is made an integral multiple of d.

[Case where MIMO Antennas are Vertically Arranged Under Condition where L=n·d is Satisfied]

Figure 24:
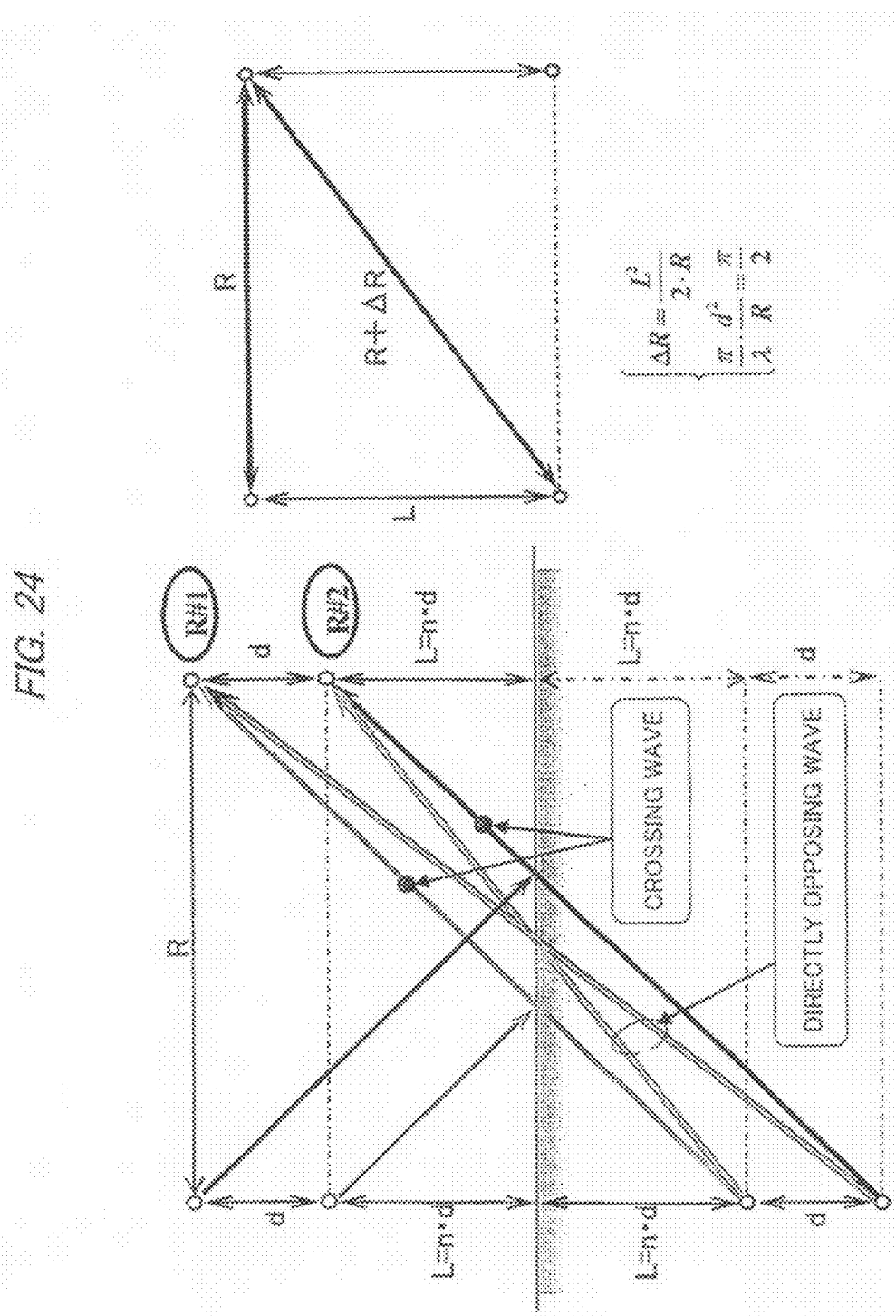
FIG. 24 A view showing an analysis model of a configuration in which MIMO antennas are vertically arranged.

The results thus obtained are summarized as an analysis model of FIG. 24. This model is used to perform the following calculation.

1) Channel Difference (Crossing Wave–Directly Opposing Wave) in R#1

$$\frac{(2n+1)^2 d^2}{2R} - \frac{(2n+2)^2 d^2}{2R} = -(4n+3)\frac{d^2}{2R}$$ [Numeral 187]

$$\text{Phase difference} = \frac{2\pi}{\lambda}\left(-(4n+3)\frac{d^2}{2R}\right)$$ [Numeral 188]

$$= -(4n+3)\frac{\pi}{2}$$

$$\equiv \frac{\pi}{2} (\text{mod} 2\pi)$$

2) Channel Difference (Crossing Wave–Directly Opposing Wave) in R#2

$$\frac{(2n+1)^2 d^2}{2R} - \frac{(2n)^2 d^2}{2R} = (4n+1)\frac{d^2}{2R}$$ [Numeral 189]

$$\text{Phase difference} = \frac{2\pi}{\lambda}\left((4n+1)\frac{d^2}{2R}\right)$$ [Numeral 190]

$$= (4n+1)\frac{\pi}{2}$$

$$\equiv \frac{\pi}{2} (\text{mod} 2\pi)$$

Further, whether the phase difference resulting from the channel difference between directly opposing waves is $2\pi n$ or not is checked.

3) Check Whether Phase Difference Resulting from Channel Difference Between Same Directly Opposing Waves is 0 mod($2\pi$)

$$\frac{(2n+2)^2 d^2}{2R} - \frac{(2n)^2 d^2}{2R} = (8n+4)\frac{d^2}{2R}$$ [Numeral 191]

$$\text{Phase difference} = \frac{2\pi}{\lambda}\left((8n+4)\frac{d^2}{2R}\right)$$ [Numeral 192]

$$= (8n+4)\frac{\pi}{2}$$

$$\equiv 0 (\text{mod} 2\pi)$$

Further, when the channel difference is $\Delta R_{abs}$, the absolute phase $\alpha_{abs}$ is represented by the following formula (T#1-R#1 is taken as a representative example).

$$\Delta R_{abs} = \frac{(2n+2)^2 d^2}{2R}$$ [Numeral 193]

The absolute phase is represented as follows.

$$\alpha_{abs} = \frac{2\pi}{\lambda}\left(\frac{(2n+2)^2 d^2}{2R}\right) (\text{mod} 2\pi)$$ [Numeral 194]

The channel matrix $H_{reflection}$ with respect to the ground reflected wave in the configuration (L=n·d) where the MIMO antennas are vertically arranged, which is calculated based on the above results, is represented by the following formula.

$$H_{reflection} = a \cdot \begin{bmatrix} e^{-j0} & e^{-j\frac{\pi}{2}} \\ e^{-j\frac{\pi}{2}} & e^{-j0} \end{bmatrix} \cdot e^{-j\alpha_{abs}}$$ [Numeral 195]

-continued $$= a \cdot \begin{bmatrix} 1 & -j \\ -j & 1 \end{bmatrix} \cdot e^{-j\alpha_{abs}}$$

where a denotes the reflection coefficient of the ground.

The channel matrix H with respect to the direct wave is represented by the following formula.

$$H = \begin{bmatrix} 1 & -j \\ -j & 1 \end{bmatrix}$$ [Numeral 196]

Accordingly, the following formula can be obtained.

$$H_{reflection} = a \cdot H \cdot e^{-j\alpha_{abs}}$$ [Numeral 197]

The following formula can be obtained as the reception signal vector Y based on the above calculation result.

$$Y = U^H \cdot (H + a \cdot H \cdot e^{-j\alpha_{abs}}) \cdot V \cdot X$$ [Numeral 198]

$$= U^H \cdot \begin{pmatrix} U \cdot \Lambda^{1/2} \cdot V^H + \\ U \cdot \Lambda^{1/2} \cdot V^H \cdot e^{-j\alpha_{abs}} \end{pmatrix} \cdot V \cdot X$$

$$= (\Lambda^{1/2} + a \cdot \Lambda^{1/2} \cdot e^{-j\alpha_{abs}}) \cdot X$$

$$= \begin{bmatrix} \lambda_1 \cdot (1 + a \cdot e^{-j\alpha_{abs}}) & 0 \\ 0 & \lambda_2 \cdot (1 + a \cdot e^{-j\alpha_{abs}}) \end{bmatrix} \cdot \begin{bmatrix} x_1 \\ x_2 \end{bmatrix}$$

$$= \begin{bmatrix} \lambda_1 \cdot (1 + a \cdot e^{-j\alpha_{abs}}) \cdot x_1 \\ \lambda_2 \cdot (1 + a \cdot e^{-j\alpha_{abs}}) \cdot x_2 \end{bmatrix}$$

where a denotes the reflection coefficient of the ground.

That is, it can be understood that in the case where the reflected wave from the ground is present in the configuration where the MIMO antennas are vertically arranged, if the relationship L=n·d is satisfied for the antenna height L from the ground, the orthogonality constructed by the MIMO is maintained.

In the case where the matrix calculation is performed only on the reception side, V=I is satisfied.

The above can be summarized as follows. That is, in the case of the configuration where the MIMO antennas are vertically arranged, even if the ground reflected wave is present, orthogonality constructed by the MIMO is ensured as long as the antenna height L is made an integral multiple (L=n·d) of the antenna interval d.

[Robustness in Case where MIMO Antennas are Horizontally Arranged]

Next, robustness in the case where the MIMO antennas are horizontally arranged will be described.

Figure 25:
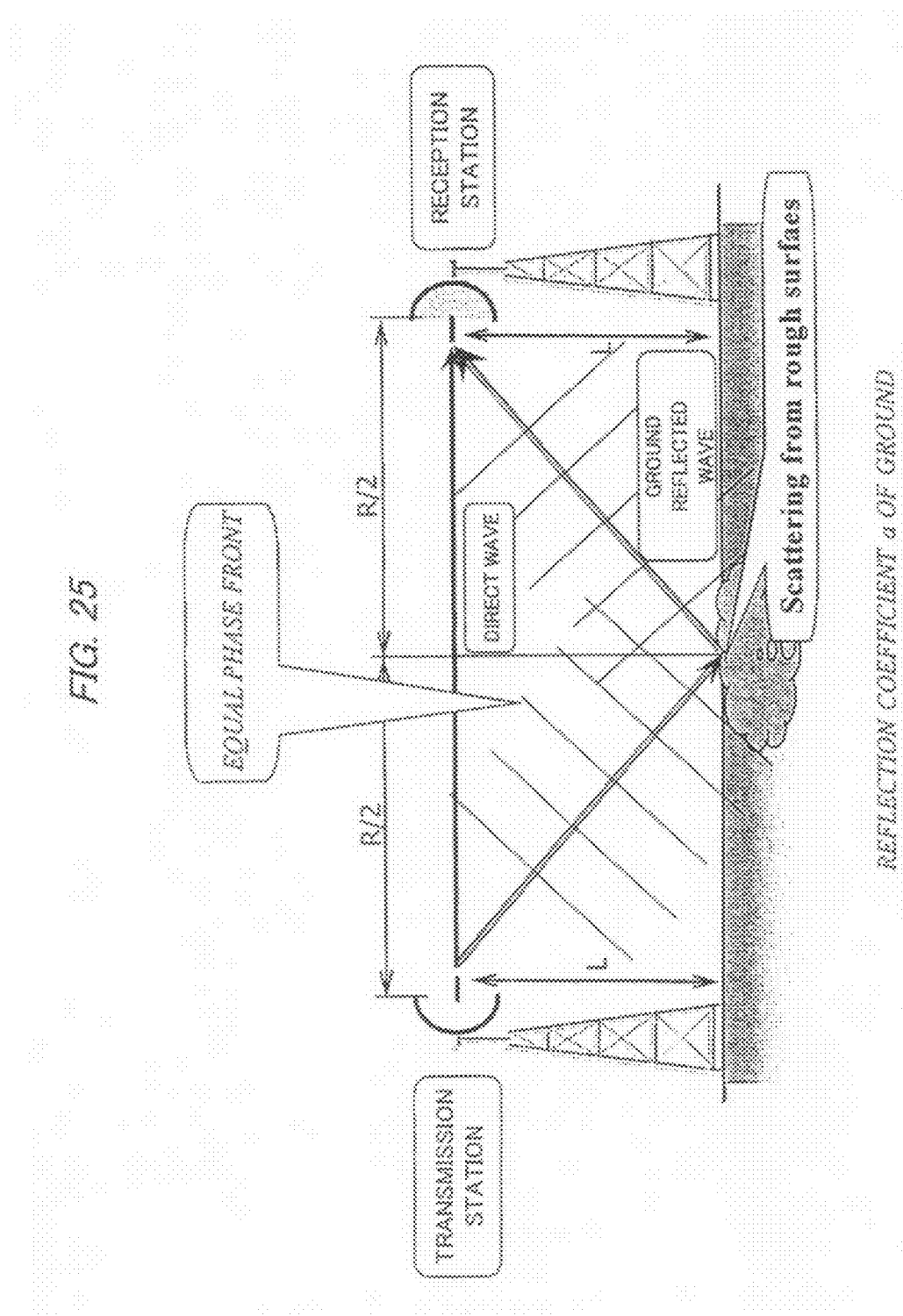
FIG. 25 A view showing a case where MIMO antennas are horizontally arranged under actual condition.
Figure 26:
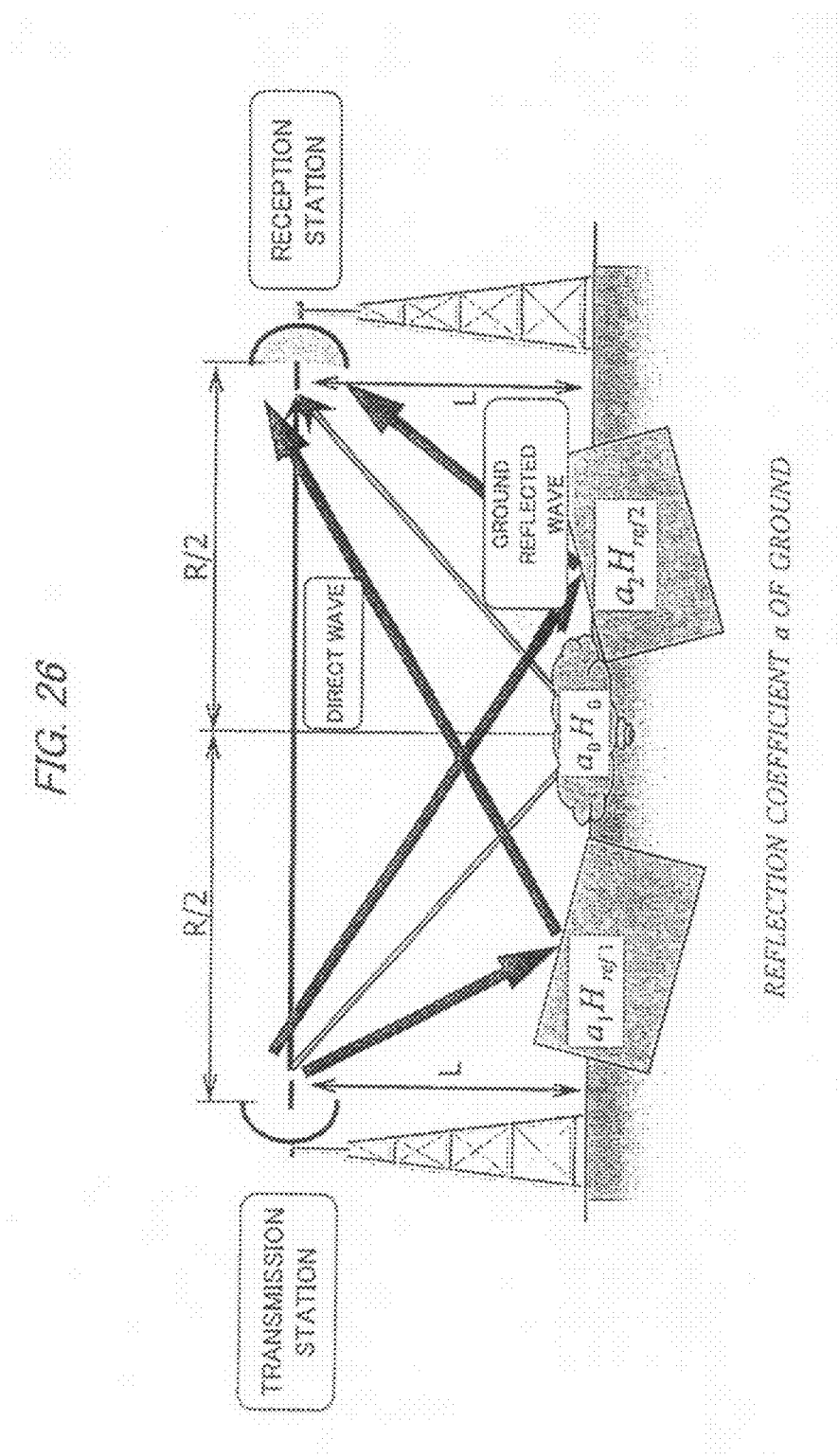
FIG. 26 A view showing a case where irregular reflecting objects exist.
Figure 27:
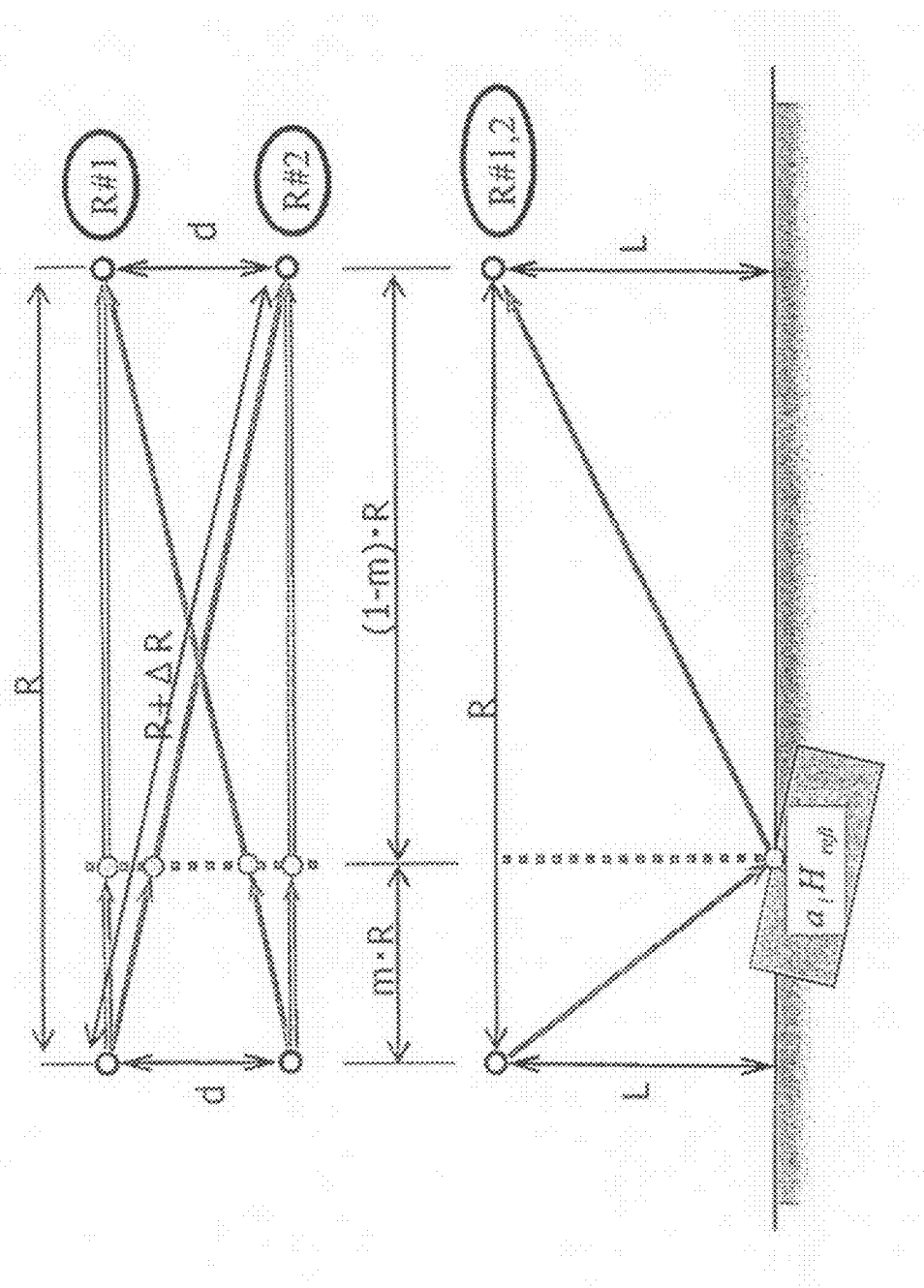
FIG. 27 A view showing an arbitrary i-th irregular reflection model.

The above discussion has been made based on the assumption that the ground is flat. Under the actual condition, it is likely that the ground is roughened, as shown in FIG. 25. In this case, the reflection coefficient a of the ground acts as the average behavior of the reflected wave. However, in the following, a case, as shown in FIG. 26, where there unfortunately exist irregular reflecting objects will be described. FIG. 27 is an analysis model used for this description and focuses on a given i-th irregular reflecting object without losing generality.

It is assumed, from the abovementioned relationship, that with respect to the channel difference $\Delta R = d^2/(2R)$ between the direct waves, the phase rotation $\alpha$ resulting from the channel difference has the relationship: $\alpha = (\pi/\lambda) \cdot (d^2/R) = \pi/2$ (orthogonal condition). From the relationship shown in FIG. 27, the channel difference $\Delta R_{refi}$ between given i-th irregular reflected waves is represented by the following formula.

$$\Delta R_{ref1} = \sqrt{m^2(R + \Delta R)^2 + L^2} +$$ [Numeral 199]

$$\sqrt{(1-m)^2(R + \Delta R)^2 + L^2} -$$

$$\sqrt{m^2 R^2 + L^2} - \sqrt{(1-m)^2 R^2 + L^2}$$

$$= \sqrt{m^2 R^2 + L^2} \left( \sqrt{1 + \frac{m^2 2R \cdot \Delta R + m^2 \cdot \Delta R^2}{m^2 R^2 + L^2}} - 1 \right) +$$

$$\sqrt{(1-m)^2 R^2 + L^2} \left( \sqrt{1 + \frac{(1-m)^2 2R \cdot \Delta R + (1-m)^2 \cdot \Delta R^2}{(1-m)^2 R^2 + L^2}} - 1 \right)$$

$$\approx \sqrt{m^2 R^2 + L^2} \left( \frac{m^2 R \cdot \Delta R + m^2 \cdot \Delta R^2}{m^2 R^2 + L^2} \right) +$$

$$\sqrt{(1-m)^2 R^2 + L^2} \begin{pmatrix} (1-m)^2 R \cdot \Delta R + \\ (1-m)^2 \cdot \Delta R^2 \\ \overline{(1-m)^2 R^2 + L^2} \end{pmatrix}$$

$$\approx \frac{m^2 R \cdot \Delta R + m^2 \cdot \Delta R^2}{\sqrt{m^2 R^2 + L^2}} + \frac{(1-m)^2 R \cdot \Delta R +}{\sqrt{(1-m)^2 R^2 + L^2}}$$

$$\approx m \cdot \Delta R + (1-m) \cdot \Delta R \begin{pmatrix} \because mR \gg L, \\ (1-m)R \gg L \end{pmatrix}$$

$$\approx \Delta R$$

(The reflecting object is assumed to be positioned at a distance of m·R from the transmission station and at a distance of (1−m)·R from the reception station). Thus, $\Delta R_{refi} = \Delta R = d^2/(2R)$ same as the channel difference between the direct waves can be obtained.

Accordingly, the phase rotation resulting from the channel difference is represented by $\alpha = (\pi/\lambda) \cdot (d^2/R) = \pi/2$ and thus the orthogonal condition is satisfied. Based on this result, a case where N reflecting objects exist will be considered.

Assuming that the phase differences with respect to the direct waves of N reflecting objects are $\alpha_{abs0}, \ldots, \alpha_{abs(N-1)}$, the reception signal vector Y is represented by the following formula.

$$Y = U^H \left( H + \sum_{i=0}^{N-1} a_i H e^{-j\alpha_{absi}} \right) VX$$ [Numeral 200]

$$= U^H \left( U\Lambda^{1/2} V^H + \sum_{i=0}^{N-1} a_i U\Lambda^{1/2} V^H e^{-j\alpha_{absi}} \right) VX$$

$$= \left( \Lambda^{1/2} + \sum_{i=0}^{N-1} a_i \Lambda^{1/2} e^{-j\alpha_{absi}} \right) \cdot X$$

$$= \begin{bmatrix} \lambda_1 \left( 1 + \sum_{i=0}^{N-1} a_i e^{-j\alpha_{absi}} \right) & 0 \\ 0 & \lambda_2 \left( 1 + \sum_{i=0}^{N-1} a_i e^{-j\alpha_{absi}} \right) \end{bmatrix} \cdot \begin{bmatrix} x_1 \\ x_2 \end{bmatrix}$$

-continued $$= \begin{bmatrix} \lambda_1 \cdot \left(1 + \sum_{i=0}^{N-1} a_i e^{-j\alpha_{absi}}\right) \cdot x_1 \\ \lambda_2 \cdot \left(1 + \sum_{i=0}^{N-1} a_i e^{-j\alpha_{absi}}\right) \cdot x_2 \end{bmatrix}$$

where $a_i$ denotes the N-th reflection coefficient of the ground.

As shown by the above result, even if N irregular reflecting objects exist, the orthogonal condition is satisfied. In the case where the matrix calculation is performed only on the reception side, V=I is satisfied.

The results thus obtained are summarized. That is, in the case where the MIMO antennas are horizontally arranged, even if a plurality of irregular reflected waves from the ground exist, the orthogonality formed by the MIMO can be ensured and is robust.

The advantages and defects in the respective configurations thus obtained are summarized as follows.
1. Case where MIMO Antennas are Horizontally Arranged
[Advantage]
  Orthogonality of MIMO channels including ground reflected wave is ensured irrespective of antenna installation height.
  Orthogonality is robust against irregular reflected wave from ground.
[Defect]
  Horizontal axis support is required for antenna installation
2. Case where MIMO Antennas are Vertically Arranged
[Advantage]
  Antenna installation structure can be simplified due to vertical arrangement, thereby achieving space saving.
[Defect]
  Antenna installation height L is limited to L=n·d (d is MIMO antenna interval) where n=1, 2, . . . .

The above-described respective configurations where the reflected wave has been taken into consideration are not limited to the individual examples but may be combined with any of the configurations where the reflected wave has not been taken into consideration.

The exemplary embodiment and examples of the present invention have been described above, and, in the following, preferred embodiments of the present invention are listed below.

First Exemplary Embodiment

A MIMO communication system having deterministic channels and an antenna arrangement method for the system includes a channel matrix calculation processing section on a transmission or reception side or both of the transmission and reception sides in a MIMO communication system used in a line-of-sight environment. The channel matrix calculation processing section updates an orthogonal channel formation matrix in accordance with a positional variation of a transmission antenna or reception antenna, positional variations of both of the transmission and reception antennas, or a variation of the channels. A plurality of transmission antennas and a plurality of reception antennas constituting the channel matrix are horizontally arranged with respect to the ground.

With this configuration, when a positional variation of a transmission antenna or reception antenna or a variation of the channels is compensated in the channel matrix calculation processing section, it is possible to absorb the positional variation of a transmission antenna or reception antenna or variation of the channels even if a reflected wave other than the direct wave is present during line-of-sight communication, thereby ensuring orthogonality.

Second Exemplary Embodiment

A MIMO communication system having deterministic channels and an antenna arrangement method for the system includes a channel matrix calculation processing section on a transmission or reception side or both of the transmission and reception sides in a MIMO communication system used in a line-of-sight environment. The channel matrix calculation processing section updates an orthogonal channel formation matrix in accordance with a positional variation of a transmission antenna or reception antenna, positional variations of both of the transmission and reception antennas, or a variation of the channels. A plurality of transmission antennas and a plurality of reception antennas constituting the channel matrix are vertically arranged with respect to the ground. The antenna height from the ground is made an integral multiple of the antenna interval.

With this configuration, when a positional variation of a transmission antenna or reception antenna or a variation of the channels is compensated in the channel matrix calculation processing section, it is possible to absorb the positional variation of a transmission antenna or reception antenna or variation of the channels in an antenna configuration where space saving is achieved due to vertical arrangement of the antennas even if a reflected wave other than the direct wave is present during line-of-sight communication, thereby ensuring orthogonality.

Third Exemplary Embodiment

A MIMO communication system having deterministic channels and an antenna arrangement method for the system set geometric parameters of the channels so that the eigenvalue of the channel matrix becomes a multiplicity condition and perform calculation of a unitary matrix constituted based on an eigenvector obtained from the eigenvalue or an eigenvector obtained from the linear combination of eigenvectors on one of the transmission and reception sides to thereby construct virtual orthogonal channels. A plurality of transmission antennas and a plurality of reception antennas constituting the channel matrix are horizontally arranged with respect to the ground.

With this configuration, even if a reflected wave other than the direct wave is present during line-of-sight communication, it is possible to achieve flexible design of a system having a configuration where there is no need to use a reverse channel for exchanging feedback information and a configuration where only transmission processing is performed while ensuring orthogonality.

Fourth Exemplary Embodiment

A MIMO communication system having deterministic channels and an antenna arrangement method for the system set geometric parameters of the channels so that the eigenvalue of the channel matrix becomes a multiplicity condition and perform calculation of a unitary matrix constituted based on an eigenvector obtained from the eigenvalue or an eigenvector obtained from the linear combination of eigenvectors on one of the transmission and reception sides to thereby construct virtual orthogonal channels. A plurality of transmission antennas and a plurality of reception antennas constituting the channel matrix are vertically arranged with respect to the ground. The antenna height from the ground is made an integral multiple of the antenna interval.

With this configuration, even if a reflected wave other than the direct wave is present during line-of-sight communication, it is possible to achieve flexible design of a system having a configuration where there is no need to use a reverse channel for exchanging feedback information and a configuration where only transmission processing is performed while ensuring orthogonality in an antenna configuration where space saving is achieved due to vertical arrangement of the antennas.

Fifth Exemplary Embodiment

In a MIMO communication system having deterministic channels and an antenna arrangement method for the system, the MIMO communication system is a fixed point microwave communication system using a plurality of antennas and constituted by using local oscillators provided independently for respective antennas on one or both of the transmission and reception sides. A plurality of transmission antennas and a plurality of reception antennas constituting the channel matrix are horizontally arranged with respect to the ground.

With this configuration, even if a reflected wave other than the direct wave is present during line-of-sight communication, it is possible to solve the problem of the necessity of achievement of carrier synchronization between antennas that imposes restriction on construction of the MIMO communication system for the fixed point microwave communication system.

Sixth Exemplary Embodiment

In a MIMO communication system having deterministic channels and an antenna arrangement method for the system, the MIMO communication system is a fixed point microwave communication system using a plurality of antennas and constituted by using local oscillators provided independently for respective antennas on one or both of the transmission and reception sides. A plurality of transmission antennas and a plurality of reception antennas constituting the channel matrix are vertically arranged with respect to the ground. The antenna height from the ground is made an integral multiple of the antenna interval.

With this configuration, even if a reflected wave other than the direct wave is present during line-of-sight communication, it is possible to solve the problem of the necessity of achievement of carrier synchronization between antennas that imposes restriction on construction of the MIMO communication system for the fixed point microwave communication system in an antenna configuration where space saving is achieved due to vertical arrangement of the antennas.

Seventh Exemplary Embodiment

A MIMO communication system used in a line-of-sight environment has deterministic channels between the transmission side where a plurality of transmission antennas are arranged and the reception side where a plurality of reception antennas are arranged. A transmitter of the MIMO communication system has a channel matrix calculation processing means for calculating a channel matrix for constructing orthogonal channels as the channels. A plurality of transmission antennas constituting the channel matrix are horizontally arranged.

Eighth Exemplary Embodiment

A MIMO communication system used in a line-of-sight environment has deterministic channels between the transmission side where a plurality of transmission antennas are arranged and the reception side where a plurality of reception antennas are arranged. A transmitter of the MIMO communication system has a channel matrix calculation processing means for calculating a channel matrix for constructing orthogonal channels as the channels. A plurality of transmission antennas constituting the channel matrix are vertically arranged with respect to the ground. The antenna height from the ground is made an integral multiple of the antenna interval.

Ninth Exemplary Embodiment

A MIMO communication system has deterministic channels between the transmission side where a plurality of transmission antennas are arranged and the reception side where a plurality of reception antennas are arranged. A transmitter of the MIMO communication system has a channel matrix calculation processing means for constructing orthogonal channels as the channels by setting geometric parameters of the channels concerning antenna interval so that the eigenvalue of the channel matrix becomes a multiplicity condition and performing matrix calculation using a unitary matrix constituted based on singular vectors obtained from the eigenvalue or singular vectors obtained from the linear combination of eigenvectors. A plurality of transmission antennas constituting the channels are horizontally arranged with respect to the ground.

Tenth Exemplary Embodiment

A MIMO communication system has deterministic channels between the transmission side where a plurality of transmission antennas are arranged and the reception side where a plurality of reception antennas are arranged. A transmitter of the MIMO communication system has a channel matrix calculation processing means for constructing orthogonal channels as the channels by setting geometric parameters of the channels concerning antenna interval so that the eigenvalue of the channel matrix becomes a multiplicity condition and performing matrix calculation using a unitary matrix constituted based on singular vectors obtained from the eigenvalue or singular vectors obtained from the linear combination of eigenvectors. A plurality of transmission antennas constituting the channels are vertically arranged with respect to the ground. The antenna height from the ground is made an integral multiple of the antenna interval.

Eleventh Exemplary Embodiment

A MIMO communication system used in a line-of-sight environment has deterministic channels between the transmission side where a plurality of transmission antennas are arranged and the reception side where a plurality of reception antennas are arranged. A receiver of the MIMO communication system has a channel matrix calculation processing means for calculating a channel matrix for constructing orthogonal channels as the channels. A plurality of reception antennas constituting the channel matrix are horizontally arranged with respect to the ground.

Twelfth Exemplary Embodiment

A MIMO communication system used in a line-of-sight environment has deterministic channels between the transmission side where a plurality of transmission antennas are arranged and the reception side where a plurality of reception antennas are arranged. A receiver of the MIMO communication system has a channel matrix calculation processing means for calculating a channel matrix for constructing orthogonal channels as the channels. A plurality of reception antennas constituting the channel matrix are vertically arranged with respect to the ground. The antenna height from the ground is made an integral multiple of the antenna interval.

Thirteenth Exemplary Embodiment

A MIMO communication system has deterministic channels between the transmission side where a plurality of transmission antennas are arranged and the reception side where a plurality of reception antennas are arranged. A receiver of the MIMO communication system has a channel matrix calculation processing means for constructing orthogonal channels as the channels by setting geometric parameters of the channels concerning antenna interval so that the eigenvalue of the channel matrix becomes a multiplicity condition and performing matrix calculation using a unitary matrix constituted based on singular vectors obtained from the eigenvalue or singular vectors obtained from the linear combination of eigenvectors. A plurality of reception antennas constituting the channels are horizontally arranged with respect to the ground.

Fourteenth Exemplary Embodiment

A MIMO communication system has deterministic channels between the transmission side where a plurality of transmission antennas are arranged and the reception side where a plurality of reception antennas are arranged. A receiver of the MIMO communication system has a channel matrix calculation processing means for constructing orthogonal channels as the channels by setting geometric parameters of the channels concerning antenna interval so that the eigenvalue of the channel matrix becomes a multiplicity condition and performing matrix calculation using a unitary matrix constituted based on singular vectors obtained from the eigenvalue or singular vectors obtained from the linear combination of eigenvectors. A plurality of reception antennas constituting the channels are vertically arranged with respect to the ground. The antenna height from the ground is made an integral multiple of the antenna interval.

The transmitter and receiver constituting the MIMO communication system are not especially limited in terms of their hardware and software configuration but may have any configuration as long as they can realize the functions (means) of the respective components. For example, a configuration in which circuits are independently provided for each function, or configuration in which a plurality of functions are integrated in one circuit may be adopted. Alternatively, a configuration in which all functions are realized by software processing may be adopted. In the case where the above functions are realized through software processing controlled by a CPU (Central Processing Unit), a program executed in a computer and a computer-readable recording medium storing the program belong to the scope of the present invention.

Although the present invention has been described with reference to the exemplary embodiments and examples, the present invention is not limited to the above exemplary embodiments and examples, and it is apparent to those skilled in the art that a variety of modifications and changes may be made to the configurations and details of the present invention without departing from the scope of the present invention.

INDUSTRIAL APPLICABILITY

The present invention can be applied to a MIMO communication system such as a fixed point microwave communication system having deterministic channels between the transmission side where a plurality of transmission antennas are provided and reception side where a plurality of reception antennas are provided, an antenna arrangement method therefore, a transmitter thereof and a receiver thereof.

The invention claimed is:

1. A Multiple-Input/Multiple-Output (MIMO) communication system having deterministic channels between a transmission side where a plurality of transmission antennas are arranged and a reception side where a plurality of reception antennas are arranged and used in a line-of-sight environment, the system comprising
a channel matrix calculation processing unit for calculating a channel matrix for constructing orthogonal channels as a channel on a transmission or reception side or both of the transmission and reception sides,
wherein the plurality of transmission antennas and the plurality of reception antennas constituting the channel matrix are vertically arranged with respect to the ground in each of the transmission and reception sides, and an antenna height of an antenna arranged at a lowest position in each side from the ground is made to be an integral multiple of an antenna interval, the antenna interval being an interval between adjacent antennas in each side and being common in each side and to both sides.

2. A Multiple-Input/Multiple-Output (MIMO) communication system having deterministic channels between a transmission side where a plurality of transmission antennas are arranged and a reception side where a plurality of reception antennas are arranged, the system comprising
a channel matrix calculation processing unit for constructing orthogonal channels as the channels by setting geometric parameters of the channels concerning antenna distance so that an eigenvalue of the channel matrix becomes a multiplicity condition, and performing, on the transmission or reception side, a matrix calculation using a unitary matrix constituted based on singular vectors obtained from the eigenvalue or singular vectors obtained from a linear combination of eigenvectors,
wherein the plurality of transmission antennas and the plurality of reception antennas constituting the channels are vertically arranged with respect to the ground in each of the transmission and reception sides, and an antenna height of an antenna arranged at a lowest position in each side from the ground is made to be an integral multiple of an antenna interval, the antenna interval being an interval between adjacent antennas in each side and being common in each side and to both sides.

3. The MIMO communication system having deterministic channels according to claim 1, wherein
the channel matrix calculation processing unit updates the channel matrix for constructing the orthogonal channels in accordance with a positional variation of a transmission antenna or a reception antenna, positional variations of both of the transmission and reception antennas, or a variation of the channels.

4. The MIMO communication system having deterministic channels according to claim 2, wherein
the channel matrix calculation processing unit sets geometric parameters of the channels so that the eigenvalue of the channel matrix becomes a multiplicity condition, and performs calculation of a unitary matrix constituted based on an eigenvector obtained from the eigenvalue or an eigenvector obtained from the linear combination of eigenvectors on one of the transmission and reception sides to thereby construct virtual orthogonal channels as the channels.

5. The MIMO communication system having deterministic channels according to claim 1, wherein
the MIMO communication system comprises a fixed point microwave communication system using a plurality of antennas and comprises oscillators provided independently for respective antennas on one or both of the transmission and reception sides.

* * * * *